(12) United States Patent
Dubrovsky et al.

(10) Patent No.: US 12,514,475 B2
(45) Date of Patent: Jan. 6, 2026

(54) WEARABLE BIOSENSORS FOR SEMI-INVASIVE, REAL-TIME MONITORING OF ANALYTES, AND RELATED METHODS AND APPARATUS

(71) Applicant: SiPhox, Inc., Burlington, MA (US)

(72) Inventors: Michael Zalmon Dubrovsky, Burlington, MA (US); Teagan Stedman, Burlington, MA (US); Diedrik Rene Vermeulen, Burlington, MA (US)

(73) Assignee: SiPhox, Inc., Burlington, MA (US)

( * ) Notice: Subject to any disclaimer, the term of this patent is extended or adjusted under 35 U.S.C. 154(b) by 0 days.

(21) Appl. No.: 18/421,654

(22) Filed: Jan. 24, 2024

(65) Prior Publication Data

US 2024/0206783 A1    Jun. 27, 2024

Related U.S. Application Data

(63) Continuation of application No. PCT/US2022/037767, filed on Jul. 20, 2022.
(Continued)

(51) Int. Cl.
*A61B 5/1486* (2006.01)
*A61B 5/00* (2006.01)
(Continued)

(52) U.S. Cl.
CPC ...... *A61B 5/14865* (2013.01); *A61B 5/14514* (2013.01); *A61B 5/14532* (2013.01);
(Continued)

(58) Field of Classification Search
CPC ............ A61B 5/14865; A61B 5/14514; A61B 5/14532; A61B 5/14546; A61B 5/14558; A61B 5/1459; A61B 2560/045; A61B 2560/0462; A61B 2562/0233; A61B 2562/043; A61B 2562/228
See application file for complete search history.

(56) References Cited

U.S. PATENT DOCUMENTS 11,561,206 B2    1/2023    Bitauld
11,678,823 B2    6/2023    Van
(Continued)

FOREIGN PATENT DOCUMENTS

WO    2023/003983 A1    1/2023

*Primary Examiner* — Jeffrey G. Hoekstra
(74) *Attorney, Agent, or Firm* — Caldwell Intellectual Property Law

(57) ABSTRACT

Disclosed herein are biosensors for biosensing including a sensor photonic integrated circuit (PIC) configured to be positioned inside a human body. The sensor PIC includes one or more optical analyte sensors each functionalized by a respective layer of binding ligands. The biosensors further include a reader system optically coupled to the sensor PIC. The reader system is configured to provide optical signals to the one or more optical analyte sensors and receive signals provided by the one or more optical analyte sensors. The reader system is further configured to determine one or more characteristics of one or more analytes sensed by the one or more optical analyte sensors based on the signals provided by the one or more optical analyte sensors.

10 Claims, 57 Drawing Sheets

Related U.S. Application Data

(60) Provisional application No. 63/223,807, filed on Jul. 20, 2021.

(51) Int. Cl.
    *A61B 5/145*     (2006.01)
    *A61B 5/1455*     (2006.01)
    *A61B 5/1459*     (2006.01)

(52) U.S. Cl.
    CPC ...... *A61B 5/14546* (2013.01); *A61B 5/14558* (2013.01); *A61B 5/1459* (2013.01); *A61B 5/6848* (2013.01); *A61B 5/6833* (2013.01); *A61B 2560/0412* (2013.01); *A61B 2560/045* (2013.01); *A61B 2560/0462* (2013.01); *A61B 2562/0233* (2013.01); *A61B 2562/043* (2013.01); *A61B 2562/228* (2013.01)

(56) References Cited

U.S. PATENT DOCUMENTS

2019/0231264 A1\*   8/2019   Higbie ................. A61B 5/6833
2022/0003676 A1\*   1/2022   Mazed ................. G01N 21/658

\* cited by examiner

WEARABLE BIOSENSORS FOR SEMI-INVASIVE, REAL-TIME MONITORING OF ANALYTES, AND RELATED METHODS AND APPARATUS

CROSS-REFERENCE TO RELATED APPLICATIONS

This application claims priority to PCT application No. PCT/US2022/037767 titled "WEARABLE BIOSENSORS FOR SEMI-INVASIVE, REAL-TIME MONITORING OF ANALYTES, AND RELATED METHODS AND APPARATUS" and filed Jul. 20, 2022, which claims priority to U.S. Provisional Application No. 63/223,807 titled "Real-time Biosensor with Photonic and Electronic Interface" and filed Jul. 20, 2021, and U.S. Provisional Application No. 63/315,854 titled "Real-time Biosensor with Photonic and Electronic Interface for Sensing Proteins, Hormones, Glucose and Beyond" and filed Mar. 2, 2022, each of which is incorporated herein by reference in its entirety.

FIELD OF THE INVENTION

The present disclosure is directed to integrated photonic systems and methods for biosensing and, more specifically, integrated photonic systems and methods for real-time or near real-time biosensing, including detecting changes in optical response to biological activity.

BACKGROUND

The emergence of personalized medicine, global pandemic risks, and other 21st century health trends has created a demand for low-cost and/or wearable biosensors capable of monitoring the levels of a wide variety of analytes. The continuous glucose monitor is one example of a wearable biosensor that monitors the level of an analyte (glucose) in the blood. However, continuous glucose monitors use sensing technology that has not demonstrated the capability to sense analytes other than glucose, such as proteins and small molecules that are generally present in the body's interstitial fluids at concentrations lower than glucose. Existing techniques for measuring such analyte levels are generally invasive and/or involve analyzing patient samples using bulky, expensive lab equipment.

SUMMARY OF THE DISCLOSURE

There is a need for a wearable biosensor capable of monitoring levels of multiple analytes (e.g., proteins, hormones, small molecules, etc.) in the body's interstitial fluids, including analytes that are generally present at concentrations below 1 g/L (e.g., concentrations between tens to hundreds of ng/L and tens to hundreds of mg/L).

In one aspect, the disclosure features biosensors for biosensing. An example biosensor includes a sensor photonic integrated circuit (PIC) configured to be positioned inside a human body. The sensor PIC includes one or more optical analyte sensors each functionalized by a respective layer of binding ligands. The biosensor further includes a reader system optically coupled to the sensor PIC. The reader system is configured to provide optical signals to the one or more optical analyte sensors and receive signals provided by the one or more optical analyte sensors. The reader system is further configured to determine one or more characteristics of one or more analytes sensed by the one or more optical analyte sensors based on the signals provided by the one or more optical analyte sensors.

Various embodiments of biosensors for biosensing can include one or more of the following features.

Determining the one or more characteristics of the one or more analytes can include determining a concentration or a density of a particular analyte by using refractive index-based biosensing with at least one component of the sensor PIC to detect optical effects associated with the sensing of the particular analyte by the one or more optical analyte sensors. The at least one component of the sensor PIC can include a ring resonator, a Mach-Zender Interferometer, a photonic crystal cavity, a grating, a Fabry-Perot Interferometer, and/or a surface plasmon resonator. The concentration or density of the particular analyte can be further determined based on absorption spectroscopy and/or fluorescence spectroscopy.

A first optical analyte sensor of the one or more optical analyte sensors can be further functionalized for label-free sensing of a particular analyte. At least one second optical analyte sensor of the one or more optical analyte sensors can be functionalized for sensing of background signals. The particular analyte can include a protein, peptide, hormone, small molecule, or glucose. A first optical analyte sensor of the one or more optical analyte sensors can include a porous network adjacent to a waveguide. The porous network can be configured to prevent labels from diffusing into and out of the porous network, and to permit a particular analyte to diffuse into and out of the porous network. The porous network can be further configured to prevent biofouling from cells and molecules other than the particular analyte.

A first optical analyte sensor of the one or more optical analyte sensors can include a label tethered to a waveguide by a linker that has a length longer than a radius of a zone of sensitivity of the first optical analyte sensor. The label can be functionalized with a complementary binder to bind a particular analyte, such that the complementary binder, the particular analyte and a binding ligand interact to form a sandwich. The binding ligand can be tethered to the first optical analyte sensor by a linker having a length shorter than the radius of the zone of sensitivity, such that the formed sandwich brings the label within the zone of sensitivity.

A first optical analyte sensor of the one or more optical analyte sensors can include a label tethered to the first optical analyte sensor by an aptamer. The aptamer can be structured to switch from an unfolded state to a folded state when a particular analyte binds to the aptamer.

The aptamer can place the label out of a zone of sensitivity of the first optical analyte sensor when in the unfolded state and place the label within the zone of sensitivity when in the folded state. A first optical analyte sensor of the one or more optical analyte sensors can include a doped waveguide and an enzyme for reacting with a particular analyte, the particular analyte having a size lower than a threshold size.

The sensor PIC can have thickness of less than approximately 500 microns and a width of less than approximately 1 mm. The sensor PIC can have thickness of less than approximately 1 mm and a width of less than approximately 2 mm. The one or more optical analyte sensors can include at least 2 functionalized optical analyte sensors. The one or more optical analyte sensors can include between 2 and 5 functionalized optical analyte sensors. The one or more optical analyte sensors can include between 5 and 10 functionalized optical analyte sensors. The one or more optical analyte sensors can include between 10 and 100 optical analyte sensors functionalized to sense between 10 and 100 respective analytes.

The biosensor can be configured to perform real-time monitoring of each of the one or more analytes. The biosensor can be wearable.

In another aspect, the disclosure features methods for biosensing. An example biosensing method includes positioning a sensor photonic integrated circuit (PIC) of a biosensor inside a human body, where the sensor PIC includes one or more optical analyte sensors each functionalized by a respective layer of binding ligands. The method can include, with a reader system coupled to the sensor PIC, providing optical signals to the one or more optical analyte sensors. The method can include, with the reader system, receiving signals provided by the one or more optical analyte sensors, and determining one or more characteristics of one or more analytes sensed by the one or more optical analyte sensors based on the signals provided by the one or more optical analyte sensors.

Various embodiments of the biosensing methods can include one or more of the following features.

The biosensor can perform real-time monitoring of each the one or more analytes. The determining of the one or more characteristics of the one or more analytes can include determining a concentration or a density of a particular analyte by using refractive index-based biosensing with at least one component of the sensor PIC to detect optical effects associated with the sensing of the particular analyte by the one or more optical analyte sensors. The at least one component of the sensor PIC can include a ring resonator, a Mach-Zender Interferometer, a photonic crystal cavity, a grating, a Fabry-Perot Interferometer, and/or a surface plasmon resonator.

The foregoing Summary, including the description of some embodiments, motivations therefore, and/or advantages thereof, is intended to assist the reader in understanding the present disclosure, and does not in any way limit the scope of any of the claims. These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the systems and methods described herein. In the following description, various embodiments are described with reference to the following drawings.

FIGS. 36A-42B are diagrams of various example wearable biosensors.

DETAILED DESCRIPTION

1. Photonic Integrated Circuits (PICs)

Figure 1:
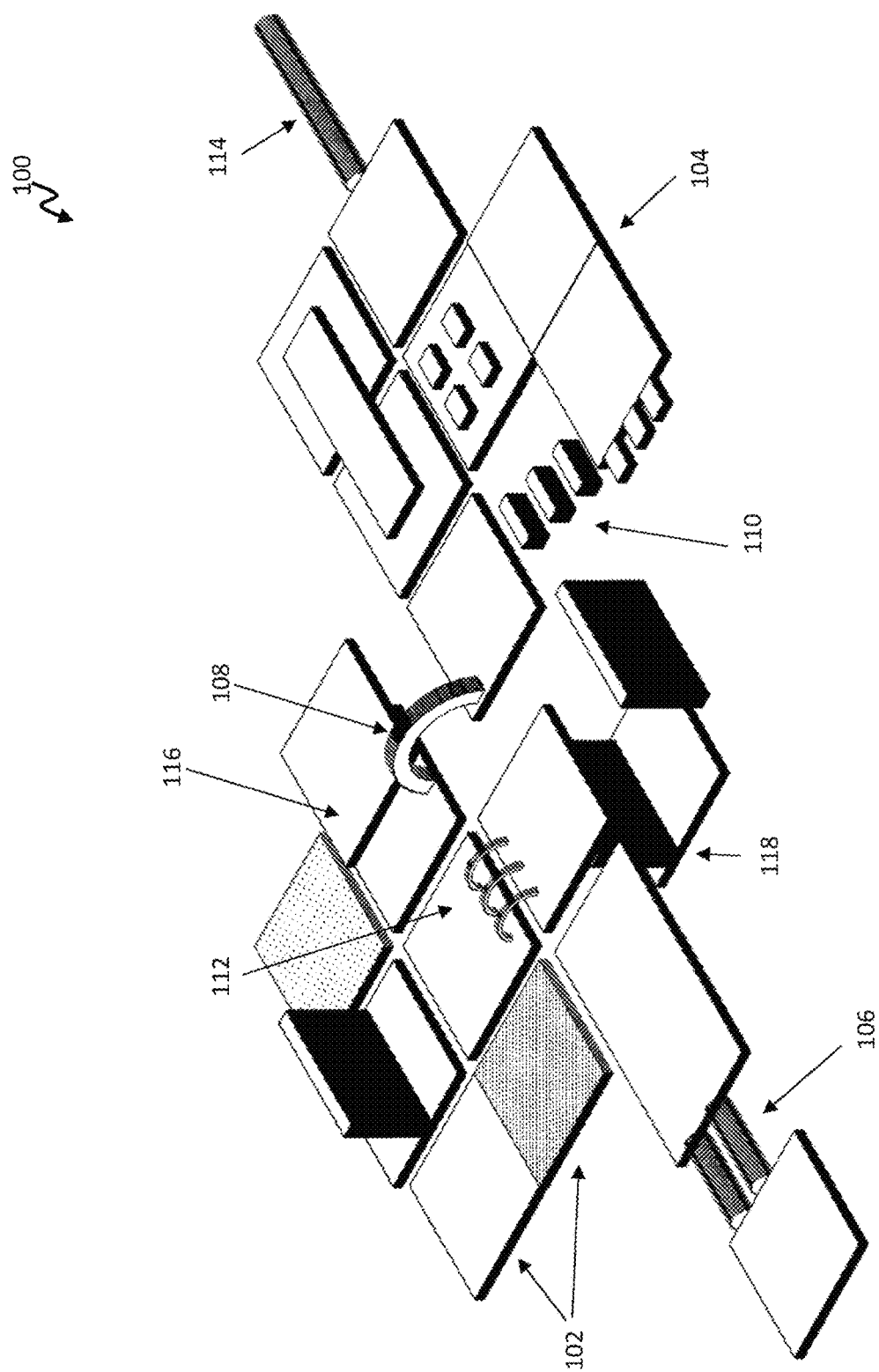
FIG. 1 is a diagram of a perspective view of an example integrated photonics assembly that multiple photonic integrated subcircuits.

Some embodiments of the biosensors described herein include one or more photonic integrated circuits. Some examples of photonic integrated circuits and sensing devices incorporating photonic integrated circuits are described below.

Disclosed herein are embodiments of photonic integrated subcircuits that can be assembled into an integrated photonics assembly. These photonic integrated subcircuits may be referred to herein as "subcircuits," "chiplets," or "sub-chips." The integrated photonics assembly may be referred to herein as "an assembly," "an integrated photonics assembly," or "a photonic integrated circuit" (PIC). In some cases, a PIC may include two or more photonic integrated subcircuits. In some cases, a PIC may consist of a single photonic integrated subcircuit.

A given photonic integrated subcircuit can be configured to transfer light to and/or receive light from at least one other subcircuit, for example, using one or more light transfer techniques. In various embodiments, each photonic integrated subcircuit is a discrete integrated circuit or chip that can be physically separated from one another, moved, and/or attached to one another. The example subcircuits can be assembled to create a larger integrated photonics circuit using two or more subcircuits. The example subcircuits can be used to extend and/or combine an integrated photonic circuit into a larger integrated photonic circuit. The example subcircuits are configured to guide light via waveguide structures and may contain special functions including, e.g., splitting light, wavelength demultiplexing, photo detection, light generation, light amplification, etc.

1.1. Standardization of Photonic Integrated Subcircuits

In various embodiments, each subcircuit is a pre-fabricated integrated circuit. By pre fabricating the subcircuits, the subcircuits can be standardized so as to enable assembly of two or more subcircuits into a PIC. Standardization of subcircuits can pertain to one or more properties of the subcircuits, including dimension(s), volume, weight, input(s), output(s), functionality, mechanical feature(s) (e.g., for coupling, alignment, etc.), active alignment feature(s), wirebond pad(s), electrical connection(s), feature(s) that are complementary to a receptacle (including vertical alignment feature(s) and/or lateral alignment features), etc. Standardization can include the configuration of complementary properties or structures of two or more adjacent subcircuits, as described further below. For instance, alignment structures and/or waveguide paths in a first type of subcircuit may be configured to be complementary with respective alignment structures and/or waveguide paths in a second type of subcircuit, such that a subcircuit of a first type can be attached to a subcircuit of a second type, e.g., with low optical loss. Standardization of the subcircuits can enable permutational assembly of the subcircuits into PICs. Further, standardization can enable time-efficient and/or cost-efficient packaging.

Because many different types of integrated photonics assembly can be created from the subcircuits, it is beneficial to standardize the subcircuits. One benefit of standardization is that a subcircuit can be switched or interchanged with another subcircuit, thereby creating a different optical assembly that is a variation of the first assembly. In some embodiments, subcircuits can be configured such that they enable many optical assemblies that are useful with a minimum number of subcircuits. Further, each subcircuit or type of subcircuit can be configured and/or selected for improved performance, reduced cost, efficiency or case of fabrication, efficiency or case of supply, etc.

There is generally a nonzero likelihood that certain aspects and/or components (e.g., transistors) of an integrated circuit may fail or render the individual fabricated circuit defective. The resulting integrated circuits of a particular fabricated batch that function correctly is the "yield" of that particular batch. By fabricating (and subsequently testing) the integrated photonics subcircuits individually and/or independently, the non-functioning subcircuits can be eliminated from the supply of subcircuits. Further, it is found that a higher number of functioning subcircuits (of a given type) can be produced using a single type of fabrication process (e.g., on a given wafer). In comparison, a mixed-type integrated circuit (e.g., using more than one type of fabrication process) results in lower yield of that mixed-type integrated circuit. This results in a higher number of fully-functioning integrated circuits, thereby contributing to an increased number of integrated photonics assemblies. Therefore, In some embodiments, it may be preferable to generate an integrated optical circuit from subcircuits even if all the component subcircuits can be fabricated in the same process. This can increase the number of optical assemblies that can be built. Furthermore, the subcircuits can be yielded before they are used in the optical assembly, thereby increasing the total yield of a certain optical assembly. The optical assembly can thus be yield-optimized by forming the assembly from different sub-chips.

In some embodiments, yields are significantly improved in an integrated photonics assembly as compared to a monolithic chip. In some embodiments, cost is significantly reduced in an integrated photonics assembly as compared to a monolithic chip.

In some embodiments, subcircuits are standardized in size. For example, a standardized set of subcircuits may include subcircuits that are each 1 mm in width and 1 mm in length. In some embodiments, the standardized set may include two or more subsets of subcircuits in which the size of subcircuits in each subset is standardized. For example, a first subset may have subcircuits of 1 mm×1 mm, a second subset of subcircuits of 1 mm×2 mm, a third subset of subcircuits of 2 mm×2 mm, a fourth subset of subcircuits 1 mm×3 mm, etc.

In some embodiments, the subcircuits are standardized according to the light port positioning and/or electrical pad positioning. For instance, the position of light input ports and/or output ports along the edges or surface of the subcircuits may be standardized for groups of subcircuits. By leveraging standardization, a library of standard subcircuits can be produced to build nearly an endless variety of photonic assemblies without the need for costly or time-consuming customization of the package or assembly process.

In some embodiments, the standardization of subcircuits contributes to and/or directly begets the standardization of other components, e.g., printed circuit boards (PCBs), non-optical components, lasers, etc. For example, by standardizing the electrical pads in a subcircuit, connecting pads on a host PCB can also be standardized, thereby contributing to greater efficiency.

1.2 Modularity of Photonic Integrated Subcircuits

Importantly, each subcircuit may be configured to be a modular component of an integrated photonics assembly. The modular character of the subcircuits is one benefit of the standardization of the subcircuits. For instance, two or more subcircuits, e.g., subcircuits Si and S2, can be assembled into assembly A with functionality FA. One or more of these subcircuits (e.g., subcircuit S2) can be removed from assembly A and connected to another subcircuit (e.g., subcircuit S3) and/or an assembly to form assembly B, in which assembly B has a functionality FB (which may be different from functionality FA). In doing so, the subcircuits' modular character enables many useful integrated optical assemblies.

Various benefits flow from the modularity of the photonic integrated subcircuits. In particular, the modularity of the subcircuits facilitates the scaling (e.g., scaling up or down) of integrated photonics assemblies, replacement of subcircuits of an assembly, improvements to existing PICs, reconfigurability of assemblies, etc. Importantly, the described systems and methods can produce the desired subcircuits and/or customized integrated photonics assemblies faster than the fabrication of a conventional PIC. For example, a customized integrated photonics assembly may be produced within seven (7) days as compared to the one (1) year required for the conventional PIC. Accordingly, the described systems and methods enable efficiencies in time and/or cost.

Further, the modular subcircuits can reduce waste. For example, as described below, the described systems and methods permit the reuse of existing subcircuits and/or reconfiguring of existing assemblies. In another example, the described techniques enable the fabrication of subcircuits on demand (and therefore a reduction of inventory).

In some embodiments, when a particular subcircuit S in a given assembly is discovered to be faulty (e.g., inefficient, inoperable, incompatible, etc.), that particular subcircuit S may be removed from the assembly and a replacement subcircuit S' may be installed in its place. In another example, the particular subcircuit S may need to be reconfigured and/or translated to another portion of the assembly to be operable. This has the advantage of avoiding disturbing the rest of the assembly while providing a quick and/or simple solution to replacing a faulty part of the assembly. By contrast, a conventional PIC—which requires a single indivisible "chip"—may not be repairable by swapping out or reconfiguring of a faulty component.

The modularity of the subcircuits can facilitate the evolution of engineering and/or design of integrated photonics assemblies over time. The development of an assembly A having a particular functionality may change from a first generation (e.g., assembly $A_1$) configuration to a second generation (assembly $A_2$), third generation (assembly $A_3$), and so on to accommodate the needs of customers and/or adapt to changing markets, new technologies, different materials, different standards, a change in specifications, evolving regulation, etc. This may be achieved by adding, replacing, moving, reconfiguring, etc. one or more subcircuits in the assembly (e.g., assembly $A_1$) to produce another assembly (e.g., assembly $A_3$). For example, at some time after the production of the first generation assembly $A_1$, a new subcircuit may become available. This new subcircuit may be added to or replace an existing subcircuit in the first generation assembly $A_1$ to form the second generation assembly $A_2$.

In some embodiments, an existing assembly A may be repurposed or adapted with a different functionality by changing one or more subcircuits included in the assembly A. In another example, a conventional PIC may be repurposed or reconfigured with a different functionality by adding one or more subcircuits to the PIC. In such a case, an adapter-type subcircuit may be coupled to the conventional PIC and one or more subcircuits may be coupled to the adapter-type subcircuit. In another embodiment, two or more assemblies may be coupled together by one or more subcircuits, e.g., forming a light path between the two or more assemblies.

One characteristic of an integrated photonics chip (or subchip) is its ability to guide light. In various embodiments, the subcircuits can be fabricated from one or more electro-optic crystals, polymers, and/or semiconductor materials. For example, this can be achieved in a CMOS-compatible sub-chip or so-called silicon photonics, silicon-on-silica, silicon nitride, aluminum oxide, glass, III/V based integrated photonics chips, lithium niobate, silicon-on-insulator, gallium arsenide (GaAs), indium phosphide (InP), nitride, glass, etc. In some embodiments, the subcircuit is a combination of subcircuits. For example, a silicon photonics subcircuit can be enhanced with a III/V chip to increase its functionality (e.g., optical detection and optical gain), thereby creating a subcircuit that includes two or more chips or subchips.

The example integrated photonics assemblies may be configured for one or more functionalities. The assemblies may be configured for communication, biomedical, chemical, research, computing, or other applications. A non-limiting list of applications include beamforming, beam-steering, LiDAR, biomedical instrumentation (OCT, spectrometers, diagnostics, etc.), biophotonics (blood analysis, brain control, etc.), acousto-optics, astrophotonics, gyroscopes, metrology, optical clocks, magneto-optics (integrated magneto optical devices, isolators, memory, switches, etc.), artificial intelligence, reconfigurable photonic processors, THz photonics, microwave photonics, fiber sensor interrogators, free-space optical communication (Li-Fi, satellite Internet, etc.), augmented reality, quantum optics (QKD, QRNG, etc.), etc.

1.3 Light Transfer Techniques

Light may be transferred and/or received between two or more subcircuits using one or more light transfer methods, as described in further detail below. Each subcircuit can transfer light to at least one other subcircuit. In some embodiments, electrical signals, microwave signals, and/or fluids may be transferred and/or received by the subcircuits. In various embodiments, the wavelength of the light can span from 100 nm to 20 microns. Light can be transferred and/or received over one or more channels. In some embodiments, a given channel transmits light in one or more wavelengths, one or more polarizations, and/or one or more modes.

In various embodiments, a subcircuit can be as close as zero (0) micron distance edge-to-edge with another subcircuit. This can be true when two or more subcircuits are stacked horizontally, stacked vertically, or configured to be partially overlapping (e.g., negative distance edge to edge). In various embodiments, the maximum distance between light-transferring subcircuits can be as large as 10 cm. In some embodiments, the distance is between 0 um and 2 mm.

In various embodiments, an integrated photonics assembly can include two or more photonic integrated subcircuits. FIG. 1 illustrates an example integrated photonics assembly 100 that includes multiple subcircuits 102. As depicted, the subcircuits 102 can be coupled to one another by one or more techniques. For example, light can be transferred between two or more subcircuits via butt-coupling 104, optical fiber(s) 106, photonic wirebond(s) 108, a free-space optical train 110, electrical wirebonds 112, adiabatic coupling, out-of-plane coupling, etc. In various embodiments, the integrated photonics assembly 100 can be optically connected to an external system (e.g., a subcircuit, another assembly, a conventional PIC, an electrical system, a computing system, a biomedical system, etc.) by an optical fiber 114. In various embodiments, a channel between two subcircuits can transfer light of one or more polarizations, one or more modes, and/or one or more wavelengths.

The example subcircuits may be arranged in various configurations, e.g., side by side, overlapping, etc. For example, one or more subcircuits can be connected on top of, under, or to the side of a host subcircuit. In some embodiments, a host-type subcircuit is larger in at least one dimension than at least one other type of subcircuit so as to provide sufficient space to "carry" a number of subcircuits. In some embodiments, a host-type subcircuit is smaller in at least one dimension than at least one other type of subcircuit so as to act as a "bridge" between two or more subcircuits. Note that, in the drawings, some subcircuits are distinguished by different patterned or colored surfaces to indicate different types or functionalities.

Light transfer can be accomplished by any one or more of the following techniques. In some embodiments, light is transferred by edge-to-edge coupling (also referred to as butt coupling) between two or more subcircuits (refer to arrow 104). In this technique, light abruptly exits the subcircuit (e.g. via the end of a light path, waveguide, from an output port, etc.) from one side or edge of the subcircuit into air or any other bulk medium. Light can enter abruptly into the side or edge (e.g., via the beginning of a light path, waveguide, into an input port, etc.) of another subcircuit.

In some embodiments, light is adiabatically transferred between subcircuits by a taper system or method. In this technique, two subcircuits are configured to overlap at least partially (refer to arrow 116). In at least one of the subcircuits, the geometry of a waveguide can be configured such that light can be transferred adiabatically or near-adiabatically to another subcircuit.

In some embodiments, light is transferred between subcircuits via an optical guiding medium. Such optical guiding mediums can include an optical fiber 106, a polymer waveguide, a polymer fiber, etc. The light may be guided in the region or space between the subcircuits and may therefore bridge a larger distance with lower optical loss (as compared to subcircuits without the optical guiding medium). In some embodiments, light is transferred in free-space or in a medium via a crossing lens, a collimator, etc.

In some embodiments, light is configured to exit a subcircuit non-horizontally (e.g., near-vertically or vertically) and enter non-horizontally into another subcircuit. In one example, integrated mirrors or grating couplers can be used to accomplish this type of light transfer. In some embodiments, light exits one subcircuit non-horizontally and enters another subcircuit horizontally. In one example, this is achieved by a subcircuit standing vertically on the surface of another sub-chip (illustrated by arrow 118).

The transfer of light between two or more subcircuits can involve any one or combination of the above-described light transfer methods. In some embodiments, light transfer can involve two or more methods (or combinations of methods) for two or more respective channels. Using two or more methods of transferring light can be particularly useful in some cases. In one scenario, butt-coupling of subcircuits may be preferred but a particular routing or direction of the light transfer path may be difficult or may require customization. Such a routing can be achieved by using a flexible connection, e.g., a polymer waveguide or a photonic wirebond. In some instances, some subchips may not be identically sized or shaped due to imperfect dicing or cleaving. Therefore, gaps between such subchips can be spanned using a flexible interconnection method.

Figure 2:
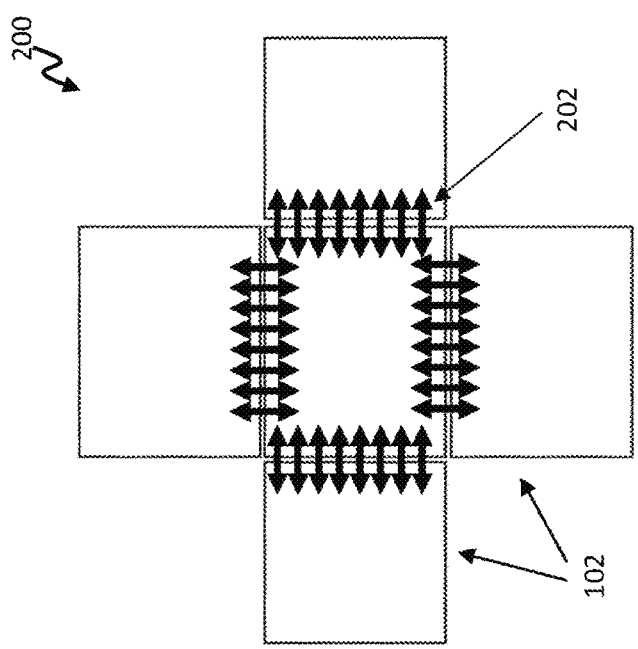
FIG. 2 is a diagram of a top view illustrating light transfer between example subcircuits of an integrated photonics assembly.

In some embodiments, transfer of light between subcircuits is multi-channel. One benefit of subcircuits that are closely spaced is that many light transfers can happen between the two subcircuits at the same time. As an example, a single subcircuit can transfer light to 10 or more other subcircuits with 100 light channels between each sub-chip. Other free-space components may be added in between the subcircuits and in between the optical path(s). FIG. 2 illustrates light transfer between subcircuits of assembly 200. The assembly 200 includes five (5) subcircuits 102, among which light is transferred and/or received. In the illustrated example, the subcircuits are butt-coupled, thereby making a large number of light transfer paths 202 feasible.

In some embodiments, some chips do not transmit light to a subcircuit and therefore be referred to as "non-photonic subcircuits" or "non-photonic subchips." For instance, such non photonic subchips may only transmit and/or receive electrical signals from a photonic assembly of subcircuits. Accordingly, these may not be considered a part of the integrated photonics assembly. However, in some embodiments, these non-photonic subchips are part of a standardized package around the integrated photonics assembly.

In various embodiments, light can be transmitted from the integrated photonics assembly to an external or remote device or system. In some embodiments, this light may eventually reach other optical chips, though these other chips may not be considered part of the optical assembly. Subcircuits may have light paths to an external system by, for example, a fiber, fiber array or free-space connection. There is no lower bound or upper bound on the number of subcircuits that need to be connected from the assembly to the outside world (e.g., an external system or device) and no limitation on which method is used.

1.4 Integrated Photonics Assemblies

As described above, subcircuits can be combined in many different assemblies and configurations. Subcircuits may be combined in a one-dimensional, two-dimensional, or three-dimensional assembly using any one or more of the techniques described herein.

Figure 3A:
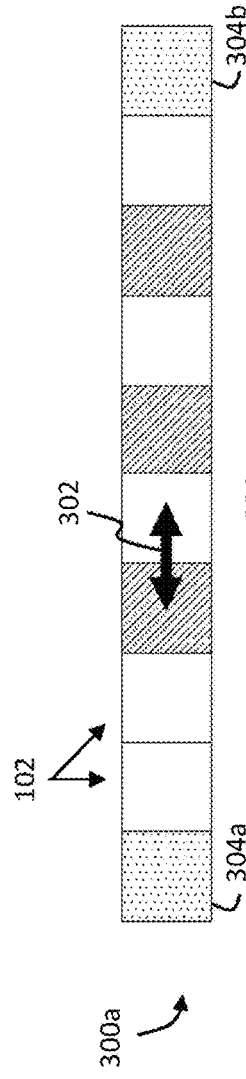
FIGS. 3A-3C are diagrams of top views of example integrated photonics assemblies, which each include multiple subcircuits.
Figure 3B:
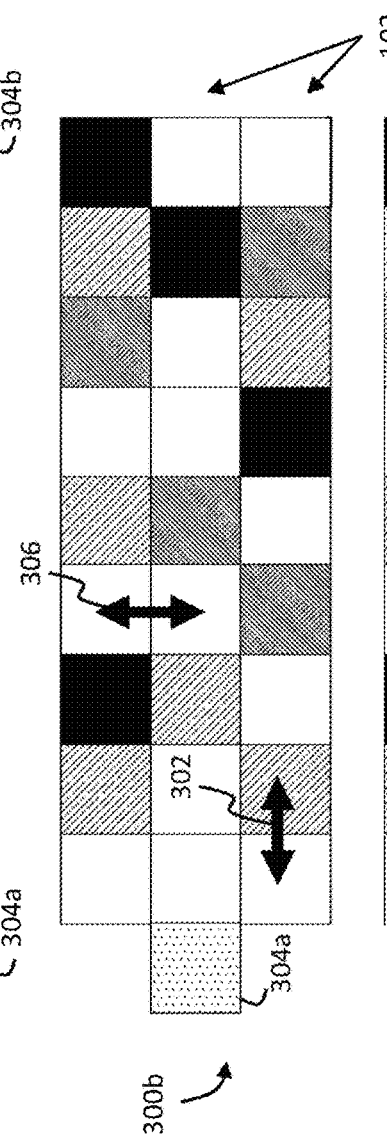
Figure 3C:
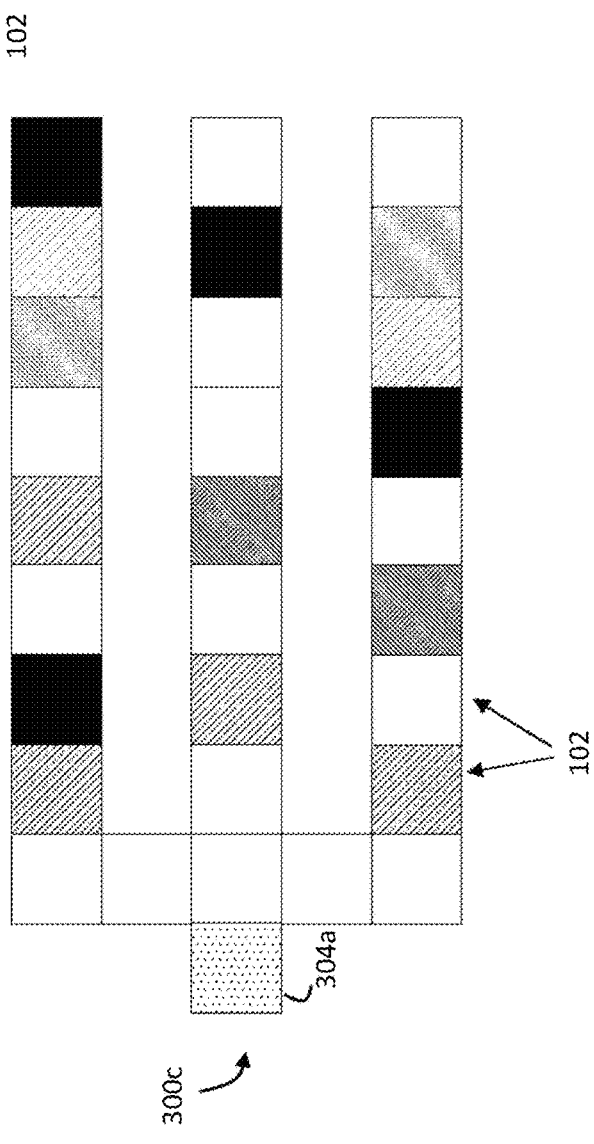

FIGS. 3A-3C provide examples of integrated photonics assemblies, which each include multiple subcircuits 102. In particular, FIGS. 3A-3C illustrate the modular properties of the subcircuits, including how the subcircuits can be arranged (e.g., coupled, connected, stacked, etc.) and how the photonics assembly can be standardized. Note that, in these examples, the subcircuits are configured to be the same size (in at least two dimensions) and shape.

FIG. 3A illustrates a one-dimensional (ID) array 300a (also referred to as 1D-stacking). In this case, light can be transferred left or right (indicated by arrow 302) between at least a subset of the subcircuits 102. The array 300a may begin with a subcircuit 304a and/or end with a subcircuit 304b. In some embodiments, subcircuits 304a and/or 304b may be able to transfer light to one other subcircuit and/or from one edge of the subcircuit. To enable efficient light transfer between two or more subcircuits 102, the position of the light path within the subcircuits can be standardized to increase assembly permutations, as discussed in more detail herein.

FIG. 3B illustrates an example two-dimensional (2D) array 300b of subcircuits, which includes subcircuits configured with light transfer paths oriented up and down (indicated by arrow 306 and referred to as north and south). FIG. 3C illustrates an example "pseudo" 2D array 300c, which can be considered an extension of the 1D array. The example array 300c enables multiple parallel circuits to be connected together without requiring north and south light transfer capability on most subcircuits.

Figure 4:
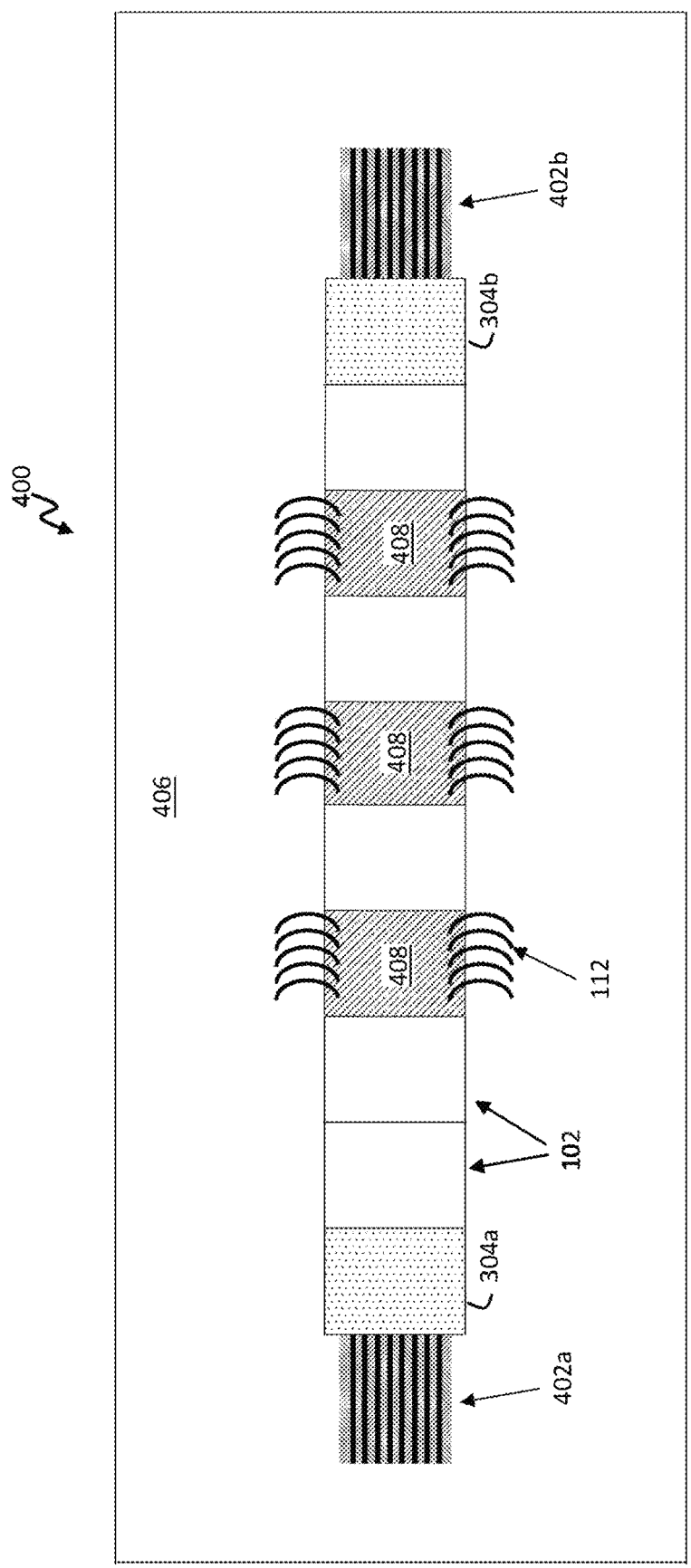
FIG. 4 is a diagram of a top view of an example packaged ID integrated photonics assembly.

FIG. 4 illustrates an example of a packaged ID integrated photonics assembly 400. The assembly 400 includes multiple subcircuits 102, a first fiber array 402a connected to the first subcircuit 304a, and a second fiber array 402b connected to the last subcircuit 304b. Note that a subset of the subcircuits are wirebonded via electrical conductors 112 to the printed circuit board (PCB) 406. Wirebonds 112 can be created during the fabrication and/or assembly process. The electrical wirebonds 112 may be standardized such that they can be connected to a particular type of subcircuit 408. Such subcircuits 408 may be configured to handle both light and electrical current.

Figure 5:
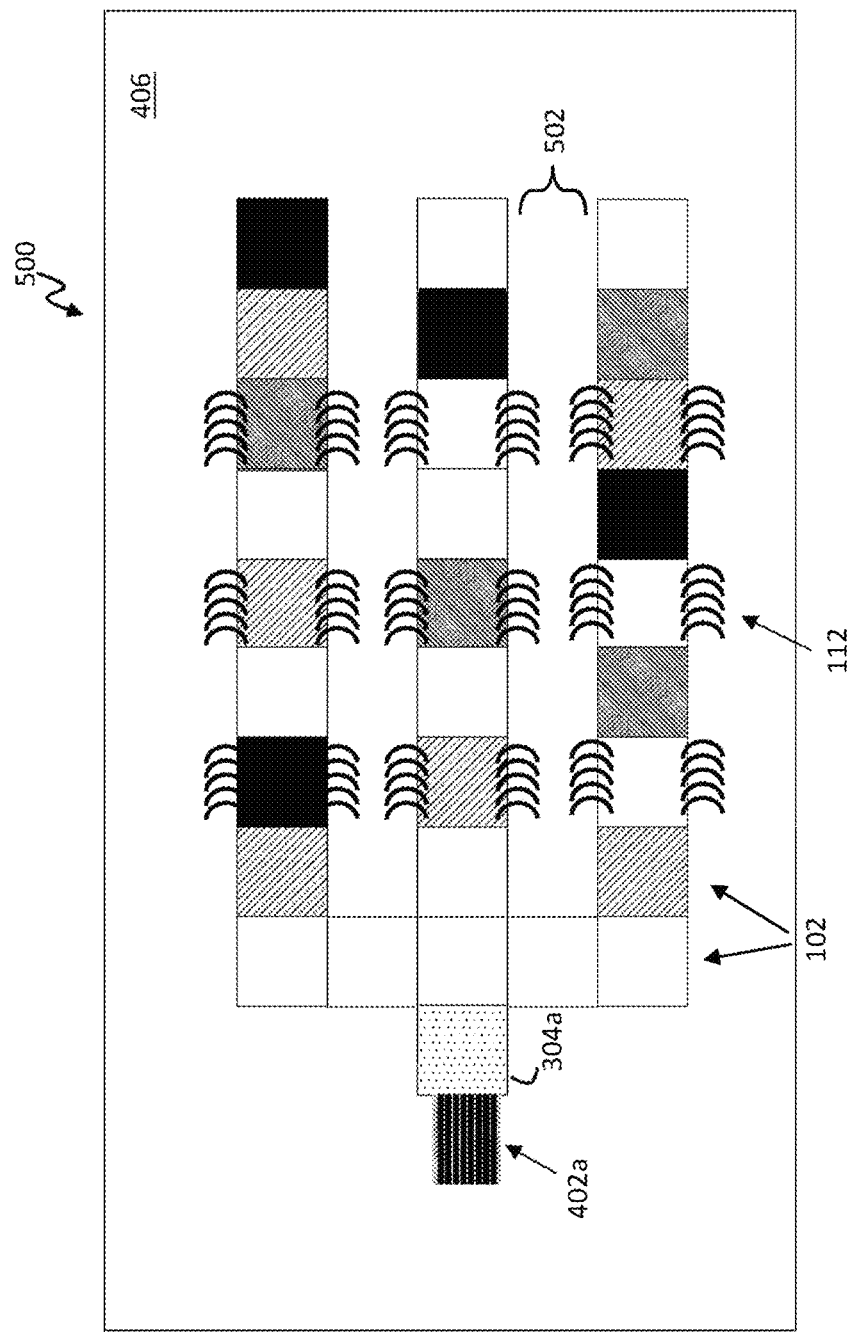
FIG. 5 is a diagram of a top view of an example packaged pseudo-2D integrated photonics assembly.

FIG. 5 shows an example of a packaged pseudo-2D integrated photonics assembly 500. A fiber array 402a is connected to the first subcircuit 304a. In this example, because there are empty spaces 502 between parallel rows of subcircuits, the subcircuits are accessibly wirebonded via wirebonds 404 to the PCB 406. Note that the empty spaces 502 can contribute to the standardization of the host PCB by providing space for electrical pads on the PCB via the empty spaces 502.

The packaged integrated photonics assemblies illustrated in FIG. 4 and FIG. 5 are for illustrative purposes and not for limitations. In real applications, a packaged integrated photonics assembly can be organized into many different 1D, 2D, or even 3D structures and can include a large variety of numbers of subcircuits. In some embodiments, a packaged integrated photonics assembly can be cut to a standard size to facilitate integration, replacement, and the like.

2 Integrated Photonic Systems and Methods for Biosensing

Described herein are various embodiments of integrated photonic systems and methods for biosensing. In some embodiments, integrated photonic biosensors can combine high-sensitivity analysis with scalable, low-cost complementary metal-oxide-semiconductor (CMOS) manufacturing. The biosensors may be implemented in portable, highly-accessible, and easy-to-use devices. Example integrated photonic biosensors can include one or more photonic integrated subcircuits, as described above.

Figure 6:
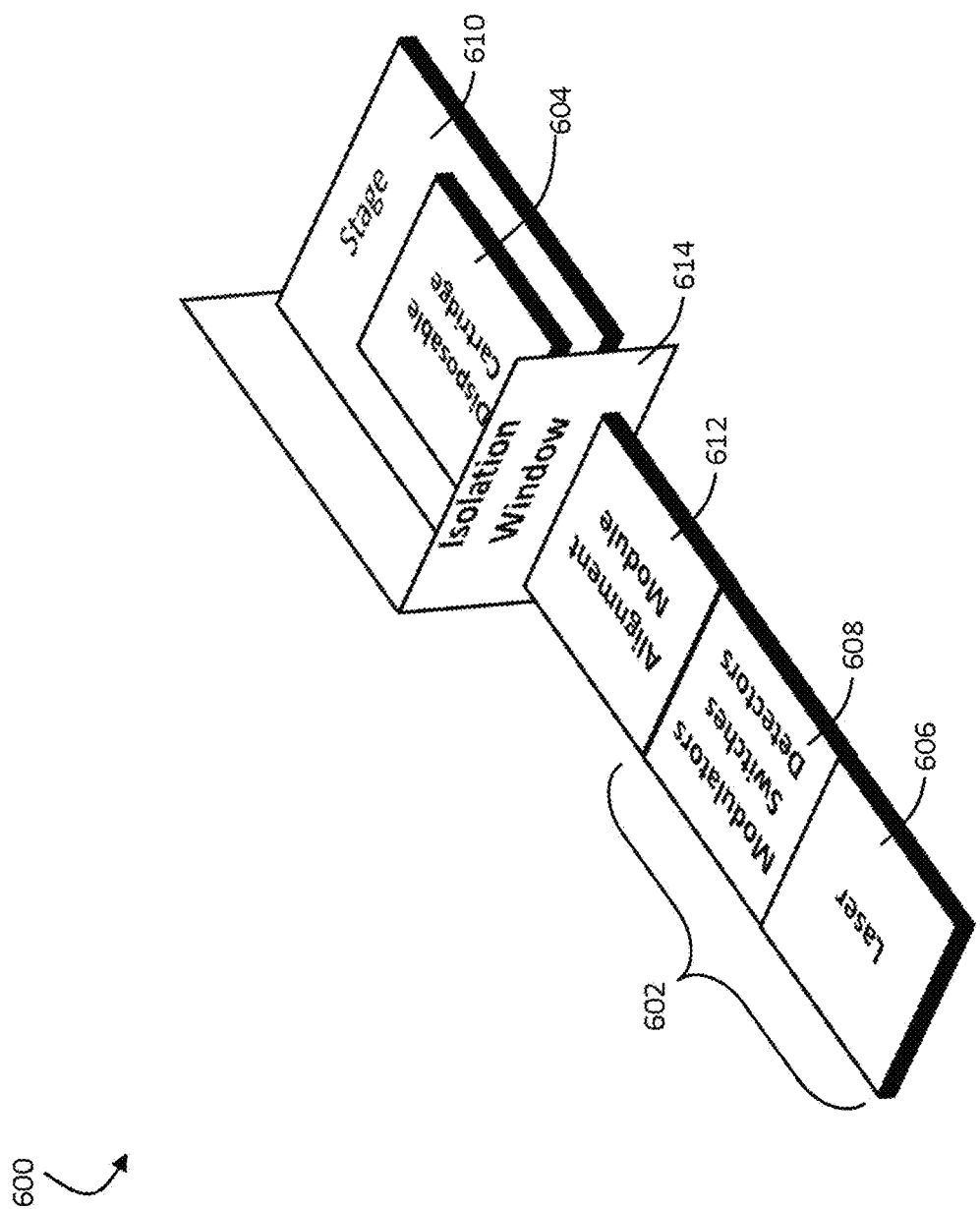
FIG. 6 is a diagram of an integrated photonic system for biosensing including an interrogator and cartridge.

FIG. 6 illustrates an embodiment of an integrated photonic system 600 for biosensing including an interrogator (or "optical reader") 602 and cartridge 604. The interrogator 602 may be an assembly including one or more photonic integrated subcircuits, which may each be active or passive. These subcircuits may be packaged together or may be modular. The interrogator 602 may include a light source 606 (e.g., a laser) configured to generate a light. A photonic integrated subcircuit may be edge-coupled to the light source 606 and can include one or more light paths (e.g., waveguides) configured to carry light. The interrogator 602 can include a control circuit 608 to control the light in the light paths of the interrogator 602. In some embodiments, the interrogator 602 may be coupled to an interface to provide an electronic and/or visual readout to a user of the system 600.

The interrogator 602 can be optically coupled to the cartridge 604. The cartridge 604 can be configured to receive a biological sample (e.g., a biological fluid). The light from the interrogator 602 can be used to determine one or more characteristics of the biological sample in the cartridge 604. In some embodiments, the cartridge 604 includes a sensor photonic integrated subcircuit (also referred to as a "sensor subchip," "sensor chiplet" or simply as "sensor"). In some embodiments, the cartridge 604 includes a sensor photonic integrated circuit (also referred to as a "sensor PIC" or "sensor assembly").

In some embodiments, the cartridge 604 includes a microfluidic cell. The microfluidic cell may include one or more proteins (e.g., antigens), one or more reagents, one or more rinsing fluids, etc. The microfluidic cell may include a magnetic microstirrer, a plasmonic vortex mixer, and/or a flow-inducing device. For example, the microfluidic cell may leverage a mixing mechanism or a flow-inducing mechanism to ensure sufficient interaction between the analyte and the sensor chiplet surface. In some embodiments, the microfluidic cell may include a microstirrer and a transmitter (e.g., a magnetic field generator) configured to power the magnetic microstirrer. Note that the cartridge 604 can be separately packaged (e.g., in a housing) from the other components in the system 600.

In some embodiments, a cartridge does not include any microfluidic cells, does not control or use any microfluidic cells to promote interaction between the analyte and the sensor chiplet surface, is not in fluid communication with any microfluidic cells, and/or does not have a microfluidic cell disposed between the sensor chiplet surface and the sample (or interstitial fluid). Such cartridges may be referred to herein as non-microfluidic cartridges. When a non-microfluidic cartridge is used, interaction between the analyte and the sensor chiplet surface may be induced by immersing the sensor chiplet in the interstitial fluid or sample of interest. In some cases, further interaction between the analyte and the sensor chiplet surface may be induced by shaking, stirring or otherwise inducing flow of the sample, or by shaking the sensor chiplet. One of ordinary skill in the art will appreciate that a non-microfluidic cartridge can be coated with one or more materials that facilitate interaction between the analyte and the sensor chiplet surface.

In some embodiments, system 600 can include a stage 610 configured to removably engage the cartridge 604. For instance, the cartridge 604 may be positioned such that it is temporarily secured (e.g., mechanically) on the stage 610. The stage 610 may facilitate alignment (e.g., mechanically) of a light path of the interrogator 602 and the light path of the cartridge 604. In some embodiments, the stage 610 can include a thermoelectric heater and/or thermoelectric cooler.

Figure 7:
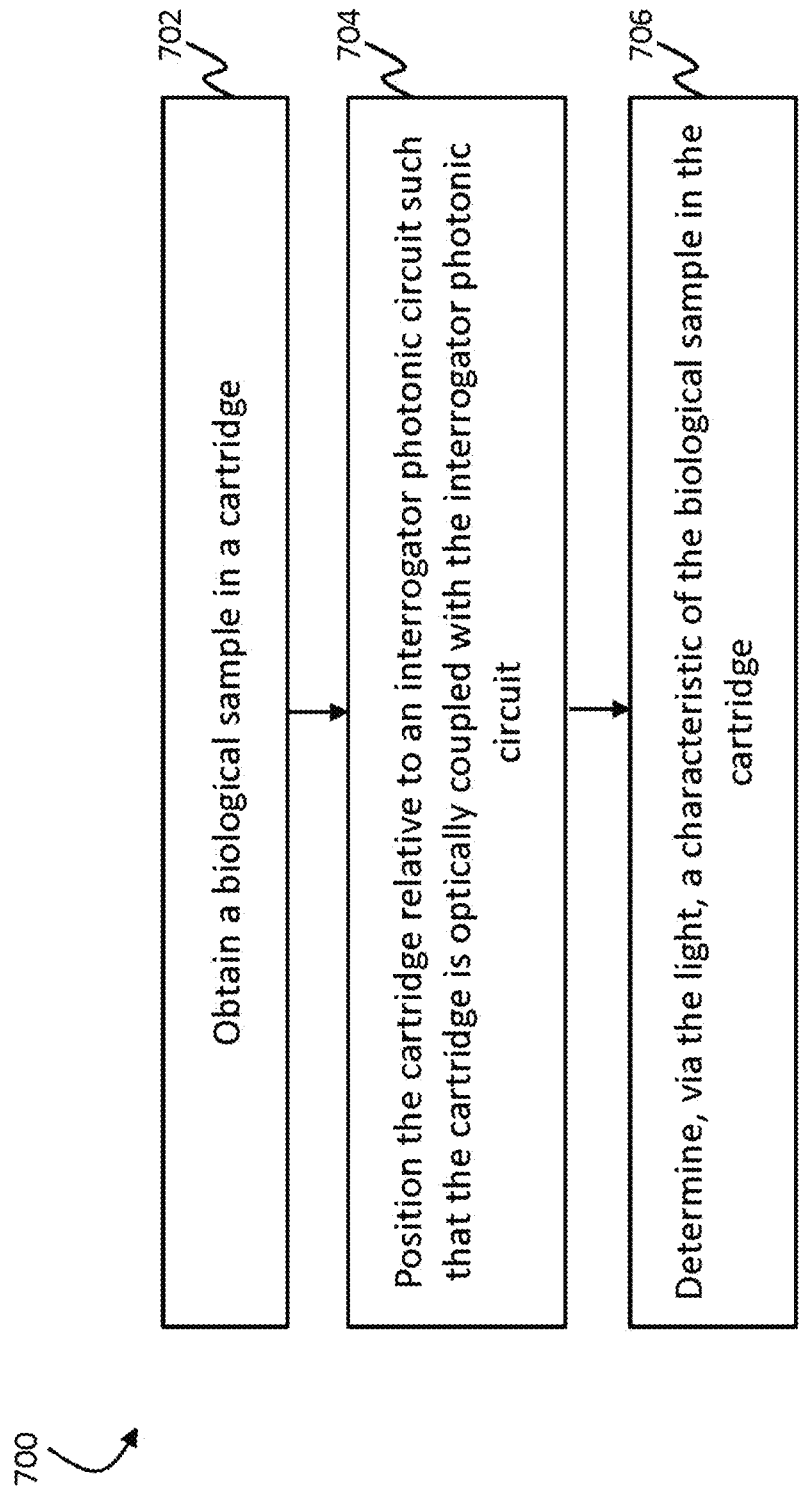
FIG. 7 is a flowchart of a method for biosensing utilizing the integrated photonic system.

FIG. 7 illustrates a method 700 for biosensing utilizing the integrated photonic system 600. In step 702, a biological sample is obtained in the cartridge 604. In step 704, to sense a characteristic of the biological sample (e.g., perform a test), a cartridge 604 is positioned onto the stage 610. The cartridge 604 can be positioned such that it is optically coupled with the interrogator 602. Note that the biological sample may be loaded into the cartridge 604 before or after the cartridge is placed 604 onto the stage 610. In step 706, the light source 606 can be activated to determine a characteristic of the biological sample in the cartridge 604, as described in further detail below.

In some embodiments, system 600 can include an alignment module 612 configured to facilitate alignment between a light path of the interrogator 602 and a light path of the cartridge 604 (e.g., a light path of the sensor chiplet). The alignment module 612 may be physically adjacent to the interrogator 602 or to the cartridge 604.

The cartridge 604 may be positioned such that a light path of the cartridge 604 is aligned with a light path of the interrogator 602. For example, the cartridge 604 is aligned to the alignment module 612 for horizontal optical coupling (e.g., in the plane of the subchip or chiplet). In some embodiments, the alignment may be active, e.g., by monitoring an optical response. In some embodiments, the alignment may be passive using mechanical alignment features of the cartridge 604, sensor chiplet, and/or stage 610. After this initial alignment, adjustments may be made to the optics in the alignment module 612 to increase coupling efficiency. For example, desirable coupling efficiency between the cartridge 604 and the interrogator 602 may be at least 10%, at least 20% at least 50%, at least 60%, at least 70%, at least 80%, at least 90%, at least 95%, etc.

Figure 8:
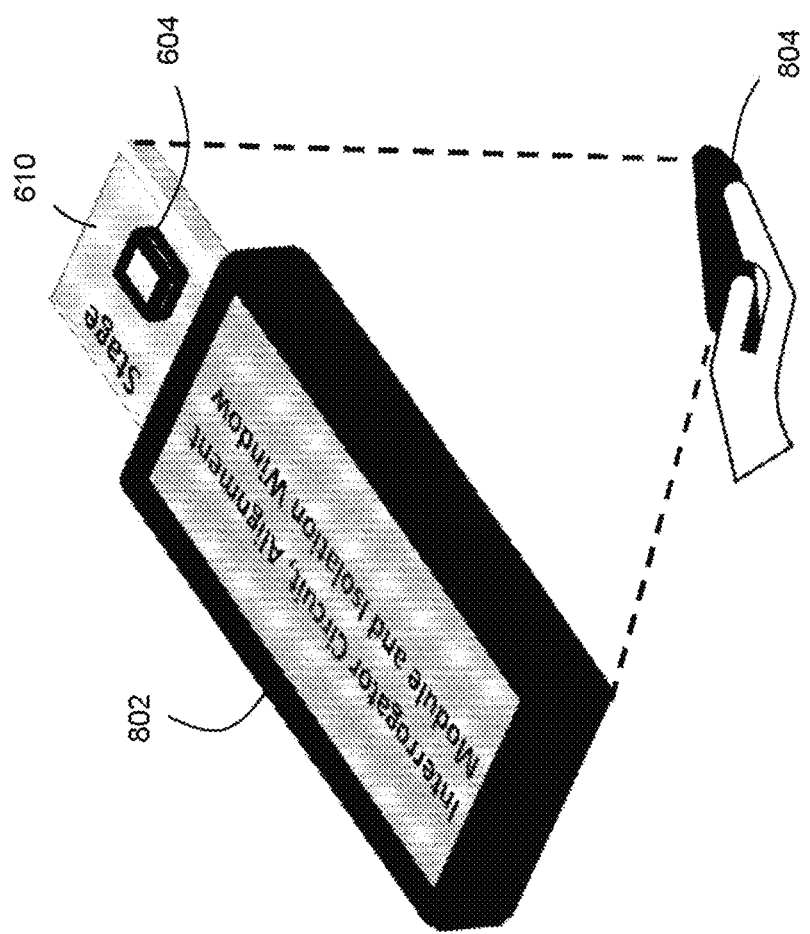
FIG. 8 is a diagram of a packaged integrated photonic system for biosensing.

Note that the interrogator 602 and other components can be reused to analyze biological samples sensed via the cartridge 604. The cartridge 604 may be disposable after use by a single biological sample. In some embodiments, to prevent contamination, the cartridge 604 and/or stage 610 may be physically separated from the alignment module 612 and interrogator 602 by a transparent window 614 (also referred to as an "isolation window") to ensure no physical cross contamination. Referring to FIG. 8, In some embodiments, the interrogator-side components 802 may be packaged together in a single housing and referred to as an "optical reader." The optical reader 802 can include the interrogator circuit 602, alignment module 612, and/or isolation window 614. The optical reader 802 and the cartridge-side components (e.g., cartridge 604 and/or 610) may be configured into a handheld apparatus 804, as described in further detail below. Due to horizontal optical coupling, compact footprint, and disposability of the cartridge 604, the arrangement described above enables an inexpensive, handheld point-of-care device.

Figure 9:
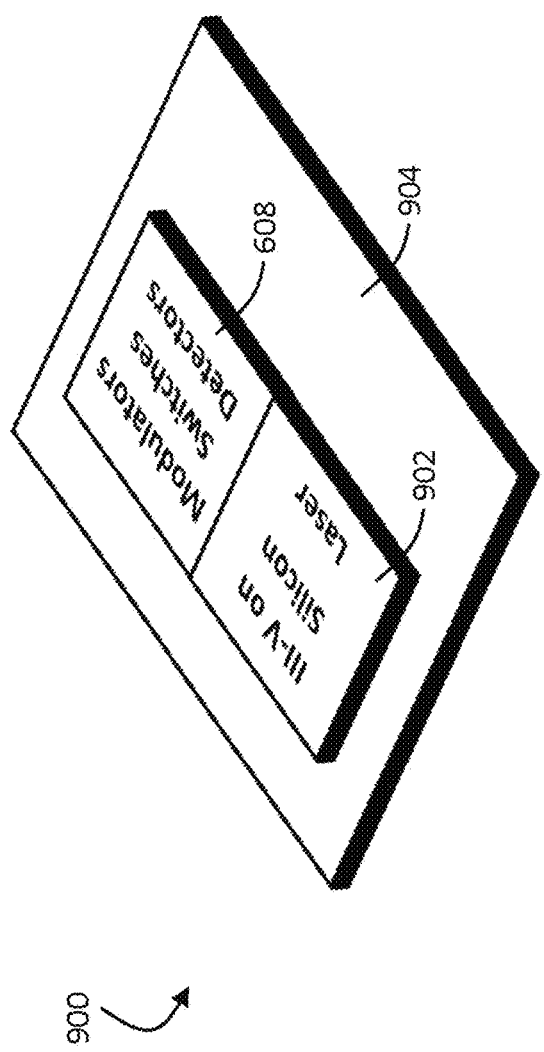
FIGS. 9-10 are diagrams of embodiments of an interrogator.
Figure 10:
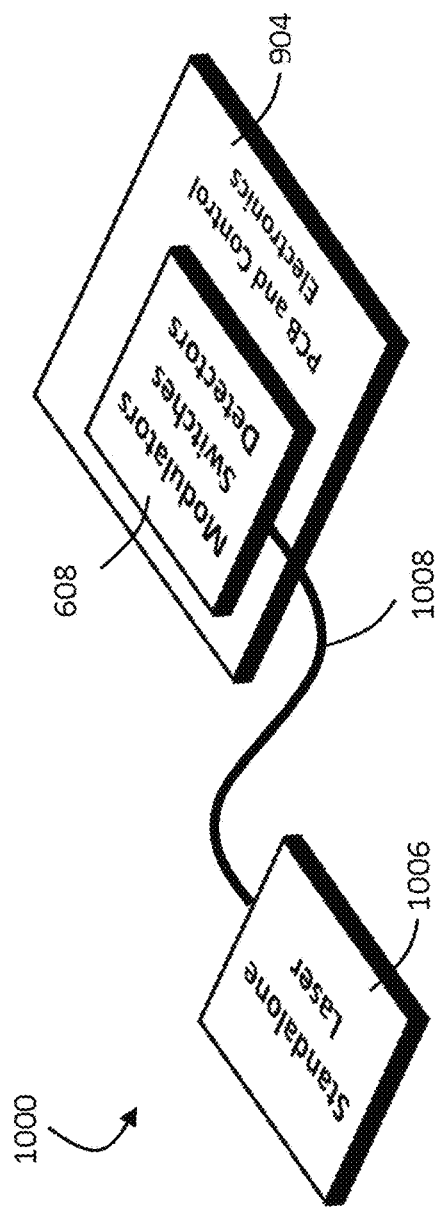

FIGS. 9-10 illustrate embodiments of interrogator 602. In example interrogator 900, the light source 902 (e.g., laser of a III-V on silicon type chip) is edge-coupled to the control circuit 608. The light source 902 and control circuit 608 can be assembled on a PCB 904. This configuration may be referred to as "on-chip laser." In example interrogator 1000, the light source 1006 is a standalone laser connected to the control circuit 608 by an optical fiber 1008. This configuration may be referred to as "off-chip laser."

Example alignment modules 612 may be assemblies that include photonic integrated circuits with edge couplers, grating couplers, micro-electromechanical system (MEMS) mirrors, phased arrays, lenses, and/or fiber arrays. The alignment module 612 can facilitate the optical coupling between the interrogator 602 and the sensor chiplet of the cartridge 604. Once the cartridge 604 is mechanically aligned on the stage 610, the interrogator 602 searches for an optical response from alignment optics on the sensor chiplet (of the cartridge 604) and/or the cartridge 604. The interface of the alignment module 612 can send a signal to determine alignment. The same interface, through the same or different ports, can receive a signal back.

The interface can include an array of edge couplers, a 2D fiber array, a 2D phased array of grating couplers, etc.

In some embodiments, active switches on the alignment module 612 are tuned to send the signal, e.g., through different output couplers or fibers and/or at a different angle from the phased array. Depending on the captured response, the switches may be tuned to optimize (e.g., increase) coupling. In some embodiments, in place of a phased array, MEMS mirrors may be employed to beam-steer. The stage 610 may have active mechanical alignment capability via micro-actuators. The micro-actuators may also be driven using feedback from the alignment module 602. In order to improve coupling, a ball lens or other lens may be employed to focus the light exchanged between the alignment module 612 and the sensor chiplet or cartridge 604. In some embodiments, this lens may also be moved using micro-actuators to improve optical alignment.

Figure 11A:
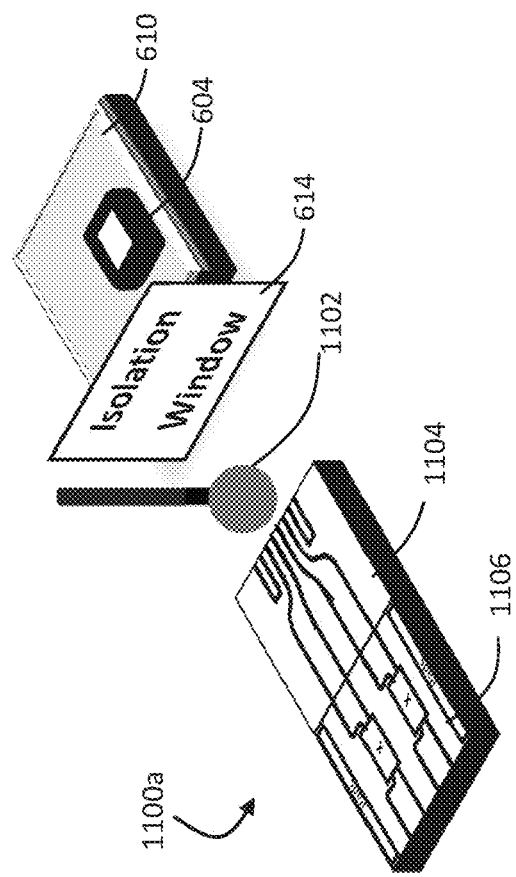
FIGS. 11A-11C are diagrams of embodiments of an alignment module.
Figure 11B:
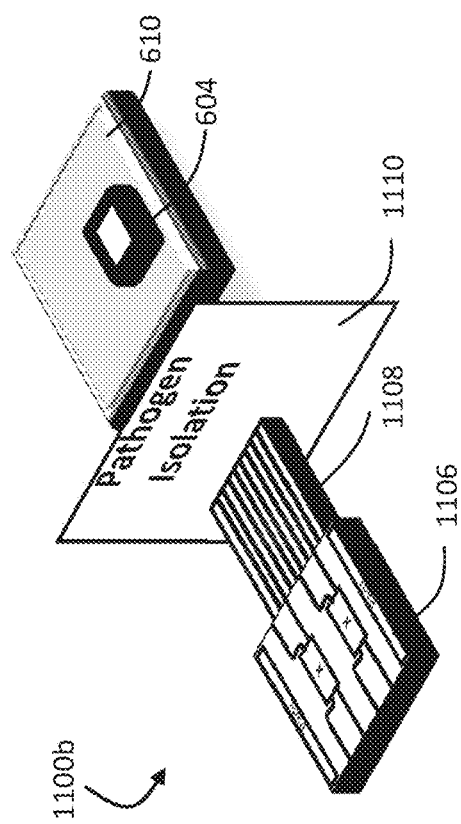
Figure 11C:
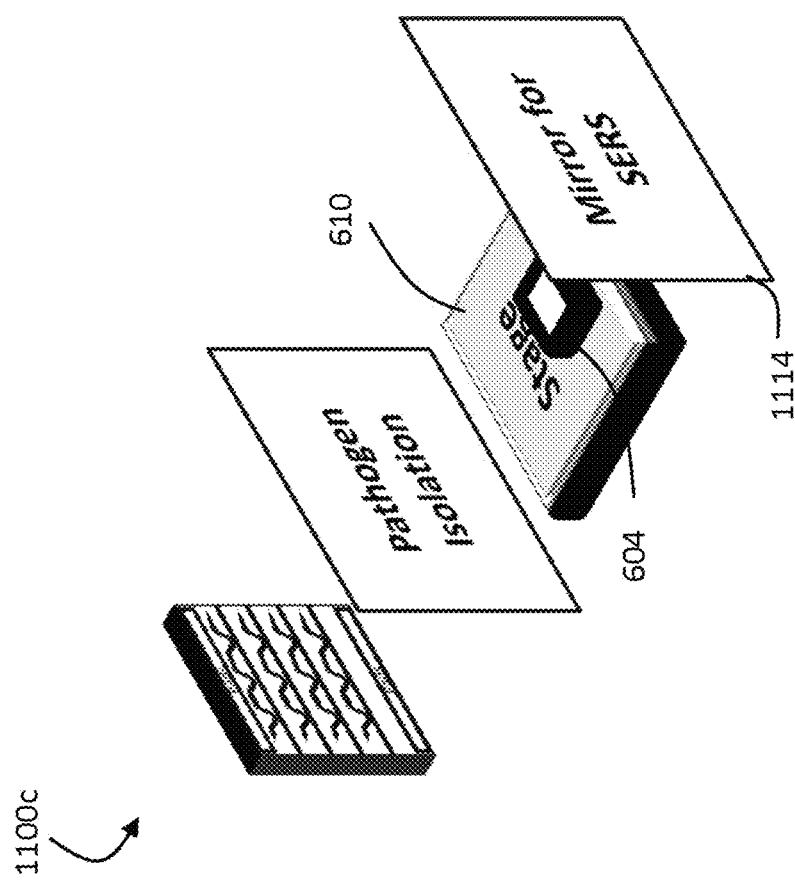

FIGS. 11A-11C illustrate embodiments of an alignment module. FIG. 11A illustrates an alignment module 1100a including one or more lenses configured to focus light between the interrogator 602 and the cartridge 604. For example, the lens can be a ball lens 1102 that can be adjusted in one or more axes (e.g., by an actuator). The alignment module 1100a may include an edge coupler array 1104 edge-coupled with a switch network 1106. FIG. 1 IB illustrates an alignment module 1100b including a switch network 1106 connected to a fiber array 1108. Note that some embodiments may include a pathogen isolation barrier 1110. This barrier can be used to isolate the cartridge 604 and/or stage 610 from the interrogator 602 and/or alignment module 612 (e.g., to avoid contamination if infectious pathogens are present, to allow for sterilization or cleaning if needed, etc.). The barrier 1110 can be transparent in the relevant wavelength range (e.g., UV-visible or infrared). FIG. 11C illustrates an alignment module 1100c that includes a phased array beam-steering chip or a MEMS beam-steering chip 604. This embodiment may include a mirror 1114 for surface-enhanced Raman scattering (SERS).

Figure 12:
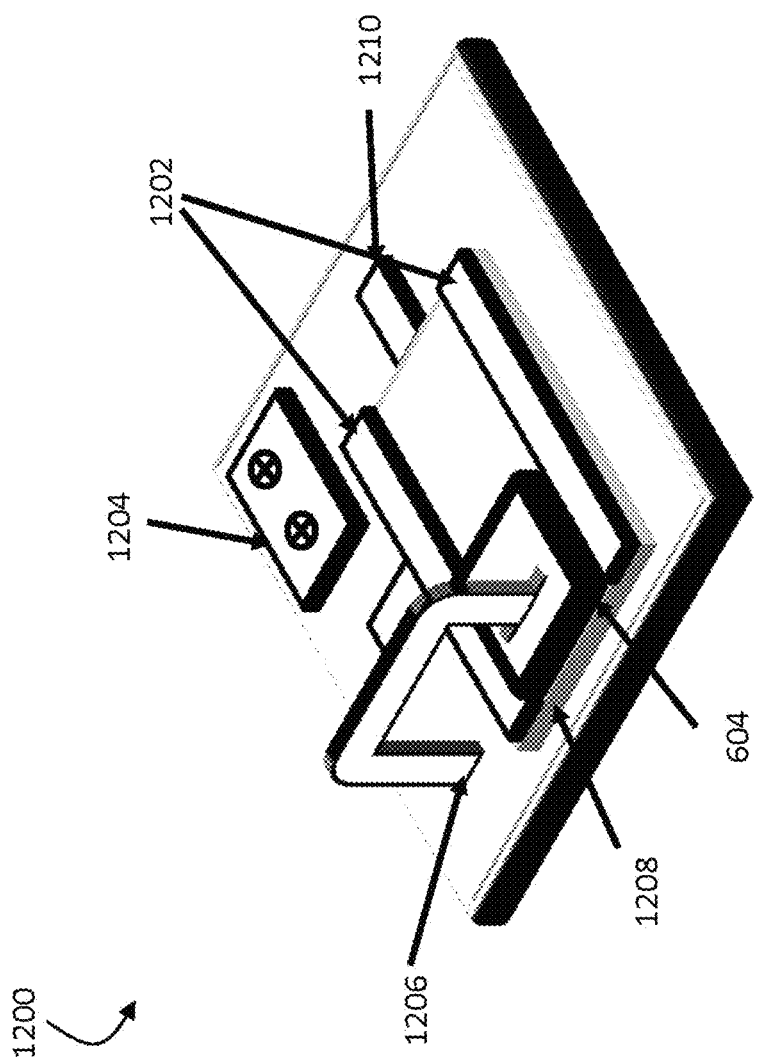
FIG. 12 is a diagram of an embodiment of a stage, which enables the efficient and easy replacement and/or alignment of the cartridge.

FIG. 12 illustrates an embodiment of a stage 1200, which enables the efficient and easy replacement and/or alignment of the cartridge 604. Passive alignment features 1202 on the stage 1200 can be used to precisely align the cartridge 604. In some embodiments, active micro actuators are used to improve mechanical alignment. In some embodiments, a piezoelectric device 1210 may be used for mechanical alignment. Alignment that is not accomplished by the stage 1200 may be compensated for electro-optically in the alignment module 612. For example, the alignment module 612 can be configured to ensure that light passes from the interrogator 602 to the sensor chiplet and then return to be detected (by the interrogator 602). In some embodiments, the sensor chiplet includes and/or is coupled to a microfluidic cell. Further, the stage 1200 may include a microfluidic cell that accepts test chiplets, or connections for the microfluidic cell that may be included on the sensor chiplet. The stage 1200 may include a pump 1204 that can drive flow in the microfluidic cell. The stage 1200 may have a source of varying magnetic fields to power magnetic stirring (e.g., via magnetic mixer 1206) in the microfluidic cell. The stage 1200 may be adapted to perform PCR and other reactions requiring temperature control (e.g., by a controller 1208) via temperature cycling provided by built-in thermoelectric heaters and/or coolers. Electrical connections may be built into the stage 1200 to power heaters or other electronics on the cartridge 604 or sensor chip (via the cartridge 604). The stage 1200 may be configured to accept multiple cartridges 604. The stage 1200 may be configured to discard a cartridge 604 after use and, In some embodiments, replace it with another one automatically (e.g., via a robotic arm, as described further herein).

Figure 13:
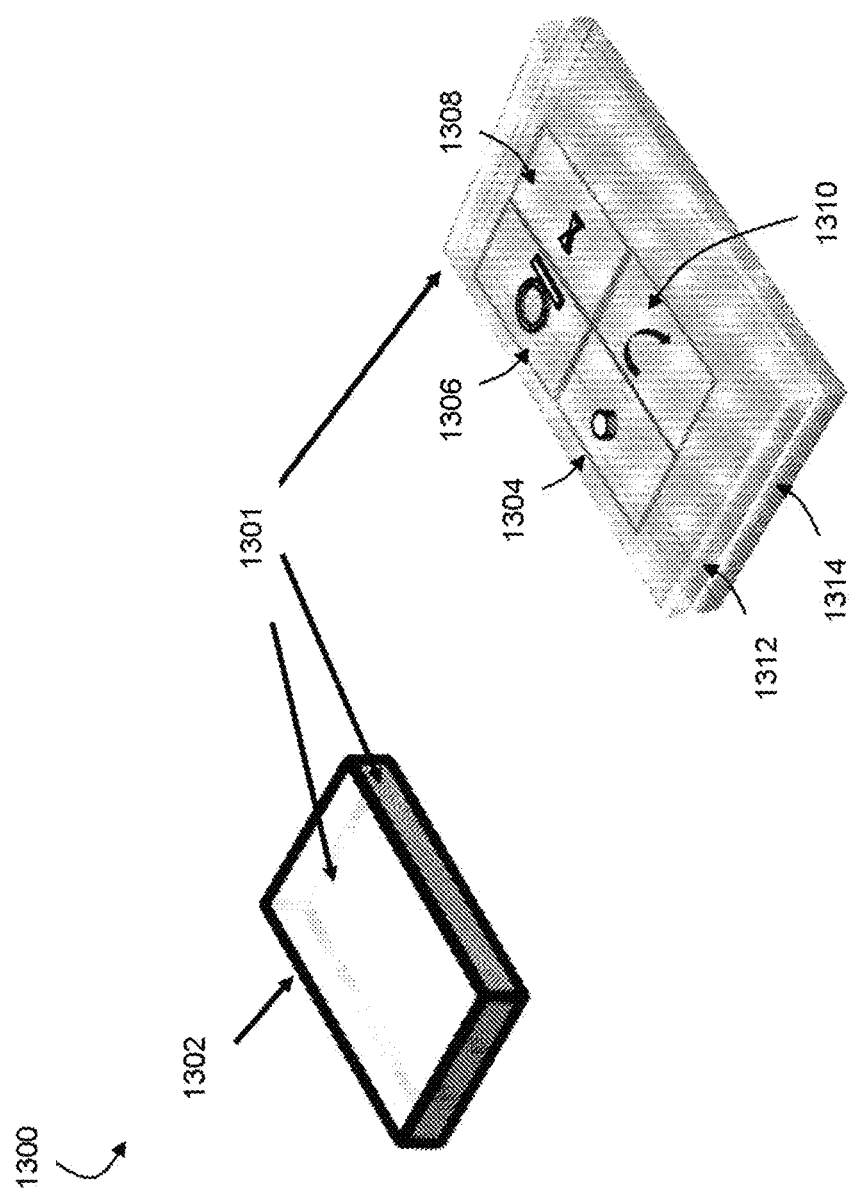
FIG. 13 is a diagram of an example cartridge, which may be an assembly including a sensor chiplet and one or more microfluidic cells.

FIG. 13 illustrates an example cartridge 1300, which may be an assembly including a sensor chiplet and one or more microfluidic cells. In some embodiments, the housing of the cartridge 1300 can be configured to house any sensor chiplet and, optionally, one or more microfluidic cells with compatible features and/or sizes. The cartridge 1300 may be configured to house a plurality of sensor chiplets and, optionally, microfluidic cells 1301. For example, the housing 1302 can have mechanical alignment features so as to align with the interrogator 602 and/or stage 610. There may be multiple configurations of cartridges 1300, in which each configuration may support different types of sensor chiplets and/or microfluidic cells. The cartridge 1300 may have connection ports for electronic connections from the stage 610. An electrical connection to cartridge 1300 may be made for electrochemical sensing simultaneously with optical connection. The cartridge 1300 may have microfluidic input and/or output ports.

The example cartridge 1300 includes a microfluidic cell, a one-way analyte input 1304, a photonic sensor array 1306, reagents 1308, and a mixing device 1310 (e.g., a magnetic input or output, pump input or output, etc.). The cartridge 1300 may be made of, at least in part, silicon, silicon nitride, porous silicon, thin film gold on SiO2, or other chip materials. The cartridge 1300 may be adapted to one of many labeled and label-free biosensing tests via a microfluidic cell 1312 on top of the sensing surface 1314.

As illustrated in FIG. 13, the microfluidic cell 1312 may be directly on top of the sensor chiplet 1314. In other embodiments, the microfluidic cell 1312 may be integrated into the cartridge and receive the sensor chiplet 1314. The microfluidic cell 1312 can be used to receive the analyte, which may be delivered through a scalable one-way input 1304 to ensure pathogen isolation, may deliver reagents 1308 to the sensing components on the sensor chiplet 4515, and/or may mix or flow (e.g., via mixing device 1310) the analyte to ensure sufficient and fast interaction between the analyte and the sensor chiplet surface 1314. An input and output port may be included to receive reagents 1308 or for pumping using an external pump on the stage 610. The microfluidic cell 1312 may include a paper or other component to create flow using capillary forces. The microfluidic cell 1312 may apply heat by light (e.g., via plasmonic antennas) or micro-electric heaters (e.g., on the sensor chiplet 1314). The microfluidic cell 1312 may generate vortex mixing or include magnetic micro-mixing components (e.g., those made by Redbud Labs, Inc. of Research Triangle Park, North Carolina, USA). In some embodiments, the microfluidic cell 1312 is fabricated in many copies onto an entire wafer of sensor chiplets 1314, and then diced along with the underlying wafer. This enables wafer scale fabrication of the sensor chiplet 1314 and microfluidic cell 1312 together.

2.1 Mechanical and User Interface Implementations

In the following, implementations of the integrated photonic biosensing systems are provided. Such implementations may include portable or tabletop systems and may be referred to as the "Pandemic Response Optical Biosensor Engine," "PROBE," or "photonic biosensing platform." For example, these photonics-based sensing systems and methods can be used as part of a rapid, point-of-care medical diagnostics platform.

Figure 14:
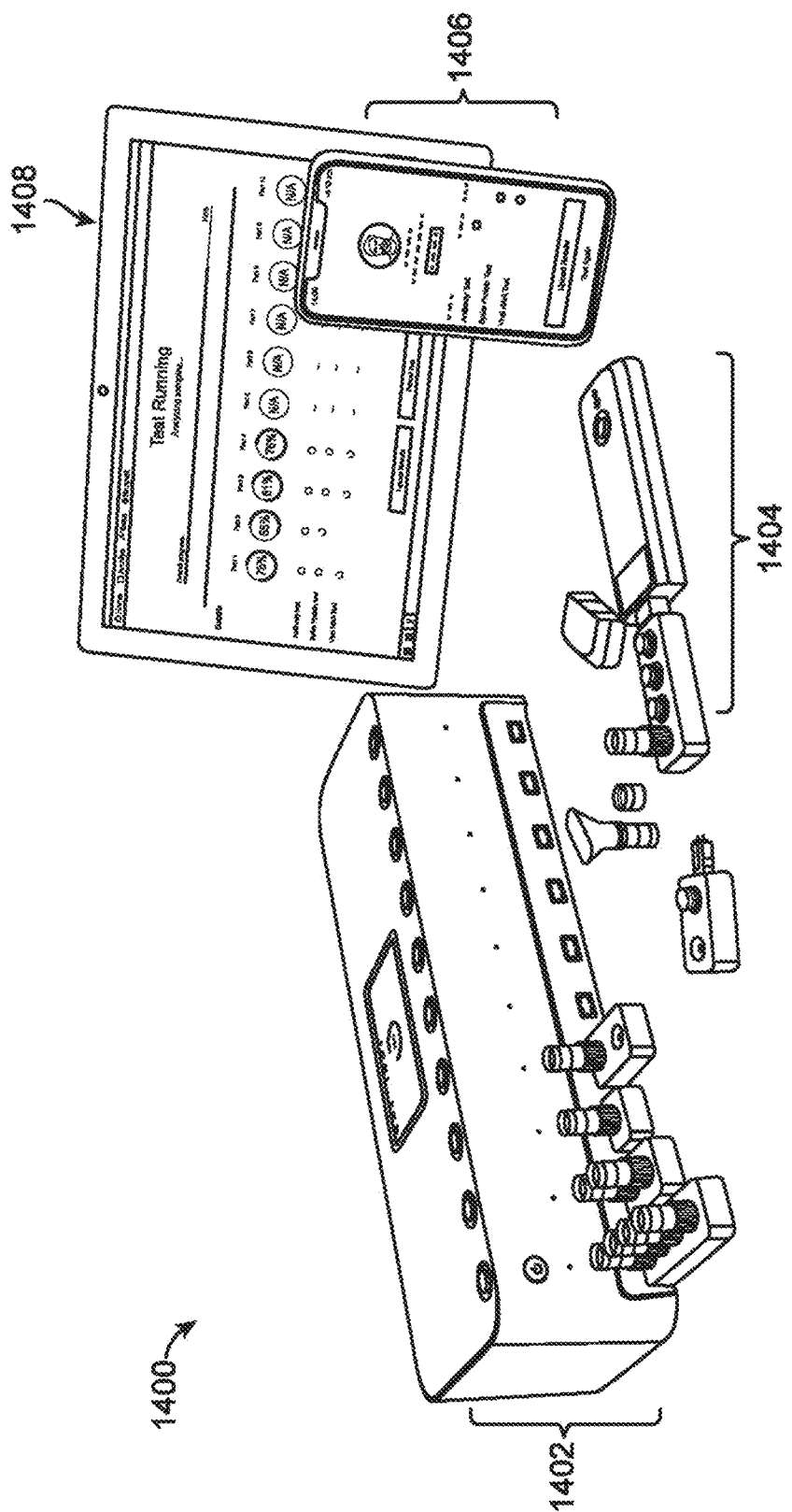
FIG. 14 is a perspective rendering of various components associated with the photonic biosensing platform.

FIG. 14 illustrates various components associated with the photonic biosensing platform. As described in further detail below, the example platform 1400 can include tabletop apparatus 1402, handheld probe apparatus 1404, and display and related software 1406 to monitor and communicate real-time testing results. In some embodiments, the platform 1400 may include an additional interface 1408 for presenting the same or different information as the display 1406.

Figure 15:
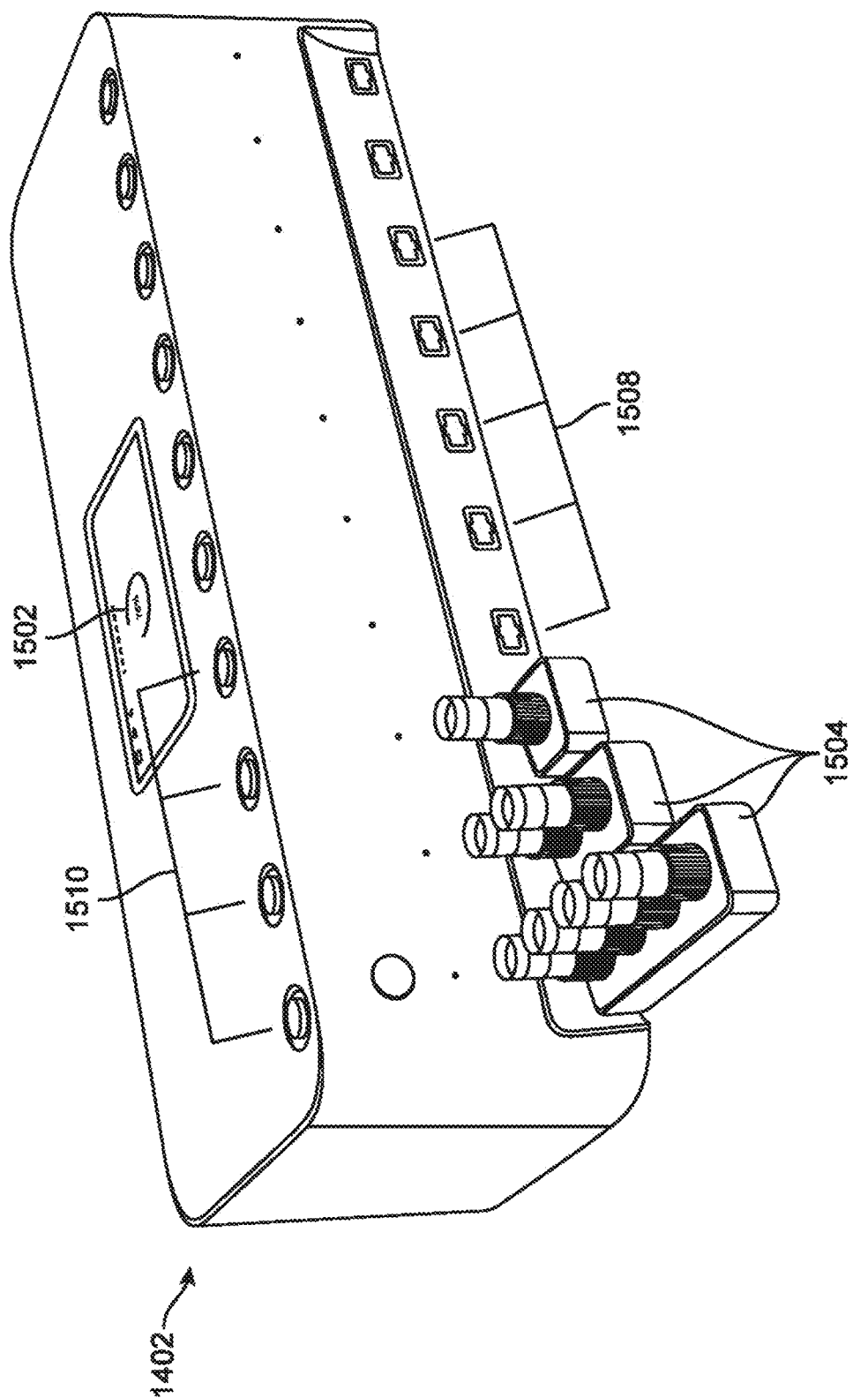
FIG. 15 is a perspective rendering of the example tabletop apparatus of FIG. 14, including a display, disposable test cartridges, apparatus input ports, and buttons.

FIG. 15 illustrates the example tabletop apparatus 1402, including display 1502, disposable test cartridges 1504, apparatus input ports 1508, and buttons 1510. The example display 1502 can be configured to communicate testing results in real-time or near real time to a user of the platform. The disposable cartridges 1504 can be used to test biological samples including, e.g., saliva, blood, urine, mucus, nasal swab sample, etc. The input ports 1508 can be configured to connect and align cartridges 1504 to the tabletop apparatus 1402. The tabletop apparatus 1402 is configured to interrogate the cartridges 1504 using the methods described herein. For example, a user can initiate the testing in a particular cartridge or set of cartridges 1504 by pushing the button 1510 associated with the input port. Note that the apparatus 1402 can be configured to test multiple samples (e.g., in respective cartridges 1504) in parallel.

Figure 16:
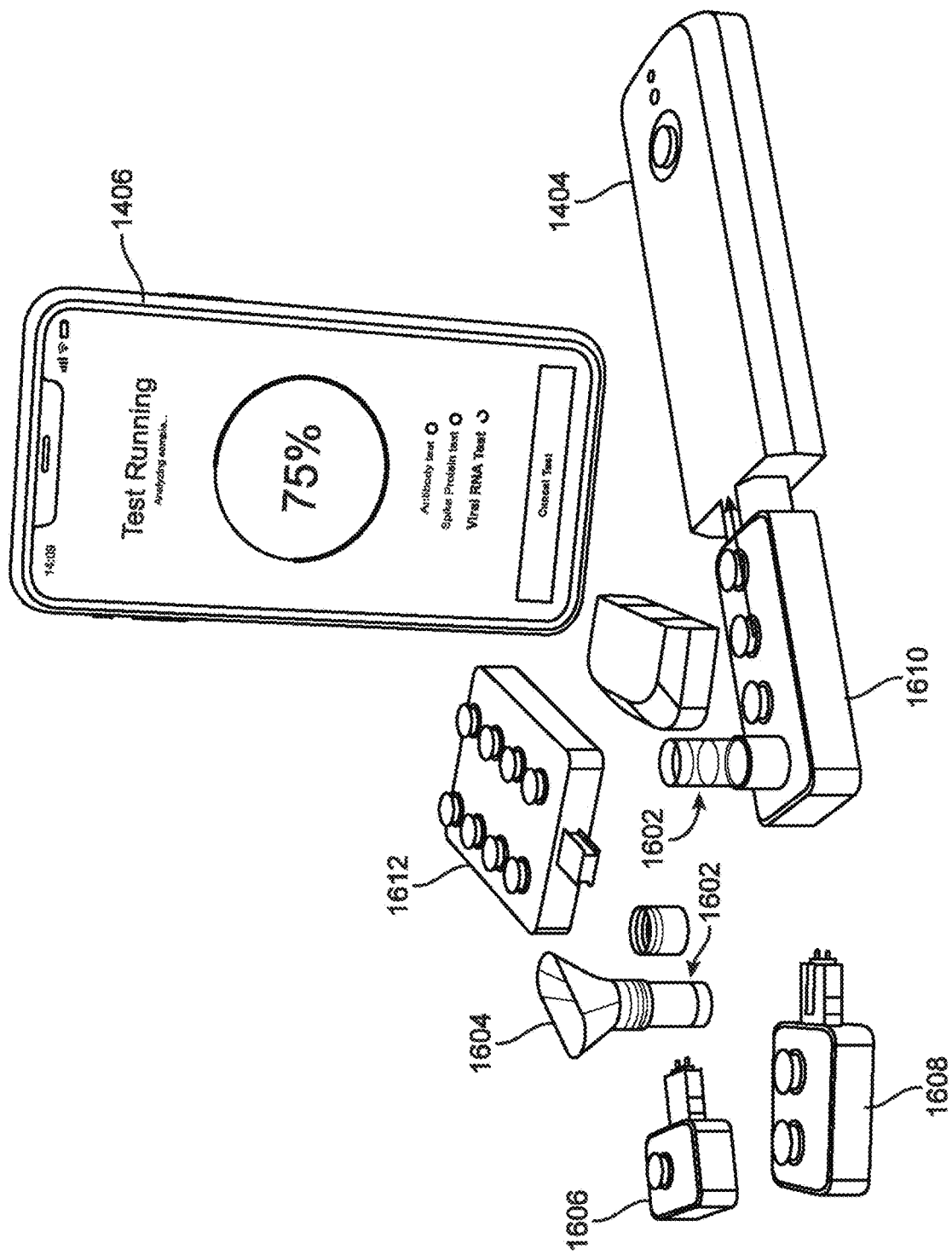
FIG. 16 is a perspective rendering of the example portable apparatus of FIG. 14, and related components, and the display and related software of FIG. 14.

FIG. 16 illustrates the example portable apparatus 1404, and related components, and the display and related software 1406. The portable apparatus 1404 can be a handheld device configured to test a single cartridge 1504 at a time. In some embodiments, the apparatus 1404 can be configured to test more than one cartridge 1504 at a time. As illustrated the portable apparatus 1404 has one input port for cartridge 1504. Each cartridge 1504 can hold one or more tubes 1602 to hold the biological sample. For example, cartridge 1606 can hold a single tube 1602, cartridge 1608 can hold two tubes 1602, cartridge 1610 can hold four tubes 1602, and cartridge 1612 can hold eight tubes 1602. One or more tubes 1602 of biological sample can be in contact with a sensor chiplet and/or a microfluidic cell, as described above. In some embodiments, a collection funnel 1604 can be fitted to the cartridge 1504 to facilitate collecting of the biological sample. The apparatus 1404 can include a communication module (e.g., via Bluetooth, Wi-Fi, RFC, radio, etc.) configured to communicate with the mobile device 1406. An application on the mobile device 1406 can be configured to process information from the apparatus 1404 to monitor and/or display the test status and/or results.

Figure 17:
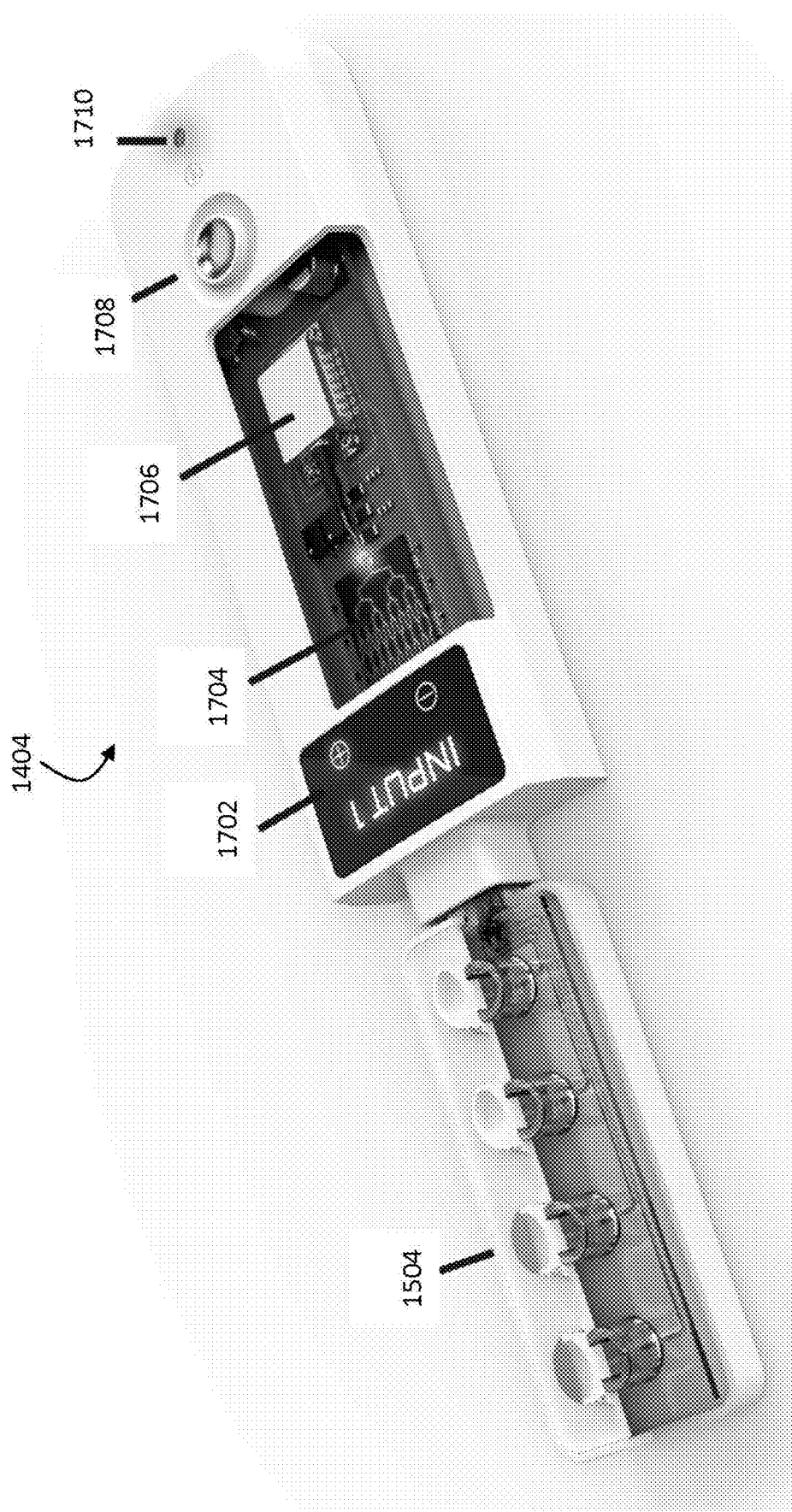
FIG. 17 is a perspective rendering of the example handheld apparatus of FIG. 14 optically coupled to a cartridge.

FIG. 17 illustrates the example handheld apparatus 1404 optically coupled to cartridge 1504. The apparatus 1404 includes a display 1702, one or more waveguides 1704, a light source 1706, a heating pad 1708, and a status indicator 1710. The display 1702 can be configured to confirm proper insertion (e.g., including alignment) of the test cartridge 1504 into the apparatus 1404. For example, the display 1702 can indicate with a light (e.g., LED), color, text, etc. whether the cartridge 1504 is properly fitted. As described above, the light source 1706 provides a light to the waveguides 1704 to be used for sensing (e.g., by the sensor chiplet) at the test cartridge 1504.

Figure 18:
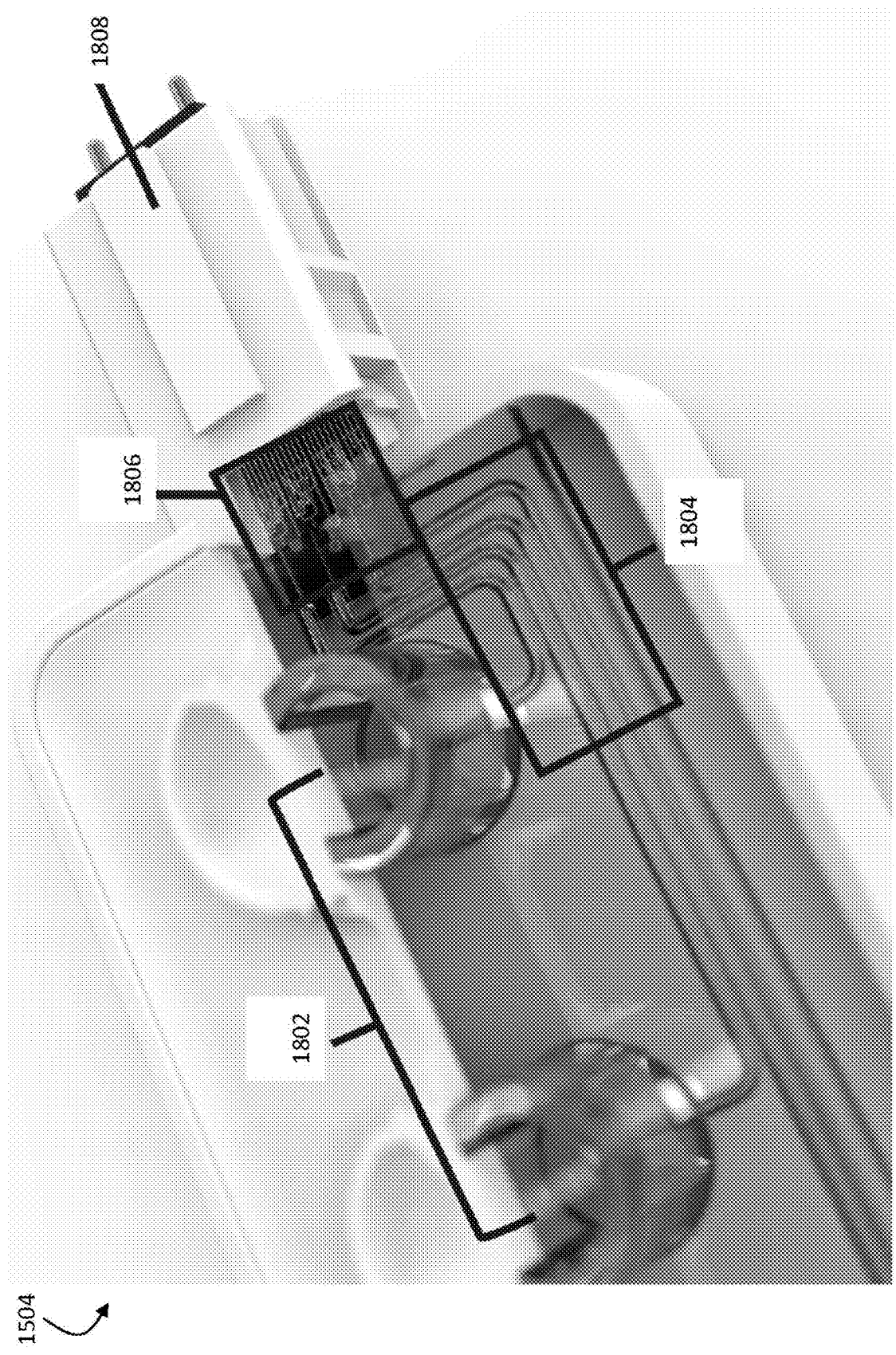
FIG. 18 is a close-up view of an example cartridge of FIG. 15 configured to be inserted into the tabletop apparatus or handheld apparatus.
Figure 19B:
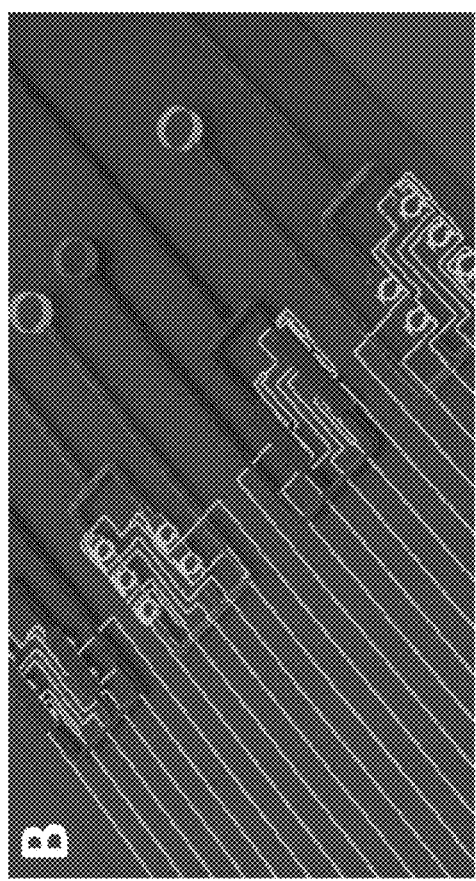
FIGS. 19A-19D are renderings of four implementations of a biosensor chip with microfluidics that may be used within a test cartridge.
Figure 19D:
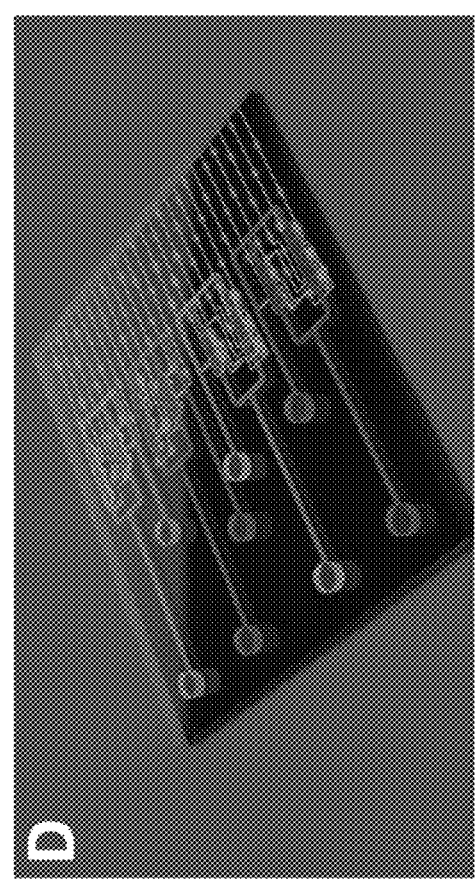
Figure 19A:
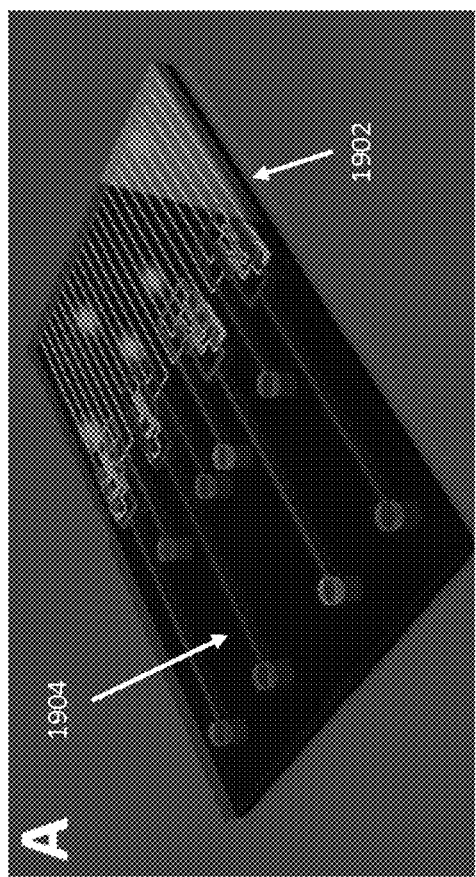
Figure 19C:
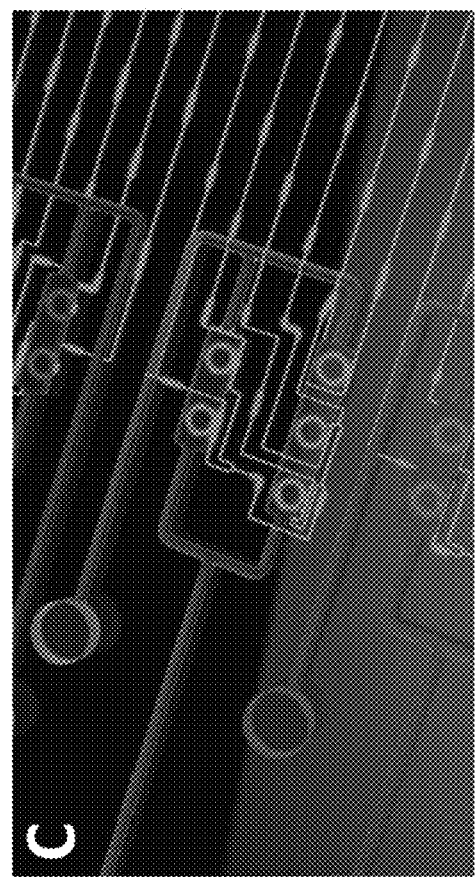

FIG. 18 illustrates a close-up view of example cartridge 1504 configured to be inserted into the tabletop apparatus 1402 or handheld apparatus 1404. In some embodiments, the disposable test cartridge 1504 may include lyophilized CRISPR compounds (e.g., CAS 9, 12, 13, etc.) to facilitate detection. The test cartridge 1504 includes a reservoir 1802 for holding a test sample, one or more microfluidic channels 1804 that transport the test sample towards the active photonics-based sensing area, the sensing area 1806 where photonics-based biosensing is performed on samples, and a connector 1808 for mating and alignment with the interrogator apparatus (e.g., the tabletop 1402 or handheld apparatus 1404).

FIGS. 19A-19D illustrate four implementations of the biosensor chip 1902 with microfluidics 1904 that may be used within the test cartridge 1504. Each chip can have multiple sensing channels and can accept one or more types of reagents, e.g., saliva and blood.

Figure 28:
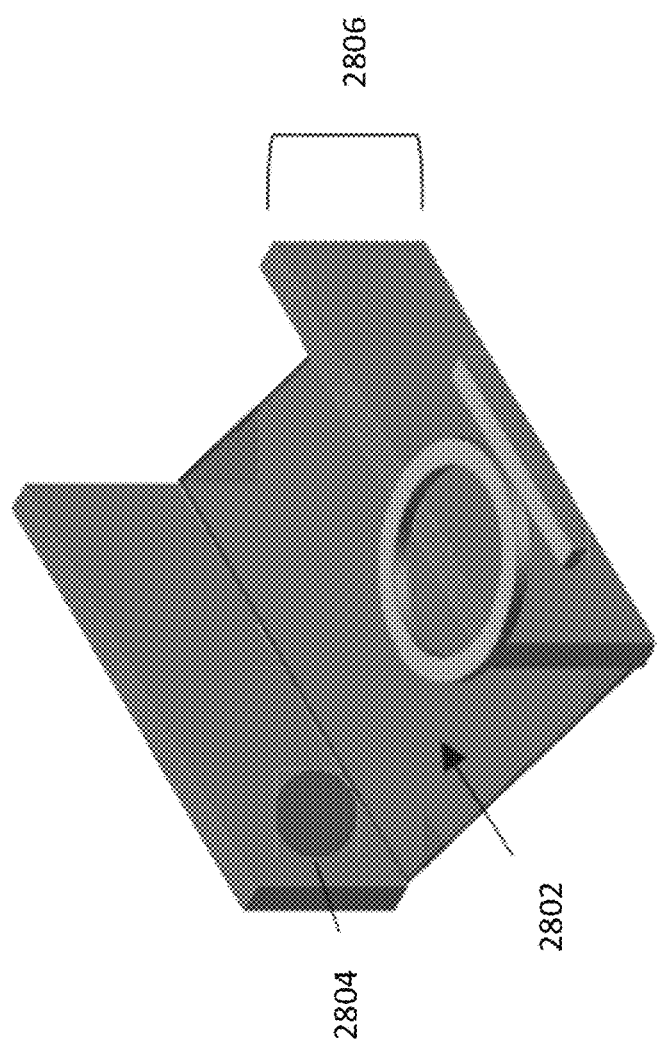
FIG. 28 is a diagram of an example microfluidic channel that transports analyte to the waveguide.

In various embodiments, the microfluidics channels used to transport the analyte in the sensing systems and methods described herein can be configured to facilitate detection of the sensing target, biological marker, pathogen of interest, etc. For example, the analyte including at least one of the reporter probes, sensing targets, biological markers, pathogens, etc. may flow perpendicular to the waveguide in a microfluidic channel to maximize interactions associated with the sensing protocols outlined above. Forcing the analyte past the waveguide may increase the probability of any number of the described interactions in the sensing schemes described above (e.g., binding, cleaving, etc.). FIG. 28 illustrates an example microfluidic channel 2802 that transports analyte to the waveguide (e.g., of the sensing area, as illustrated in examples of FIGS. 19A-19D). In some embodiments, an amplification agent (e.g., sensing amplifiers) 2804 may be applied to the channel 2802 to improve sensitivity to a particular characteristic of the biological sample. In some embodiments, the channel height 2806 may be manipulated to improve sensitivity. For example, the microfluidic channel height 2806 may be optimized to promote interaction between the analyte and the waveguide. In some embodiments, the microfluidic channels may be made using oxide etching of the cladding oxide on silicon photonic chips and sealing the channel overhead (e.g., via flat silicon bonded to silicon in a later step). Varying the thickness of oxide may control the resulting microfluidic channel height 2806. Additionally or alternatively, deep trenches etched in the silicon chip may be used as additional channels or fluid reservoirs to store analyte prior to interaction with the waveguide or after it flows past the waveguide.

2.2 Biosensing Methods

Methods and systems related to biosensing with a photonic waveguide on a sensing chip or fiber are described herein. The sensing chips or fibers may be made using silicon, silicon nitride, silicon dioxide or any other commonly used waveguide materials. In some embodiments, the methods/systems described herein include additional known amplification techniques.

In some embodiments, the sensor chiplet is adapted to perform label-based ("labeled") and/or label-free biosensing tests. In some embodiments, the sensor chiplet performs biosensing via in-plane light propagation through waveguides. In some embodiments, the sensor chiplet performs biosensing via reflections (such as Surface Enhanced Plasmon Resonance) or other out-of-plane interactions.

In some embodiments, biosensing is performed on a surface in an electronic, optical, MEMS, or optoelectronic device. General sensing techniques include but are not limited to using a doped optical waveguide or electrodes near a waveguide to sense the optical change or resistance change, respectively, after a binding or cleavage event. In some embodiments, optical changes may be detected using surface plasmon resonances, Mach-Zehnder interferometers, spiral waveguides, Bragg gratings, and/or photonic crystals or magnetic dielectric mirrors. In some embodiments, the waveguide is configured to detect a signal based on wavelength dependence or a wavelength resonance. In some embodiments, the interferometer is an unbalanced Mach-Zehnder Interferometer.

In some embodiments, a microfluidic cell is placed on top of the sensing surface. Such a microfluidic cell can be used to control flow of reagents, sample, and other components to and from the sensor chiplet.

As described herein, integrated photonic sensors can be used to detect changes to biomolecules, e.g., due to binding or cleavage interactions, that are immobilized on or near a waveguide. The evanescent field emanating from the waveguide is used to sense a change in the biomolecule.

In some embodiments, optical changes may be detected using surface plasmon resonances, Mach-Zehnder interferometers, spiral waveguides, Bragg gratings, and/or photonic crystals or magnetic dielectric mirrors.

Figure 20A:
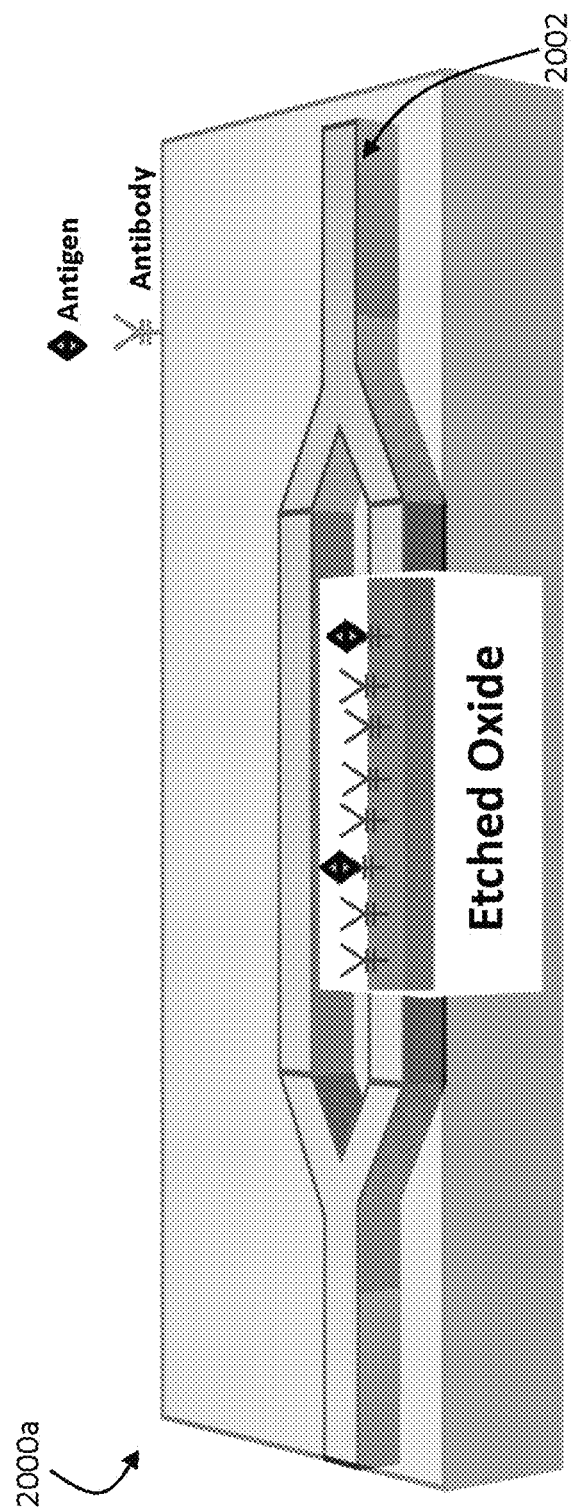
FIG. 20A is a diagram of the sensor chiplet having a waveguide including antibodies in at least one channel.

In FIG. 20A, the sensor chiplet 2000a (also referred to as an integrated photonic sensor) can include a waveguide 2002. At least one channel of the waveguide 2002 may include antibodies (e.g., may be coated with, bound to, or linked to the antibodies). These integrated photonic sensors rely on the binding of antigens from the analyte to antibodies that are immobilized on or near the waveguide 2002. The evanescent field emanating from the waveguide can be used to sense the refractive index change due to the presence of antigen after binding. If the waveguide is one arm of an interferometer (for example Mach-Zender or Michelson Interferometer), as shown in FIG. 20A, a phase change is introduced by the change in the effective refractive index experienced by the light passing through the waveguide, thus causing a change in intensity output from the interferometer.

Figure 20B:
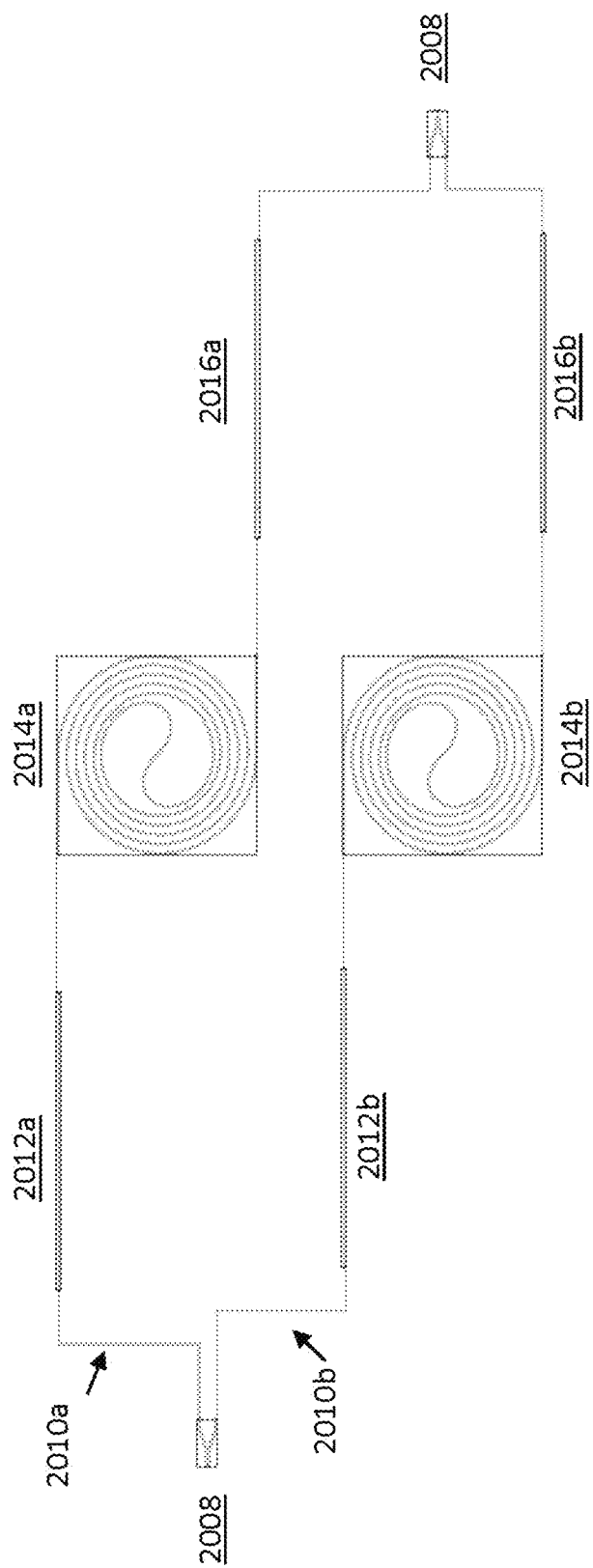
FIG. 20B is a diagram of a Mach-Zender Interferometer (MZI)-type sensor.

FIG. 20B illustrates a Mach-Zender Interferometer (MZI)-type sensor. The sensor 2000c can include a Y-splitter 2008 in which a first (reference) channel 2010a includes a Bragg reflector 2012a, a spiral waveguide 2014a, and a Bragg reflector 2016a, and a second (sensing) channel 2010b includes a Bragg reflector 2012b, a spiral waveguide 2014b, and a Bragg reflector 2016b. In some embodiments, the spiral waveguide 2014a of the reference channel 2010a is not functionalized to sense the target analyte, and the spiral waveguide 2014b of the reference channel 2010b is functionalized to sense the target analyte. Thus, the refractive index of the sensing channel 2010b changes when the target analyte is present (relative to the refractive index of the reference channel 2010a), which causes the spectrum of the light propagating through the sensing channel 2010b to shift (relative to the spectrum of the light propagating through the reference channel 2010a). This shift can be detected, and the magnitude of the shift may indicate the concentration of the target analyte at the surface of the functionalized spiral waveguide 2014b.

Figure 20C:
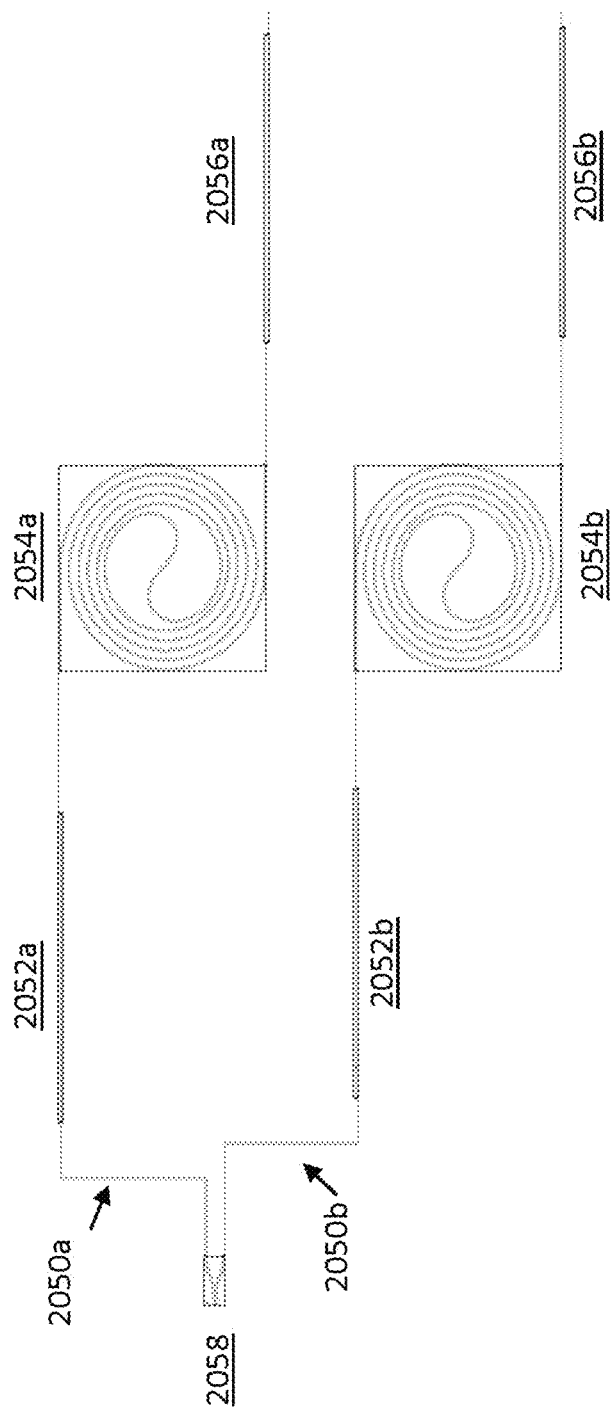
FIG. 20C is a diagram of an absorption spectroscopy type sensor.

FIG. 20C illustrates an absorption spectroscopy type sensor. The sensor can include a Y-splitter 2058 in which a reference channel 2050a includes a Bragg reflector 2052a, a spiral waveguide 2054a, and a Bragg reflector 2056a, and a sensing channel 2050b includes a Bragg reflector 2052b, a spiral waveguide 2054b, and a Bragg reflector 2056b. In some embodiments, the spiral waveguide 2054a of the reference channel 2050a is not functionalized to sense the target analyte, and the spiral waveguide 2054b of the reference channel 2050b is functionalized to sense the target analyte. Thus, certain wavelengths of light propagating through the spiral waveguide 2054b of the reference channel are absorbed when the target analyte is present. The difference in intensity of the light in the sensing channel and the light in the reference channel, after passing through the spiral waveguides and at the wavelengths absorbed by the target analyte (or label, or cleaved probe) may be detected, and this difference may indicate the concentration of the target analyte at the surface of the functionalized spiral waveguide 2054b.

In the examples of FIGS. 20B and 20C, spiral waveguides are shown. However, any waveguide of suitable length to produce a detectable change in the optical characteristics of the light propagating in the waveguide responsive to the concentration of the analyte at the surface of the waveguide may be used. Such a waveguide may be referred to herein as a "long waveguide."

Figure 21A:
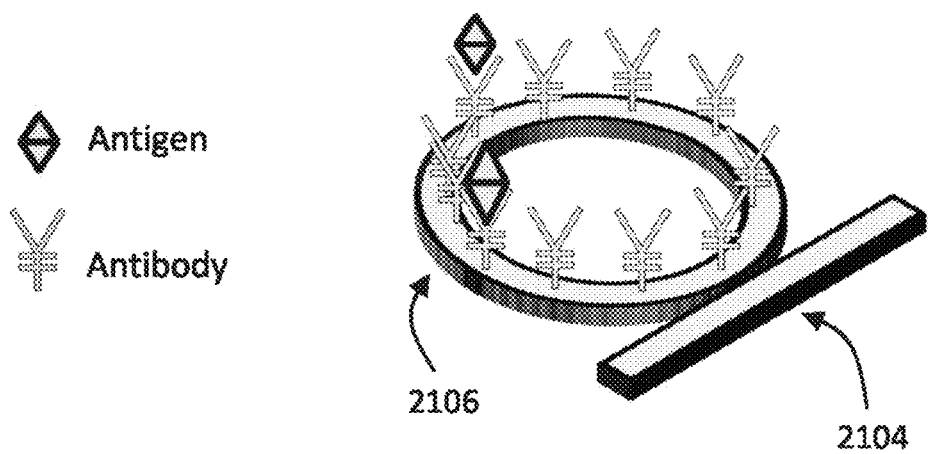
FIG. 21A is a diagram of an example method where an antigen binds to an antibody immobilized on a ring resonator.
Figure 21B:
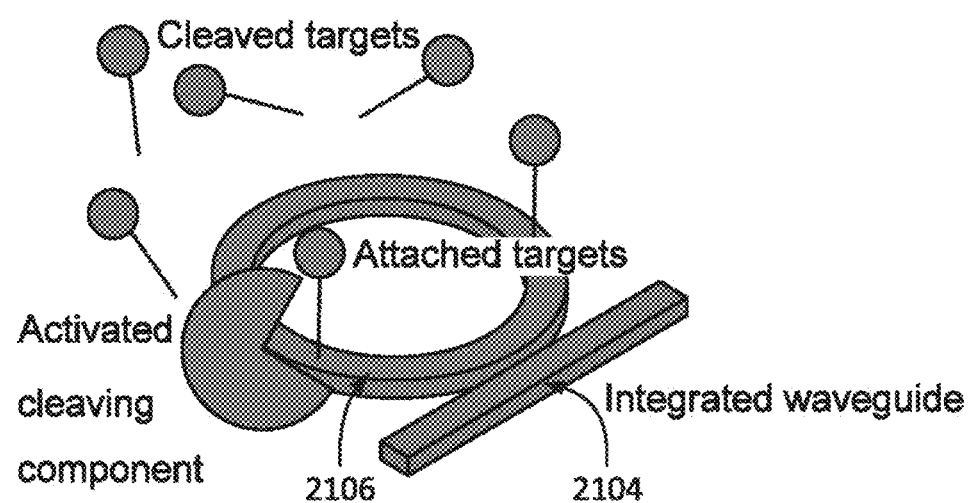
FIG. 21B is a diagram of an example process wherein the cleaving agent cleaves a reporter probe from a waveguide.

FIG. 21A illustrates an example method where an antigen binds to an antibody immobilized on a ring resonator. FIG. 2 IB illustrates an example method wherein a cleaving agent cleaves a reporter probe immobilized on a ring resonator. If the waveguide 2104 is part of a ring resonator 2106, the waveguide 2104 can detect a change in the resonance of the ring 2106, which will shift after a binding or cleavage reaction with one or more molecules. Alternatively, if the antigen or cleaved element is absorptive in wavelengths that are guided in a given integrated photonic waveguide, light intensity may simply be measured after passing through the waveguide.

2.2.1. Binding Assays

In some embodiments, an analyte can be detected through binding to a biomolecule immobilized on or near a waveguide. For example, binding of antigens to antibodies that are immobilized on or near a waveguide can be detected by an integrated photonic sensor. The evanescent field emanating from the waveguide is used to then sense a refractive index change due to the presence of antigen after binding.

In another embodiment, biosensing is performed by a biological marker (e.g. virus antigens, antibodies, etc.). The biological markers may be immobilized at or near the waveguide.

In some embodiments, whole pathogen detection is performed. The pathogen may be bound to a waveguide by functionalizing the waveguide with antibodies that capture the pathogen. However, because the refractive index of a virus, for example, is in the range of 1.4-1.5 and water is 1.33, it can be hard to detect a single viral particle. To increase the signal, an optically active component may be attached to the pathogen. In some embodiments, a plasmonic particle or other complex with strong optical properties may be attached to the pathogen by functionalizing the nanoparticle with antibodies for the pathogen. The pathogen may be bound to a waveguide by functionalizing the waveguide with antibodies that capture the pathogen.

In some embodiments, RNA/DNA is first functionalized with a reporter probe, then it may bind to conjugate DNA/RNA attached to the waveguide. The reporter probe may have a sequence that precisely binds the DNA/RNA (single strand). When the reporter probe is away from the waveguide, the binding site is therefore closed off. When the reporter probe connects to the sensing target (e.g. viral DNA) it unfolds, and the binding site is revealed.

The biological markers may be in solution and bind to the waveguide in any number of ways. The waveguide may then detect the refractive index change due to the presence of the biological marker at or near the waveguide. Alternatively, if the biological marker is optically active in the region at which the waveguide operates, the light intensity may simply be measured after passing through the waveguide.

2.2.2. Cleavage Assays

In some embodiments, a component of a sample can be detected by directly or indirectly resulting in a cleavage reaction which is detected by the sensor chiplet. FIG. 2 IB illustrates an example process wherein the cleaving agent cleaves a reporter probe from a waveguide.

In one example, a waveguide (e.g. associated with a ring resonator) is functionalized to immobilize reporter probes (e.g. RNA strands). Next, a cleaving component (e.g. a CRISPR enzyme) that may interact with the reporter probes and a sensing target of interest may be combined with the analyte carrying the sensing target. Herein, the use of a sensing target is intended to include any biological marker. This includes but is not limited to RNA, DNA, a molecule, an enzyme, an antigen, an antibody, a pathogen, etc.

Figure 22:
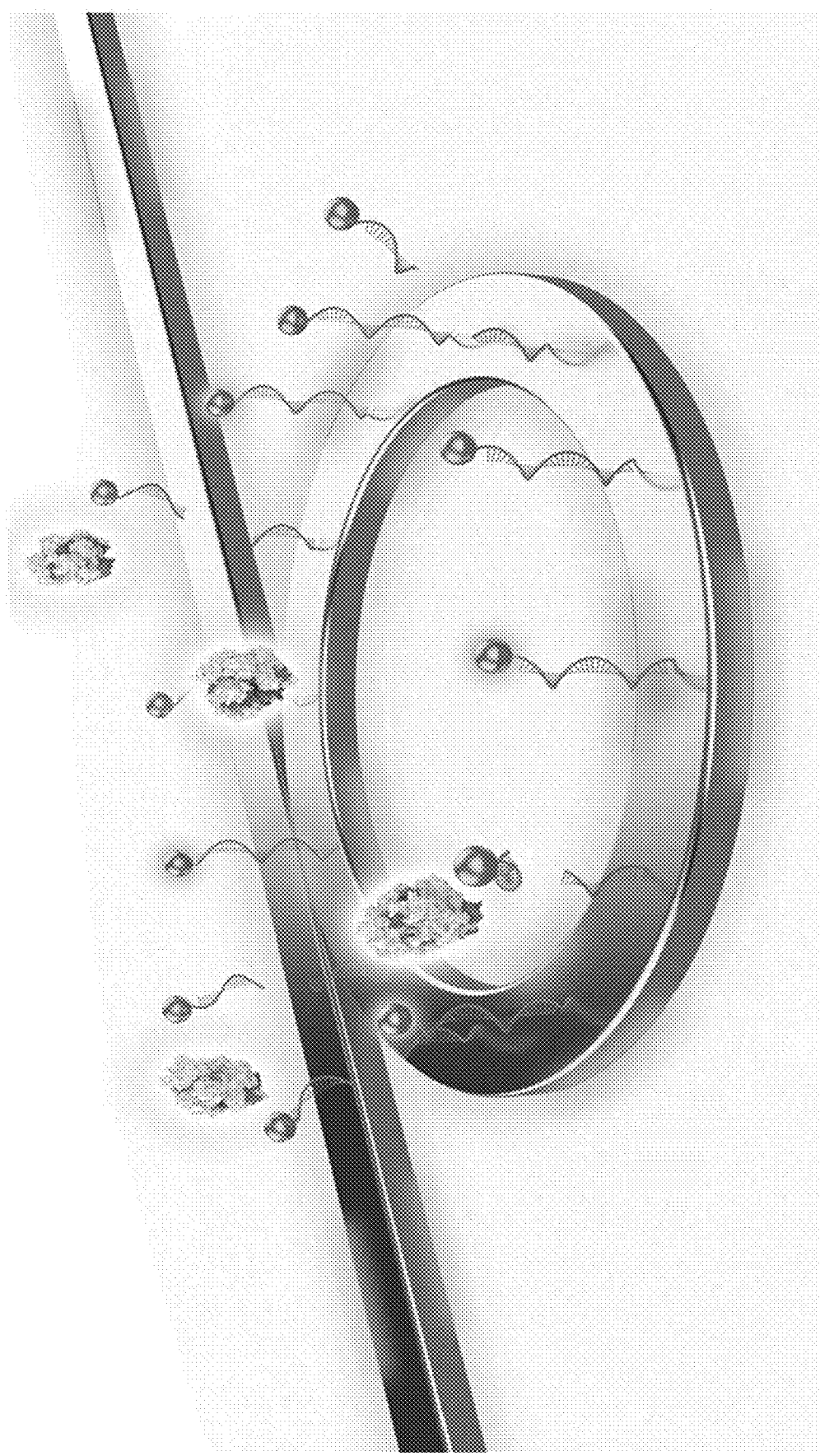
FIG. 22 is a diagram of an example testing mechanism used by the biosensing apparatus.

FIG. 22 illustrates one possible testing mechanism used by the PROBE apparatus; it utilizes A—waveguide, B—ring resonator, C—functionalized nanoparticles (e.g. reporter probe with optically active component), and D—sensing agents capable of cleaving the nanoparticles from the ring resonator. In one example, a waveguide (e.g. associated with a ring resonator) may be functionalized to immobilize reporter probes (e.g. RNA strands). These reporter probes may be linked to an optically active component (e.g. plasmonic nanoparticle, quantum dot, molecule, etc.) to enhance their optical effect on the waveguide and/or for downstream detection. Next, a sensing agent or cleaving component (e.g. a CRISPR enzyme) that may interact with the reporter probes and a sensing target of interest (e.g. virus RNA/DNA) may be combined with analyte carrying the sensing target (e.g. viral RNA from patient sample introduced into test cartridge). In some embodiments, the sensing agents are activated to cleave the functionalized nanoparticles only if they encounter biological material associated with a positive test result (e.g. viral RNA). The cleaving component may be activated, thereby indiscriminately cleaving the functionalized nanoparticles.

In some embodiments, if the reporter probes attached to the waveguide are removed, an optical change in the system may be detected in various ways. In one example, cleavage of the probes from the waveguide may result in a change in the refractive index of light guided within the waveguide; this change in refractive index may be detected using various spectroscopic techniques (e.g. resonance, interference, or absorption, etc.). Additionally or alternatively, the optically active component (e.g. plasmonic nanoparticle, quantum dot, molecule, etc.) attached to the reporter probes may be cleaved along with the reporter probes. The presence of these cleaved optically active components may be detected downstream from the waveguide using various techniques. Other known techniques for facilitating interactions between the waveguide and sensing targets, reporter probes, biological markers, pathogen, etc. (e.g. toehold switch) may be implemented in addition to or as an alternative to the described techniques.

Figure 23:
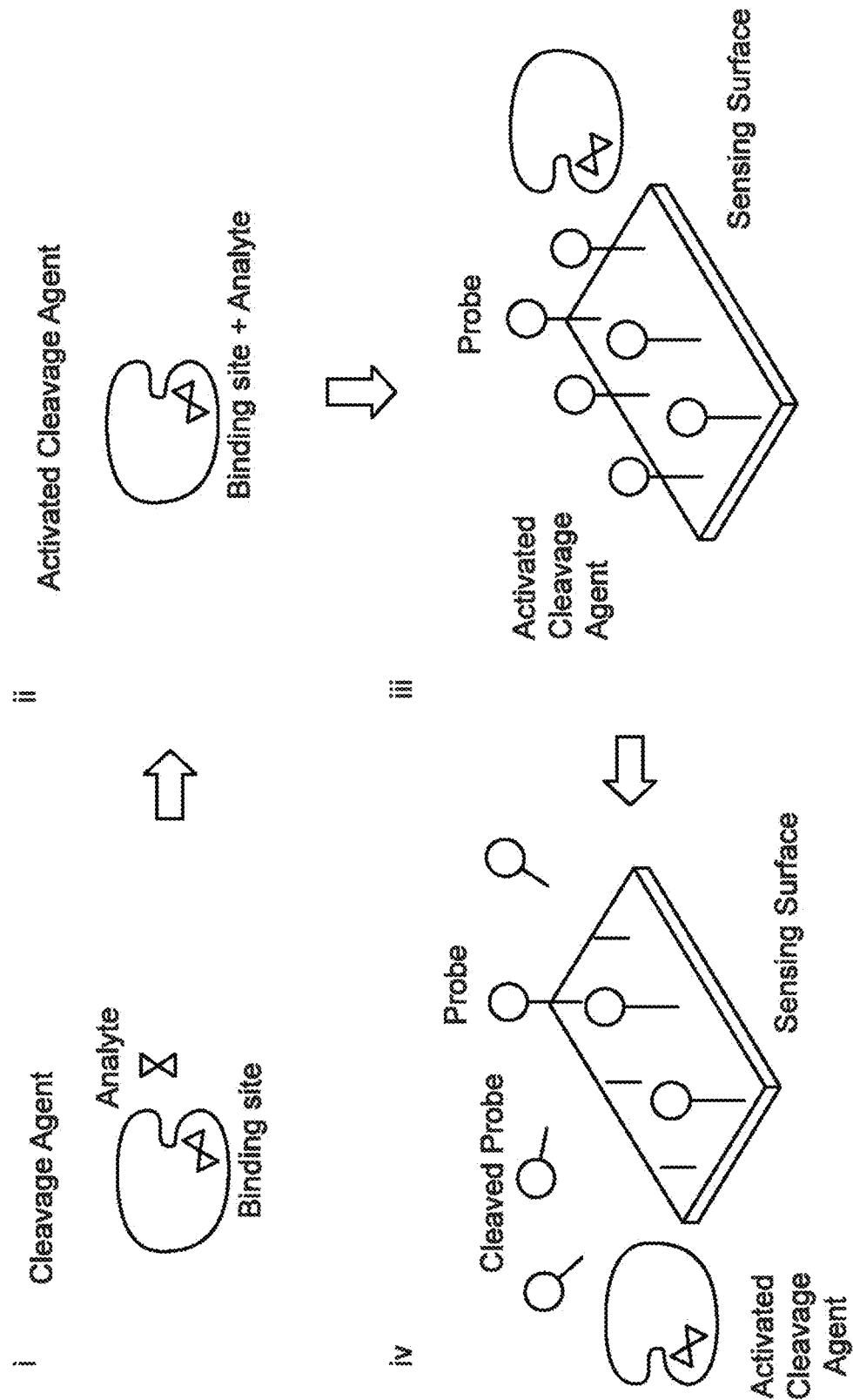
FIG. 23 is a diagram of a cleaving component configured to be activated when it detects a sensing target of interest.

In some embodiments, as illustrated in FIG. 23, the cleaving component is designed to be activated only when it detects the sensing target of interest. Once the cleaving component is activated, it cleaves probes from the sensing surface, leading to a detectable signal (via resonance, absorbance, interference resistance changes or other detectable changes near the sensing surface).

In some embodiments, the cleaving component binds to the sensing target of interest. The cleaving component may be activated, thereby indiscriminately cleaving both the sensing target and immobilizer probes.

Various cleaving components (e.g. CRISPR enzymes activated by target RNA, or other enzymes activated by an analyte of interest) may cleave the reporter probes, removing them from the surface, when an analyte of interest binds to or is otherwise detected by the cleaving agents in solution.

In some embodiments, the probes are engineered to enhance the signal generated by cleavage events, which is distinct from other techniques where binding of analyte to the surface directly generates a signal. The readout may be done by immobilizing the probes on the surface of waveguides, such that the evanescent field interacts with the probes, but any surface method or any combination of surface methods (e.g. electrical and/or optical) may be used including transistors, nanopores, surface plasmon resonant thin films or particles, surfaces used for SERS spectroscopy, or electrical impedance (e.g., resistance) based sensors. In some embodiments, a high contrast cleavage detection system, where there is both a cleaving component that is either the analyte of interest or has a specific detection mechanism for the analyte of interest, and a solid-state probe that is functionalized onto a sensing surface (e.g. a waveguide, plasmonic thin film, etc.), is used.

In some embodiments, the cleavage event is caused by the analyte of interest or may be facilitated via a chemical in solution and/or from electromagnetic radiation (e.g. UV light). The method may be used directly to detect any effect that causes the probe removal; this includes light, heat and other changes in the environment generally or locally that can cause the probe to detach. In a nonlimiting example, probes may contain UV cleavable linkages or heat-disassociated bonds. For sensing analytes in solution that are exposed to the surface, the cleavage event may be activated by a chemical or enzyme associated with the sensing target. In one non limiting example, the cleaving component may be an enzyme (e.g. CRISPR, a Toehold Switch RNA detection produced Enzyme or protein) that may cleave reporter probes (e.g. RNA strands) immobilized on the surface of an electronic, magnetic, MEMS, optical, or optoelectronic device. The cleaving component may be activated when it detects the sensing target of interest in solution, thereby cleaving the immobilized reporter probes.

In some embodiments, the immobilized reporter probes consist of an optically-active and/or conductive or magnetic component, which may facilitate detection of this cleavage event (e.g. via the optical signal or a change in resistance at an electrode described above). This cleavage may be sensed directly where it happens (e.g. by a change in response of a ring resonator/optical waveguide where the reporter probes were immobilized prior to cleavage) or the cleaved products (e.g. the cleaved reporter probes migrate away from the surface for detection elsewhere in the system). The cleaved products may migrate to and bind to a sensing surface via diffusion or mixing. In some embodiments, the cleaved product may be designed for strong binding affinity to the sensing surface (e.g. surface functionalized gold particles functionalized with biotin designed to bind to sensing surface functionalized with Streptavidin.)

This method may also be used to determine or sense activity or reaction kinetics associated with a biomolecule or enzyme even if the reaction is reversible. For example, if the surface is functionalized with an agent the biomolecule reacts with, a binding event associated with this reaction may be detected (e.g. via optical resonance shift, etc.), and if the complex falls apart or is broken, this can be detected as a cleavage. The contrast can be increased by labeling the component that is added from solution using a gold nanoparticle or otherwise optically/magnetically/electrically active label that interacts strongly with the surface.

Figure 24:
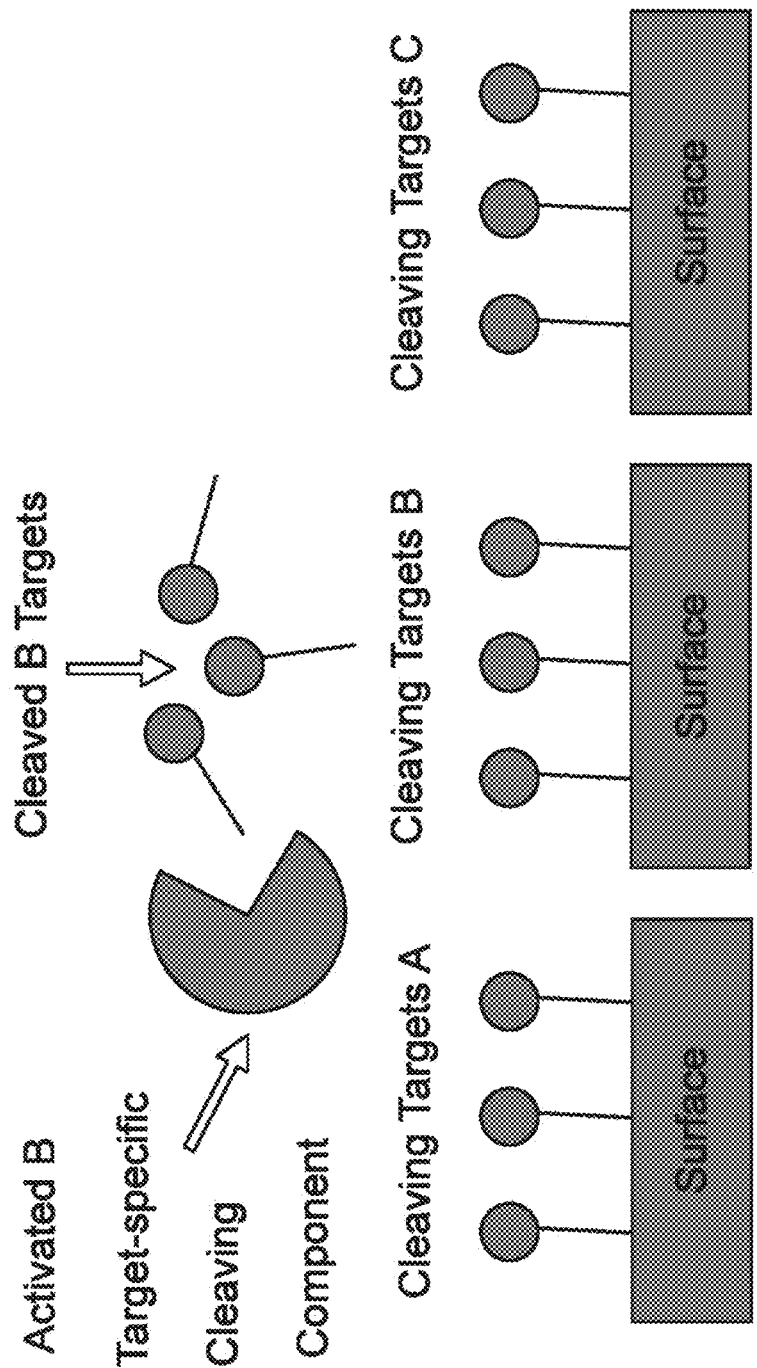
FIG. 24 is a diagram illustrating the example target-specific cleavage process.

Additionally or alternatively, various enzymes may be attached to various surfaces and their activity may be monitored separately using the optical and/or electronic interactions described above. For example, an optical system may include multiple ring resonators where each ring resonator may be functionalized with a different enzyme (e.g. CRISPR CAS 12, CAS 13, etc.). These various cleaving components may be designed to be activated only when they are exposed to their specific sensing target of interest as shown in FIG. 23. Once activated, each cleaving component, tethered to the sensing surface, may cleave only cleave probes in its direct vicinity. This may lead to a change in the response (e.g. plasmon resonance optical readout or electronic transistor readout) of only the surface where the cleavage occurred (see FIG. 24). This may permit different regions or different surfaces to detect different analytes in the same sample without any interference and without the need for any microfluidic or other physical separation. In the nonlimiting example of RNA sensing with ring resonators, different resonators on a chip may be functionalized by a CRISPR enzyme carrying a different crRNA sequence, allowing each ring to become a sensor for that specific sequence when all the rings are exposed simultaneously to the same analyte. This can work with any version of the High Contrast Cleavage approach described.

Alternately, instead of attaching different enzymes or other cleaving agents with different target analytes to different sensing surfaces, the sample fluid may be split up into separate chambers, each containing a different cleaving agent (in a dried state or added via a different fluid input channel/port) with a different target analyte. This allows testing of the same sample for different analytes in parallel without interference. It may also be arranged in a serial fashion, where the sample flows first over a sensing surface where the microfluidic chamber contains the first cleaving agent, then flows into a chamber with the second cleaving agent, and so on (e.g. each chamber containing 1 or more sensing surfaces with cleavable probes). Using the two above described techniques (separate optical system with distinct enzyme, splitting sample fluid) may be useful for both redundant testing (e.g. for the same virus) by increasing sensitivity and/or specificity and multiplexing tests for multiple pathogens which may be advantageous for facile widespread testing.

2.2.3. Toehold Switch Assay

Figure 25:
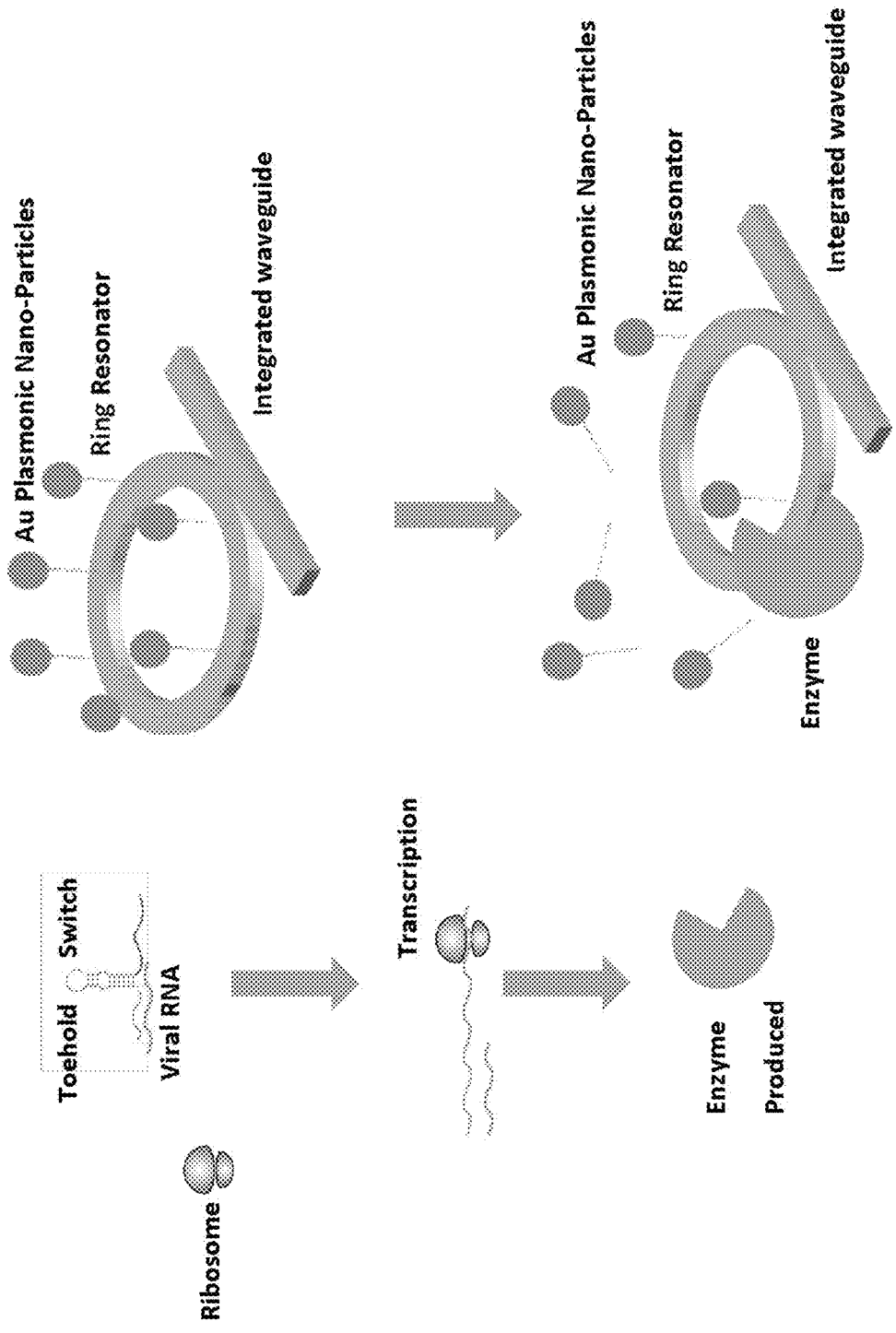
FIG. 25 is a diagram of an example method for RNA detection using a toehold switch RNA approach.
Figure 26:
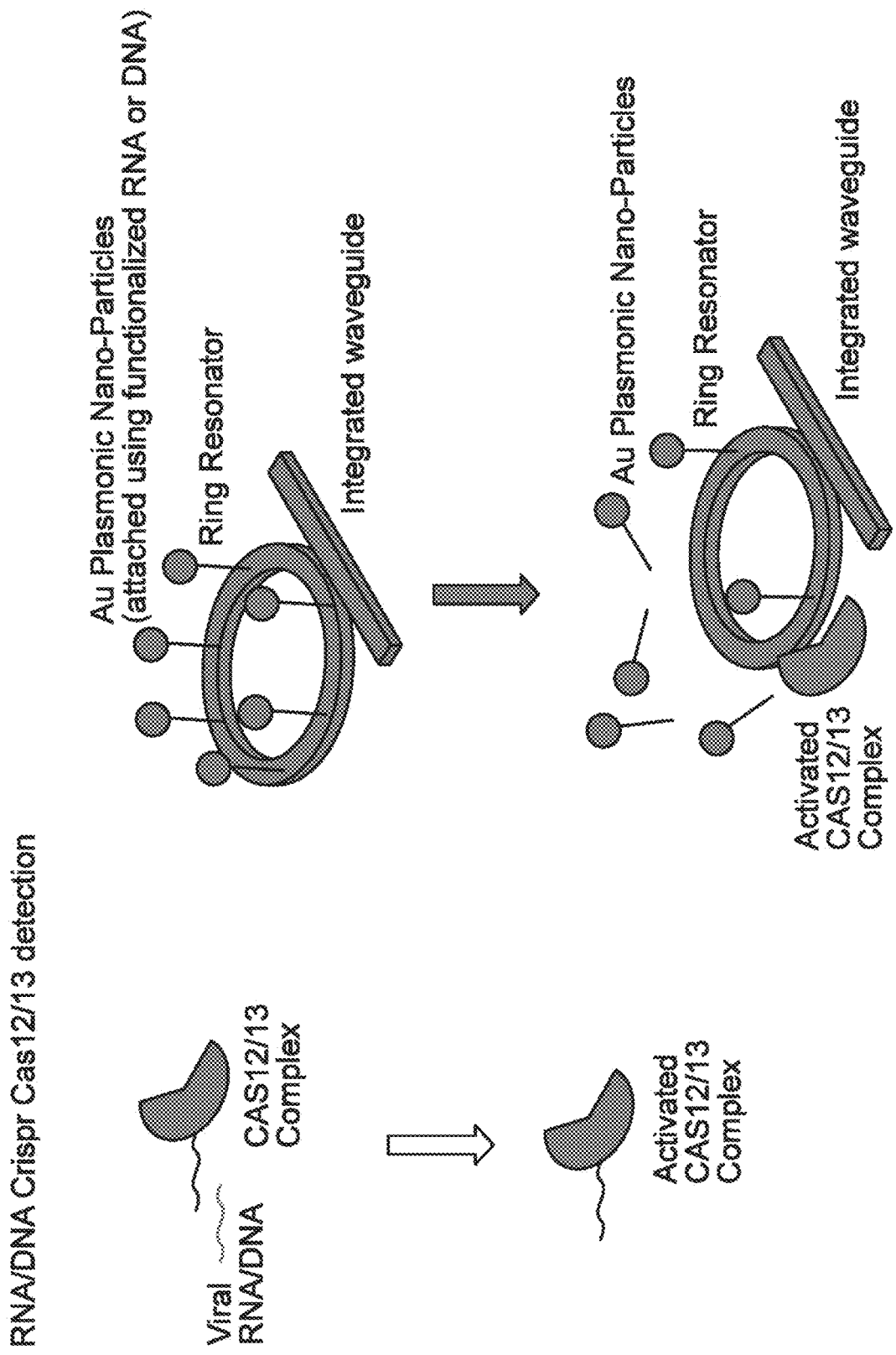
FIG. 26 is a diagram of an example method for DNA and RNA detection using CRISPR and a waveguide.

Shown in FIG. 25 and FIG. 26 are diagrams of methods developed for integrating diagnostic tests with waveguides and other integrated photonic components.

In FIG. 25, we illustrate a method for RNA detection using a toehold switch RNA approach based on what is demonstrated in Rapid, Low-Cost Detection of Zika Virus Using Programmable Biomolecular Components K Pardee et al. When the hairpin is opened by the target RNA binding to the toehold RNA, the ribosome binding site is exposed and the reporter protein sequence may be transcribed by a ribosome in solution. The reporter protein is chosen such that it may cleave the bonds that immobilize a plasmonic nanoparticle (or other complex with a strong optical response) from the waveguide surface. Again, the effect on the guided light within the waveguide may be detected using one of the methods described above (resonance, interference, or absorption).

In some embodiments, sensing target detection (e.g. RNA) may use a toehold switch RNA approach, as shown in FIG. 25. For example, the hairpin may be opened by the target RNA binding to the toehold RNA, thus the ribosome binding site may be exposed and the reporter protein sequence may be transcribed by a ribosome in solution. In some embodiments, this approach may generate an enzyme or other protein that may act as an input for the sensing approach. The reporter protein is chosen such that it may cleave the bonds that immobilize an optically active component from the waveguide surface. Thus, an effect on the guided light within the waveguide may be detected using one of the methods described above (e.g. resonance, interference, absorption, etc.)

2.2.4. CRISPR Assay

In one non-limiting example, the cleaving component is a CRISPR CAS-13 complex which cleaves all nearby RNA, including the RNA reporter probes immobilized on the waveguide.

In FIG. 26, we illustrate a method for DNA and RNA detection using CRISPR and a waveguide. A waveguide may be functionalized using standard methods with DNA or RNA strands. These strands may be linked to a plasmonic (e.g. gold) nanoparticle, quantum dot or another molecule to enhance their optical effect on the waveguide. A CRISPR enzyme such as CAS 12 (for DNA) or CAS 13 (for RNA) carrying the relevant sequence may be combined with analyte carrying the RNA or DNA of interest. When the CAS protein binds the RNA or DNA of interest it may be activated and used to cut multiple RNA/DNA strands non-specifically. If the DNA/RNA strands attached to the waveguide are cut, the effect on the guided light within the waveguide can be detected using one of the methods described above (resonance, interference, or absorption). See Integrated Micropillar Polydimethylsiloxane Accurate CRISPR Detection (IMPACT) System for Rapid Viral DNA Sensing, Kenneth N. et al. for a similar approach.

In some CRISPR implementations, after a sensing target is identified, the cleaving component may cleave a cluster of enzymes connected with an RNA/DNA scaffold. These enzymes may become activated and may cleave probes from the photonic waveguide. In some embodiments, they may not be enzymes but instead some type of particle that binds to the waveguide. This binding changes the local refractive index. The binding site is therefore hidden when they are connected to the cluster. Thus, the binding site may only be opened when the particle is cleaved.

The processes above describe several possible sensing techniques using a photonic waveguide, as taught herein. These processes may be further performed with or without common techniques associated with biosensing (e.g. target amplification). Other known techniques for facilitating interactions between the waveguide and sensing targets, reporter probes, biological markers, pathogen, etc. (e.g. toehold switch) may be implemented in addition to or as an alternative to the described techniques.

2.2.5. Further Biosensing Embodiments

The target of interest may first be chemically amplified using techniques including but not limited to PCR or RT-LAMP or RPA.

In some embodiments, reverse transcriptase can be used to convert RNA to DNA. This may allow for DNA sensing systems like PCR or CRISPR CAS-12 to be implemented. For PCR, the sensing protocol may include emitting light into the analyte using vertical grating couplers or an evanescent field and then observing fluorescent response either using external or on-chip optics and photodetectors.

In another aspect of the present disclosure, a chemical reaction on the surface of an optical, electronic, magnetic, MEMS or optoelectronic device may be catalyzed. In one example, a chemical reaction at a waveguide may be catalyzed on a waveguide via an evanescent field associated with the waveguide. In some embodiments, the chemical reaction may be controlled via integrated photonics (e.g. by toggling the light on and off or switching between different input wavelengths) to activate chemical reactions selectivity (e.g. which reaction, where the reaction occurs, when the reaction occurs, etc.). Additionally or alternatively, reaction kinetics can be further controlled by controlling the intensity and/or wavelength using components such as ring resonators, optical switches, photonic crystals, Bragg gratings, LEDs, and lasers which are capable of introducing and controlling high-intensity light across a range of wavelengths. MEMS components may be fabricated either instead of or in complement to other components in order to control chemical reactions near the surface, induce mixing, induce polymer folding, induce strain in the surface or in polymers attached to the surface, etc. In all cases, sensing may be done in parallel or serially as chemical reactions are occurring/being catalyzed/controlled.

In one implementation of High Contrast Cleavage Detection, an antibody, antigen or another analyte (which itself may be a complex of the target analyte and another molecule) may act as a bridge to combine two or more separate molecules into a cleaving agent which goes on to by an input to the sensing method as described above. Additionally, a cleavage agent may be designed with a blocked active site such that the blocking element can disassociate in the presence of the correct analyte or when some change is sensed (pH, temperature, etc.), again working as an input to the sensing method.

2.2.6. Optically Active Components

If the reporter probes attached to the waveguide are removed, an optical change in the system can be detected in various ways. In one example, cleaving the reporters from the waveguide may result in a change in the refractive index of light guided within the waveguide; this change in refractive index may be detected using various spectroscopic techniques (e.g. resonance, interference, or absorption, etc.). Additionally or alternatively, the optically active component (e.g. plasmonic nanoparticle, quantum dot, molecule, etc.) attached to the reporter probes may be cleaved along with the reporter probes. The presence of these cleaved optically active components may be detected downstream from the waveguide using various spectroscopic techniques (absorption, photoluminescence, fluorescence, etc.).

These reporter probes may be linked to an optically active component (e.g. plasmonic nanoparticle, quantum dot, molecule, etc.) to enhance their optical effect on the waveguide. Further, anything being captured by an antibody may be enhanced by attaching an optically active probe to it.

2.2.7. Reaction Kinetics

Several methods to increase the likelihood of interaction between the waveguide and analyte containing sensing targets, reporter probes, biological markers, pathogens, etc. are described. In one example, optical trapping (e.g. using strong electric field near waveguide or other photonic structure, similar to optical tweezers) to trap the sensing target at or near the waveguide.

Figure 27:
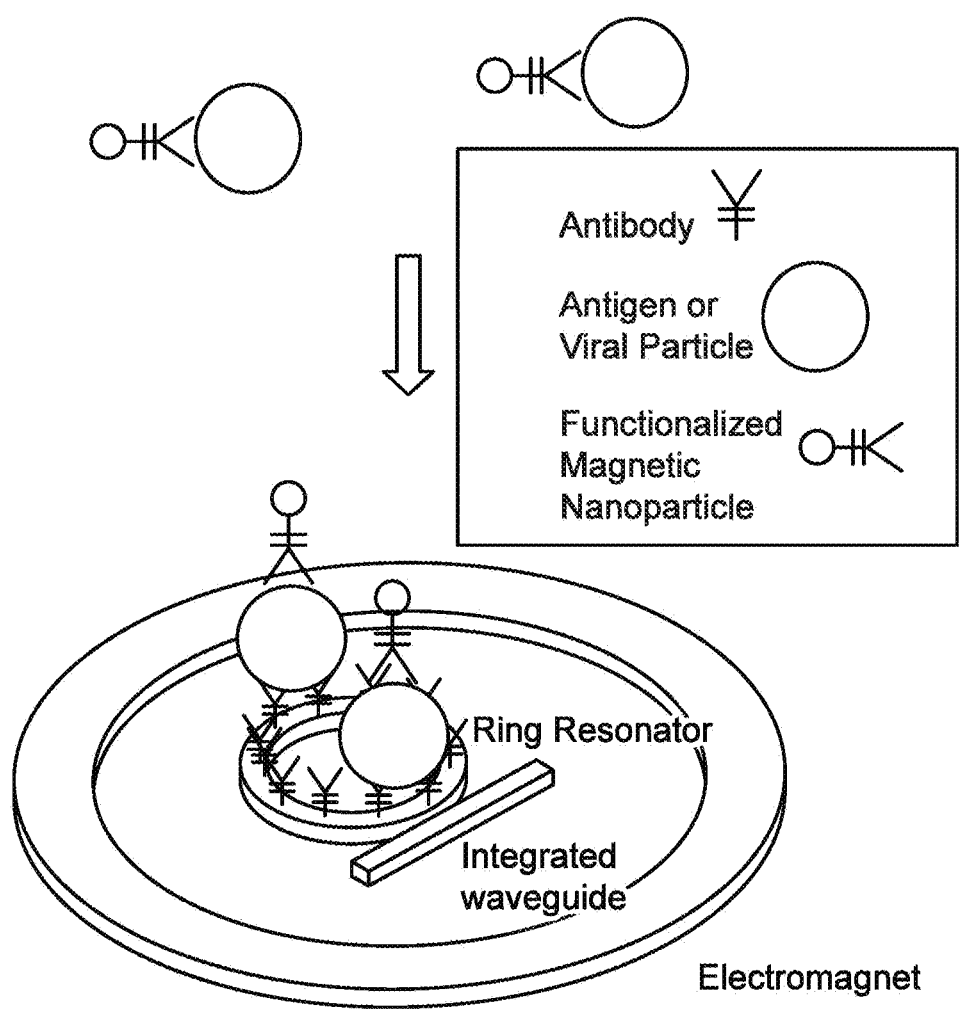
FIG. 27 is a diagram of an example method attaching a magnetic particle to a sensing target that may direct the sensing target to the waveguide via an applied magnetic field.

Additionally or alternatively, magnetic nanoparticles may be bound to the sensing targets, biological markers, or pathogens of interest. The sensing target, biological marker, or pathogen of interest may then be drawn to the sensing waveguide using a magnetic field applied externally or on the sensor. FIG. 27 further illustrates how attaching a magnetic particle to a sensing target may direct the sensing target to the waveguide via an applied magnetic field. By binding magnetic nanoparticles to the molecule or pathogen of interest, the complex may then be drawn to the sensing waveguide using a magnetic field, applied externally or via an electromagnet fabricated directly onto the sensor chiplet. This method may be combined with any diagnostic scheme, including those discussed above.

Additionally, one or more plasmonic antennas (e.g. a bowtie) may be fabricated on the chip such that local light-induced heating causes mixing via convection.

2.3 Integrated Photonic Assemblies for Biosensing

In various embodiments, the biosensing systems and methods can include multi-photonic-chiplet (MPC)-based point-of-care (POC)diagnostic biosensors for multiplexed, label-free biosensing. Current lab-on-a-chip optical biosensors transduce the nature and concentration of analyte of interest into an output signal by sensing the change in the refractive index of the optical waveguide. This detection mechanism has been achieved through a variety of optical phenomena based on the sensor configurations including surface plasmon resonance (SPR)

sensors, surface-enhanced Raman scattering (SERS), photonic crystal-based gratings, micro-ring resonators, or unbalanced Mach-Zehnder interferometer (UMZI) structures. While decades of research in this area has drastically advanced the sensitivity and specificity of these commercially-available sensor technologies, realization of compact, inexpensive sensors for multiplexed sensing of biological analytes applicable to point-of-care diagnostics has been elusive. The present systems and methods aim to provide such benefits. In particular, the present disclosure discusses in part a compact multi-photonic-chiplet (MPC)-based point-of-care (POC)diagnostic biosensor that can provide an inexpensive, re-usable, and scalable solution for simultaneous sensing of an array of biological analytes with enhanced specificity and sensitivity of detection.

Figure 29:
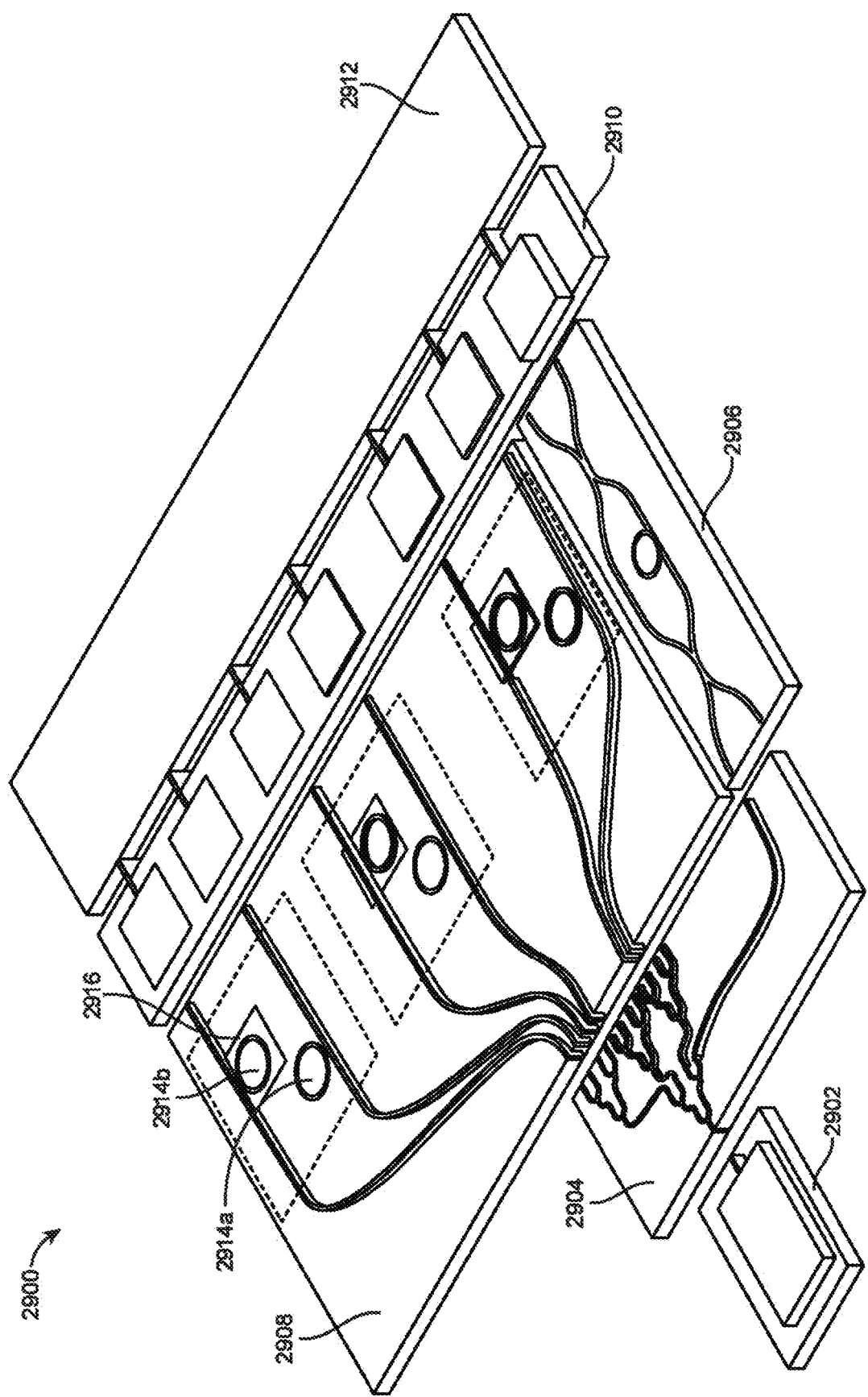
FIG. 29 is a diagram of an example implementation of the multi-photonic-chiplet (MPC)-based optical biosensor assembly for multiplexed sensing of analytes.

FIG. 29 illustrates an example implementation of the multi-photonic-chiplet (MPC)-based optical biosensor assembly 2900 for multiplexed sensing of analytes. This example assembly 2900 includes one or more multi-platform integrated opto-electronic chiplets. The chiplets can include an optical source 2902, a splitter network 2904, a frequency discriminator 2906, an array 2908 of sensing elements, a photo-diode array 2910, and read-out electronics 2912. The biosensor assembly 2900 may permit photonic chiplets having different elements of the sensing system (e.g., source, photodetectors (PD), and/or ring resonators) to be used in tandem. Each sensor element (labeled SI, S2 . . . Sn) of the sensor array 2908 may include two identical ring resonators 2914a, 2914b pumped by a tunable optical source. One of the resonators 2914b of the sensing element may be exposed to a biological analyte 2916, depicted as the shaded region around the ring, while the other resonators 2914a may be used as a reference. The optical source 2902 may be split across an array 2908 of sensing elements, enabling simultaneous or near simultaneous sensing of two or more analytes. This has the benefit of enabling each photonic component to be realized in the photonic platform of choice. For instance, this includes but is not limited to the currently foundry-friendly materials, e.g., silicon, silica, silicon nitride for the ring resonators, splitters, and the frequency discriminator, while the optical source and the photodetectors may be realized in silicon, or any III-V platform. Such flexibility may enable customization of individual components of the sensor from a myriad of photonic platform to suit the requirements of the sensing application and/or environment.

Figure 30:
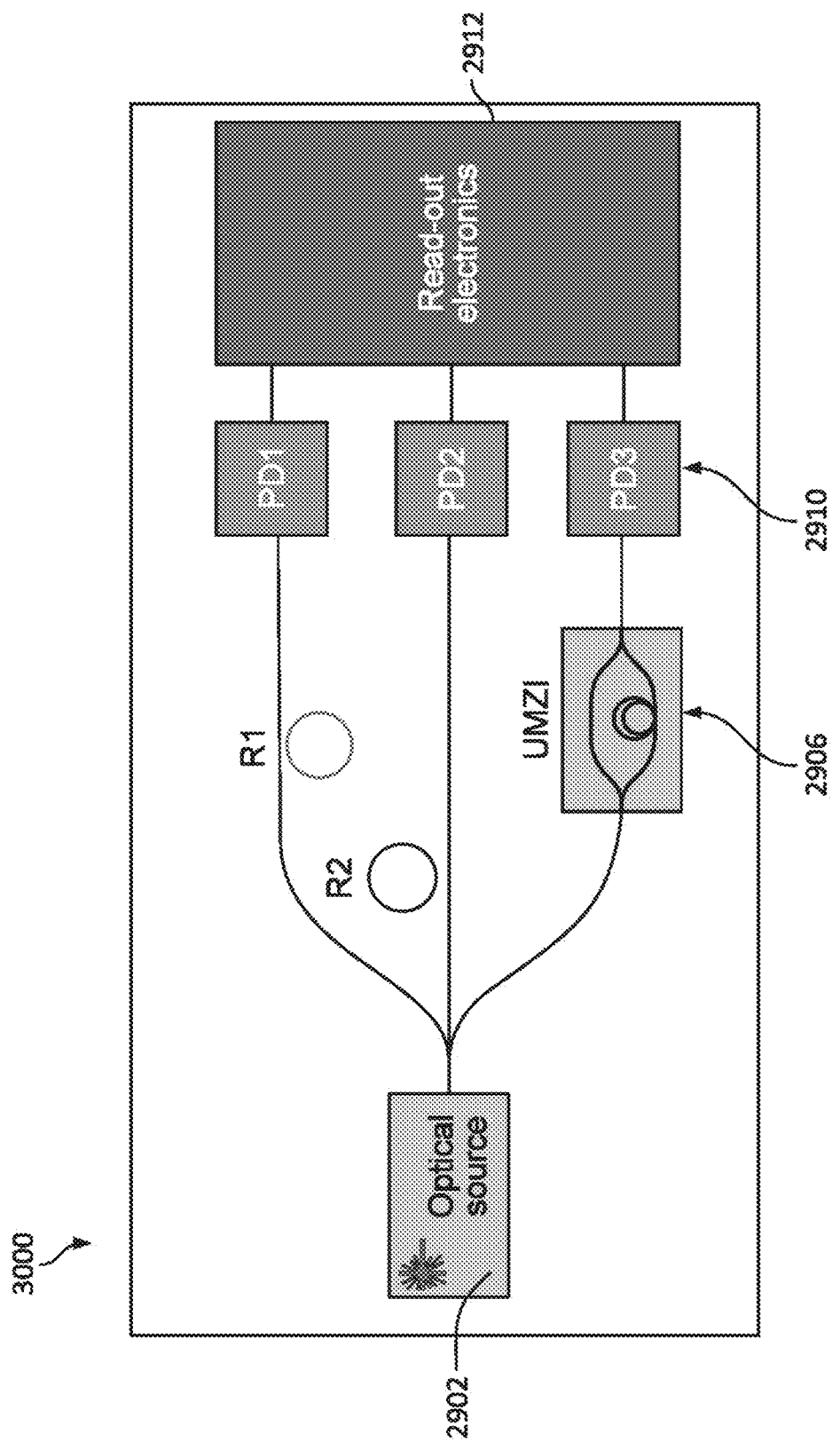
FIG. 30 is a diagram of an example layout of the photonic biosensor with a single sensing element.

FIG. 30 depicts an example layout of the photonic biosensor 3000 with a single sensing element. This single, illustrative configuration may include two identical ring resonators R1, R2, an optical source 2902, a frequency discriminator 2906, PDs 2910, and read-out electronics 2912. In this example, the use of reference resonator element or elements (e.g., R2) may eliminate common-mode noise sources, e.g., thermal or vibration noise.

Figures 31A, 31B, 31C:
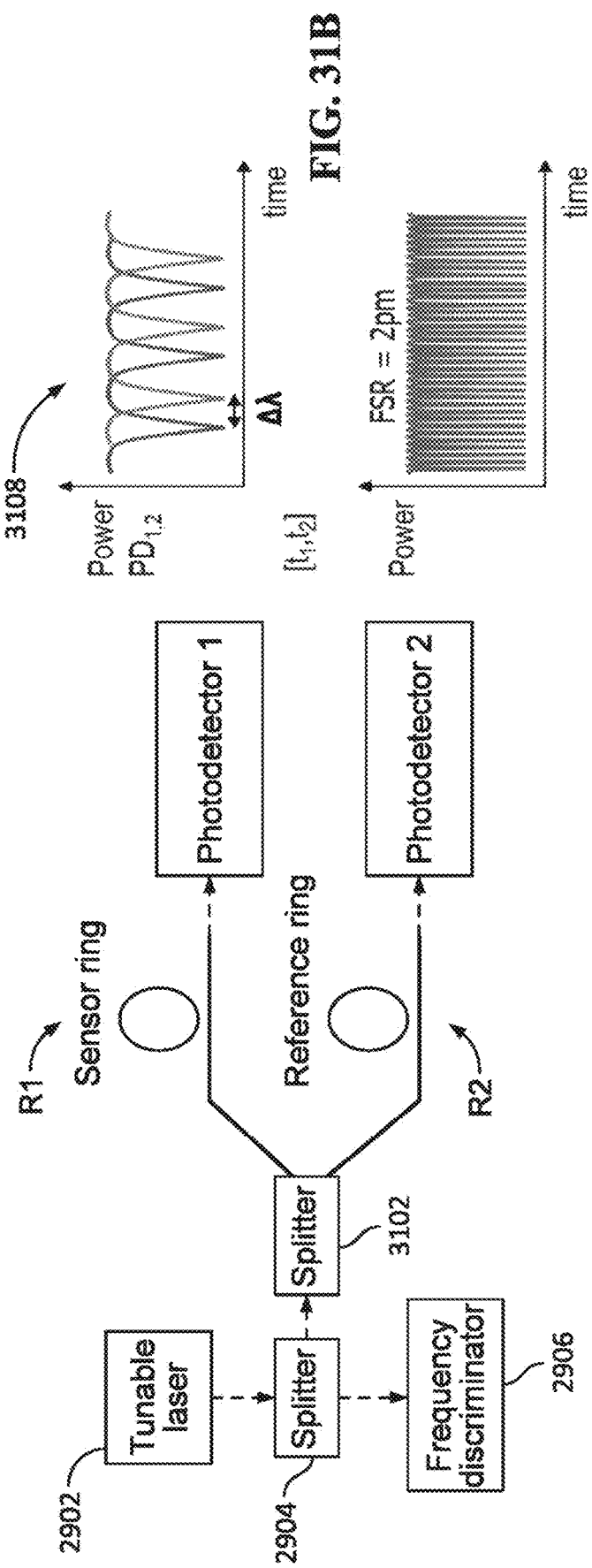
FIG. 31A is a diagram of an example system including the sensing element(s) and the frequency discriminator.
FIGS. 31B-31C is a plot illustrating the functionality of the sensing elements and frequency discriminator of FIG. 31A.

FIGS. 31A-31C illustrate the functionality of the sensing elements and frequency discriminator. FIG. 31A provides representation of the light source 2902 (e.g., a tunable laser) coupled to at least one splitter 2904. The first splitter splits the light between a frequency discriminator 2906 and a second splitter 3102. The second splitter 3102 provides the light to a first waveguide coupled to the sensor ring resonator R1 with an output fed to the photodetector (PD) 1. The light in the second waveguide is coupled to a reference ring resonator R2 with an output to the photodetector (PD) 2. FIG. 31B shows an example power spectra 3108 of the sensing elements and the frequency discriminator 2906 over time. The fringe pattern of the discriminator 2906 with the known free-spectral range may enable extraction of resonance wavelength shift due to the presence of analyte.

The optical source 2902 may be tuned across the resonances of the two identical ring resonators R1, R2 and an unbalanced MZI (UMZI)-based frequency discriminator 2906. A microfluidic channel may be employed to flow the to-be-sensed analyte on the sensor ring R1. The refractive index change resulting from the presence of the analyte on the surface of the sensor ring R1 may result in a relative shift of the resonance wavelengths between the two rings R1 and R2. This shift may be detected by PD 1 and 2, as illustrated in FIG. 31B. The resulting wavelength shift may scale with the components (e.g., biomarkers) and concentration of the analyte and may be extracted from the detector outputs.

The optical source 2902 in the sensor system may be a distributed feedback laser (DFB), a (sampled grating) distributed Bragg reflector laser (DBR laser), a vertical-cavity semiconductor emitting laser (VCSEL), a Vernier-tuned (VT) DBR laser, coupled ring-resonator laser (CRR), or any other laser diode configuration that is tunable thermally, electrically, mechanically, etc. across the ring resonances. The sensor system may account for the nonlinear tuning dynamics of the optical source 2902 (e.g., by using the output of a UMZI that has a known free-spectral range (FSR)). The relative movement of the output frequency of the source 2902 may then be evaluated (e.g., by using the spacing between the output fringes of the UMZI as shown in FIG. 31C).

The choice of the optical source 2902 may be determined by the required wavelength resolution for sensing, the material platform of the passive components, and/or the sampling rate of the read-out electronics 2912. The frequency drift of the optical source 2902 (e.g., laser) caused by the inherent white and flicker frequency noise components may lower the achievable wavelength resolution in the sampling period while the required relative-intensity-noise and the output power of the laser may be determined by the dynamic range of the electronics and the extinction ratio of the sensor element.

The optical splitter network 2904 depicted in FIG. 29 may be realized using any number of coupling systems (e.g., binary tree of directional couplers, multi-mode-interference couplers, etc.). The required flatness of the splitting ratio across the tuning range of the optical source may be determined by the thermal and/or nonlinear effects of the ring resonators or other sensor elements employed in the system. Improved compactness of the splitter network 2904 may be realized through implementation of a series of 1×N splitters comprising any number of coupling systems and/or coupler configurations including those described above. The optical splitter network 2904 can take any form and may be a combination of switches, wavelength multiplexing, and so on.

The frequency discriminator 2906 depicted in FIG. 29 can be used to evaluate the relative wavelength movement of the tuned optical source 2902. While the example of the discriminator depicted in FIG. 29 utilizes an unbalanced Mach-Zehnder interferometer (UMZI) configuration, other devices such as a stable Fabry-Perot cavity, a ring resonator, a gas cell, a free-space etalon, or any other reference cavity with a known free-spectral range and higher degree of thermal stability may be employed for clocking the read-out electronics as the source wavelength is tuned across the sensing element. In some embodiments, only the relative movement of source wavelength is of interest and the knowledge of absolute wavelength of source is not required, assuming the material and waveguide dispersion of the sensing element do not significantly vary the group index over the anticipated wavelength drift of the source and reference during the time of measurement.

Figure 32:
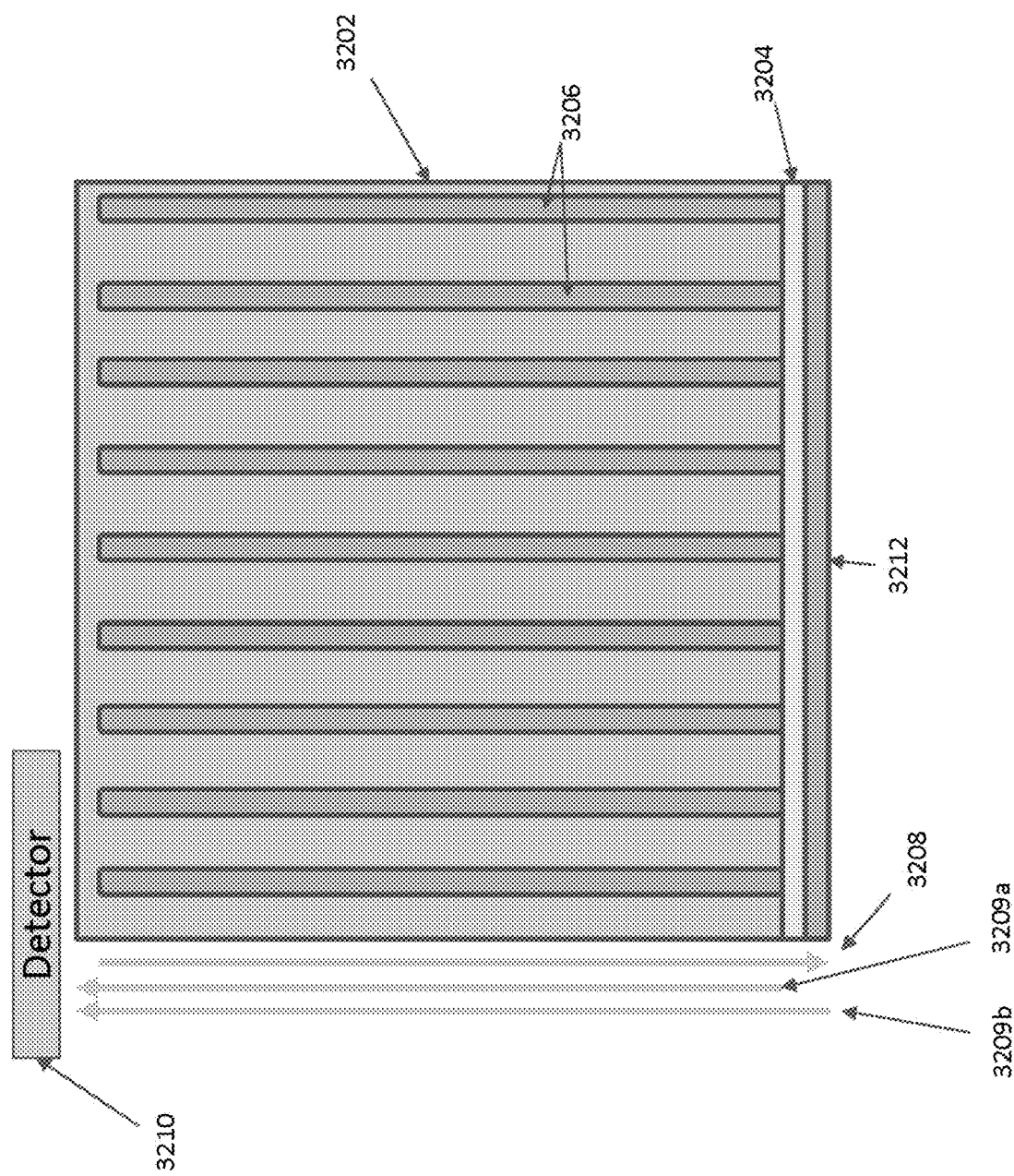
FIG. 32 is a diagram of an example sensor chip with edge facets of waveguides used for biolayer interferometry.

FIG. 32 illustrates a sensor chip with edge facets of waveguides used for biolayer interferometry. The sensor tips may include photonic chips where the waveguides terminating at the facet of the chip 3202 are coated with a thin layer of oxide 3204 or other material that has a different refractive index than the waveguide(s) 3206. The thin layer (e.g., oxide layer 3204) may be functionalized to facilitate photonic biosensing (e.g., via biolayer interferometry). For example, reflections of incoming coherent light 3208 may emerge from the interface between the waveguide and thin layer (e.g., silicon-oxide interface) and the oxide-biolayer-water interface. These reflections (e.g., reflection from first layer 3209a, reflection from second layer 3209b, etc.) may form interference patterns that can be measured via a detector 3210 configured to collect the back-reflections and/or record interference pattern. This may result in detector interference pattern or spectrum that shifts as the refractive index of the biolayer 3212 changes with binding/unbinding/cleavage of biomolecules.

3 Wearable Biosensors

Techniques for measuring analyte levels in mammalian (e.g., human) samples, such as enzyme-linked immunoassay (ELISA), generally rely on endpoint readings, enzymes with artificially introduced organic substrates, or fluorescent labels to produce signals indicative of analyte levels. These techniques and the accompanying devices for implementing these techniques generally do not lend themselves to use in situations where a fluctuating analyte is being monitored in real-time and/or inside a mammalian body.

In addition, existing biosensors (particularly wearable biosensors capable of real-time, non-invasive or semi-invasive monitoring of the level of an analyte in the human body) are generally capable of monitoring only one specific analyte, rather than monitoring levels of multiple different analytes simultaneously. The continuous glucose monitor is one example of a wearable biosensor that monitors the level of a single analyte (glucose) in the blood. However, continuous glucose monitors use sensing technology that has not demonstrated the capability to sense analytes other than glucose, such as proteins, peptides, hormones, antibodies, and small molecules that are generally present in the body's interstitial fluids at concentrations lower than glucose (e.g., less than 1 g/L). To gain visibility into many critical biological processes like inflammation, stress, immune health, fertility, and sleep, there is an acute need for wearable biosensors capable of real-time, semi-invasive (or non-invasive) monitoring of one or more such analytes (e.g., proteins such as C-Reactive Protein (inflammation), hormones such as Cortisol (stress/sleep), antibodies such as waning COVID-19 antibodies (immune health), hormones such as Luteinizing hormone (fertility), etc.).

Accordingly, there is a need of ubiquitous wearable biosensors capable of tracking a broad range of critical analytes (e.g., biomarkers) in real-time inside the human body (preferably using a label-free approach), to address concerns regarding general human health, pandemic response, preventative care and many others.

Disclosed herein are the devices and methods directed to monitoring one or more analytes in real-time, where these analytes may be substantially stationary or may flow with fluids inside or outside human body. The devices disclosed herein may include the above-described interrogators and/or sensor chips, which may include various integrated photonics assemblies with various light sources and detectors. When injected just below the surface of the skin, these sensor chips may be capable of monitoring one or more analytes inside the human body in real-time. The devices disclosed hereinafter may thus also be referred to as wearable biosensors.

Similar to the above described sensing systems and/or photonic biosensors, example wearable biosensors disclosed herein may perform biosensing methods that involve the binding of various analytes to a photonic (e.g., optical) component and/or cleaved of various analytes from a photonic component, and the detecting (e.g., measuring) of changes in the optical response of the photonic components. In some embodiments, the sensing process may be further performed with or without other common techniques associated with biosensing (e.g., target amplification). Other known techniques for facilitating interactions between the optical component and sensing targets, reporter probes, biological markers, pathogen, etc. (e.g., toehold switches) may be used in addition to or as an alternative to the described techniques.

In addition, to make these biosensors suitable for use as wearable devices capable of semi-invasive measurements, the sensor chips may have very small physical dimensions and may include integrated microfluidic cells. For example, in the biosensors disclosed herein, individual sensor chips (which may include multiple optical analyte sensors each capable of sensing a different analyte) may have a thickness no greater than approximately 0.5 mm and a width no greater than approximately 1 mm, a thickness no greater than approximately 1 mm and a width no greater than approximately 2 mm, or a thickness of approximately 1-2 mm and a width of approximately 2-4 mm, similar to the form factor of filaments used in other existing wearable biosensors. Each of the optical analyte sensors (e.g., ring resonators) on the tiny sensor chip can be functionalized (e.g., printed) with a capture ligand (also referred to as 'binding ligand' or simply 'binder') capable of binding an analyte of interest to enable simultaneous monitoring of multiple different analytes. Meanwhile, readers and sensor-reader coupling components may be also downsized to be compatible with the small sensor chips. In addition, in order to provide an operating lifetime of two weeks or more for the disclosed subcutaneous sensor chip (or "filament"), antifouling membrane coatings may be included. In some embodiments, protein engineering may be used to modify the binding strength of the capture ligands to match the typical concentrations of analytes in interstitial fluid.

In some embodiments, to make the disclosed biosensors suitable for real-time monitoring of interstitial fluids inside or outside the human body, the wearable biosensors may further include microneedles capable of drawing analytes from sweat, interstitial fluid or blood inside or outside the human body. In some embodiments, to make the biosensors wearable, the biosensors may include adhesive for removably attaching the biosensor housing to the skin. Depending on the applications, the specific components included in a wearable biosensor may vary and include more or fewer components than those described above, as described in detail below.

A sensor chip may include one or more biosensing photonic circuits. As used herein, "optical analyte sensor" may refer to an individual biosensing photonic circuit capable of sensing (e.g., functionalized to sense) a specific analyte. In some embodiments, a sensor chip may include between 1 and 1,000 optical analyte sensors or more. In some embodiments, two or more optical analyte sensors may be used in combination to sense a single, specific analyte. In some cases, two or more optical analyte sensors may sense the same analyte, and the signals sensed by those sensors may be averaged. In some cases, an optical analyte sensor may be used to sense a negative control, which can then be subtracted (or otherwise removed) from the signals sensed by other sensors.

3.1 Some Embodiments of Wearable Biosensors

Figure 33:
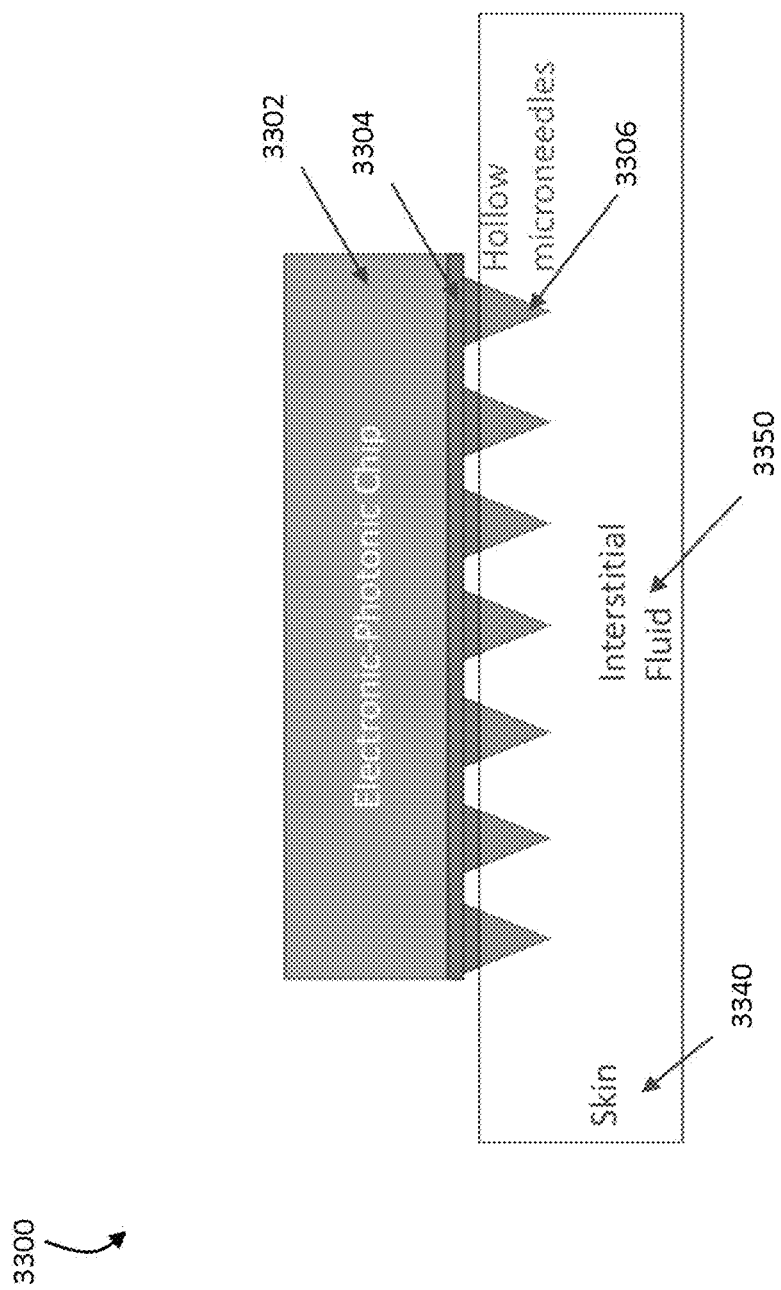
FIG. 33 is a diagram of an example wearable biosensor with a sensor chip outside human body.

FIG. 33 illustrates one exemplary wearable biosensor 3300 with a sensor chip configured to operate while disposed outside the human body. The wearable biosensor 3300 may include a photonic integrated circuit 3302 coupled to a set 3304 of hollow microneedles 3306, as illustrated in FIG. 33. The photonic integrated circuit 3302 may contain certain electronic components and optical components (e.g., light sources, photodetectors, waveguides, etc.) suitable for analyte detection. The analytes may be sensed in bodily fluids (e.g., sweat, interstitial fluid or blood) drawn by the microneedles 3306. In the example of FIG. 33, the PIC 3302 itself is not located inside the human body during the analyte sensing or monitoring. The microneedles 3306 may be fabricated via anisotropic etching and may be disposed on a same wafer as the photonic chip 3302, for example on the backside of the waiter. Alternatively, the microneedles 3306 may be fabricated on another wafer or on a molded plastic part that is mated to the photonic chip 3302 using anodic bonding or another method, so that the sweat, fluid, or blood may come into contact with the surface of the PIC 3302 via capillary action.

Although not shown, the wearable biosensor 3300 may include an adhesive that removably attaches the wearable biosensor 3300 to the surface of the skin of a human body, to render the biosensor 3300 wearable for real-time monitoring of the analytes. Although not shown, one of ordinary skill in the art will appreciate that the PIC 3302 and associated components (e.g., a power source such as a battery, an interface such as a display, a communication module such as a Wi-Fi of Bluetooth module, etc.) may be enclosed in a package (e.g., a "patch"), and the adhesive may removably attach the package to the user's skin.

Figure 34:
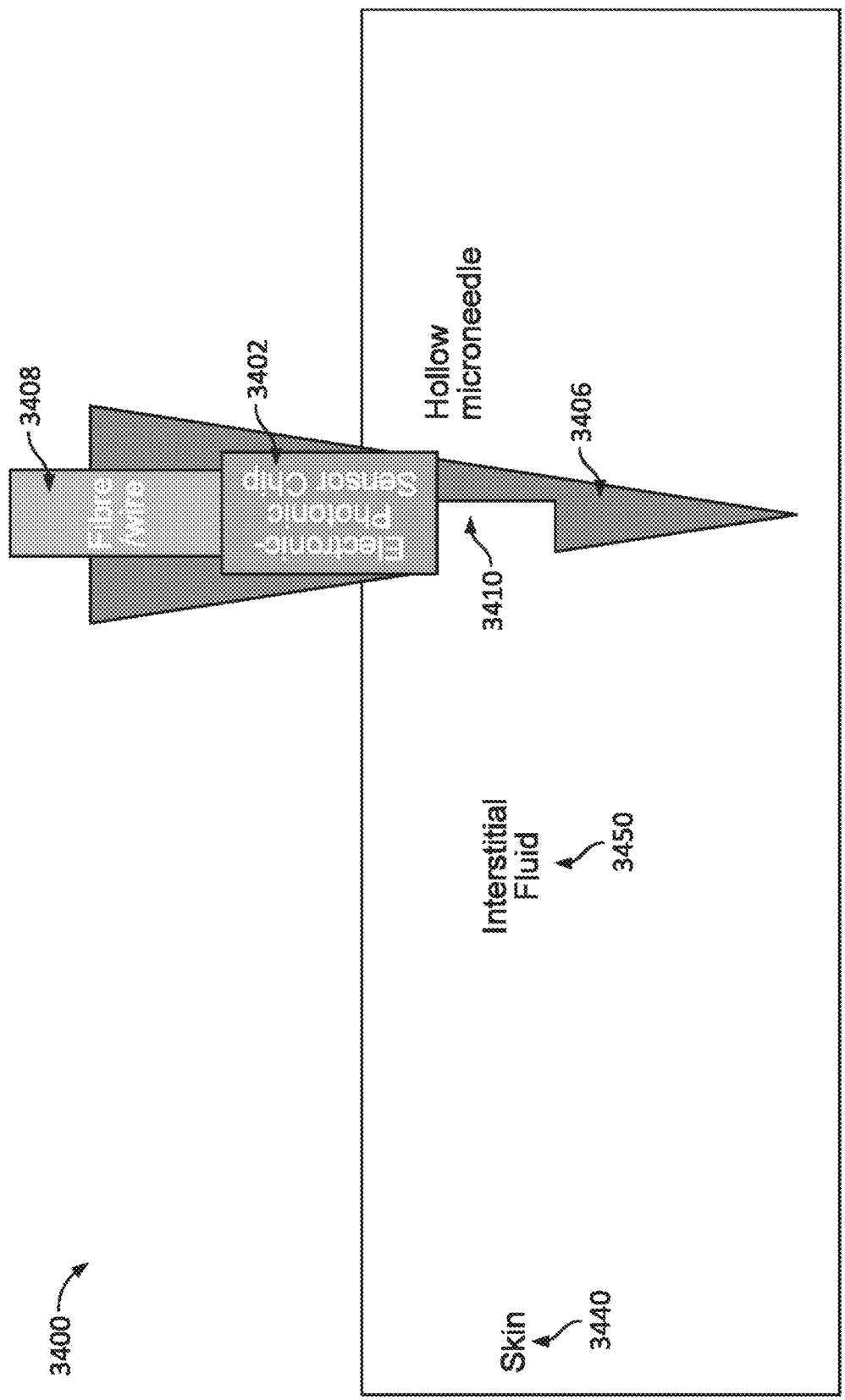
FIG. 34 is a diagram of an example wearable biosensor with a sensor chip partially inside human body.

FIG. 34 illustrates another exemplary wearable biosensor 3400 with a sensor chip configured to operate while disposed partially inside and partially outside human body. In contrast to the PIC 3302 of the wearable biosensor 3300, the PIC 3402 in the wearable biosensor 3400 is placed inside a microneedle 3406. The microneedle 3406 may be hollow for holding the PIC 3402. In some embodiments, a portion (e.g., tip) of the microneedle 3406 configured to be inserted into or under the skin may have an opening 3410. Accordingly, when the tip of the microneedle 3406 is inserted into or under the skin 3440, the PIC 3402 included therein may be partially inserted into or under the skin, as shown in FIG. 34. The opening 3410 in the microneedle 3406 may allow direct contact between a surface PIC 3402 and interstitial fluid 3450. For photonic sensing of analytes, light may be transmitted through one or more optical fibers included in an optical/electrical coupler 3408, which may couple the PIC 3402 to the light source, photodetector, reader, electronics, and/or other peripherals (not shown) used for analyte sensing. The light source, reader, and/or other peripherals may be included in a patch (not shown) and coupled to the optical/electrical coupler 3408. To allow the biosensor 3400 to be wearable, an adhesive may be also included on a bottom surface of the patch.

In the above wearable biosensors 3300 and 3400, the PIC is only partially inserted into the human body or not inserted into human body at all, which may limit the application of these wearable biosensors in monitoring certain analytes inside the human body, especially the real time monitoring of analytes contained in bodily fluids for extended periods of time. To address this concern, in some embodiments, a PIC 3402 may be configured to operate while fully or substantially disposed inside a human body.

Figure 35:
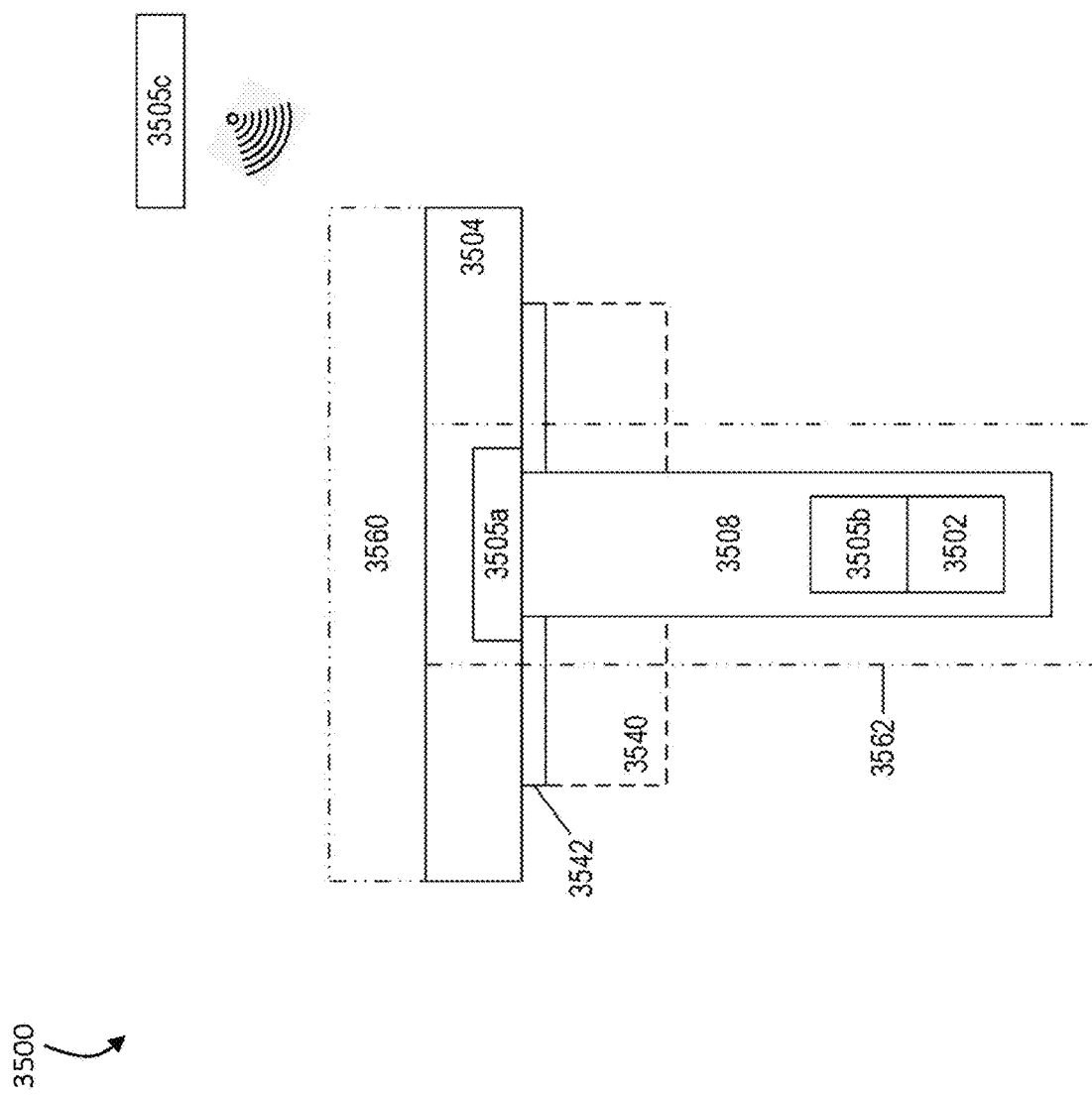
FIG. 35 is a diagram of an example wearable biosensor with a senor chip inside human body.

FIG. 35 illustrates an exemplary wearable biosensor 3500 including a sensor chip (e.g., PIC) configured to operate while fully embedded in the human body. As illustrated, the biosensor 3500 may include a sensor chip 3502 that can be completely disposed within the human body during the analyte detection or monitoring process. The sensor chip 3502 may be placed inside the human body through a microneedle 3562, which may be a hollow microneedle having an interior cavity large enough to hold the sensor chip when injecting the chip into the human body. In some embodiments, an insertion tool 3560 may be configured to facilitate the insertion of the microneedle 3562 into the human body, as illustrated in FIG. 35. The insertion tool 3560 may be removable, and thus can be removed after placing the sensor chip 3502 inside the human body. The microneedle 3562 may be capable of retracting (e.g., into the insertion tool 3560) without removing the injected sensor chip 3502 from its position under the skin 3540. Accordingly, after placing the chip inside the human body, the insertion tool 3560 and the microneedle 3562 can be removed, leaving the sensor chip 3502 inside the human body.

The components included in a sensor chip 3502 can vary widely. The sensor chip 3502 may include one or more optical analyte sensors, which may be functionalized to detect levels of particular analytes. In some cases, the sensor chip 3502 may include components of a reader system 3505b (e.g., light source(s), photodetector(s), spectrometer, interferometer, microcontroller, processor, etc.), a power source (e.g., integrated battery), and/or other peripherals. If one or more such peripherals is not included in the sensor chip 3502, the biosensor 3500 may include a coupling component 3508 that couples the sensor chip 3502 to peripherals located outside the human body during analyte sensing or detection. The coupling component 3508 may provide physical coupling, optical coupling, and/or electrical coupling. For physical coupling, a polymer sheath may be used, which physically connects the sensor chip 3502 to a patch 3504 located outside the human body. In some embodiments, the polymer sheath may be coated with a polyethylene glycol (PEG) polymer layer for anti-fouling purposes. For optical coupling, one or more of the aforementioned waveguides (e.g., optical fibers) may be used. In some embodiments, one or more splitters may be also included in the biosensor for optical coupling. For electrical coupling, a flexible connection (e.g., flexible wire) may be used. The coupling component 3508 may be flexible (e.g., sufficiently flexible to avoid causing discomfort to a user when coupling an injected sensor chip 3502 to a patch 3504).

As illustrated in FIG. 35, the biosensor 3500 may also include a patch 3504 that removably attaches to the surface of the skin 3540 with the assistance of adhesive 3542.

Enclosed within the patch 3504, there may be components of a reader system 3505a and/or other peripherals. The components of the reader system 3505a may have a pluggable connection to the subcutaneous sensor chip (e.g., via the coupling component 3508), allowing the components of the reader system 3505a to be reused even if the sensor chip 3502 is disposable or swappable. In some embodiments, the pluggable connection may comprise a custom ferrule that uses precision holes to align to pins on the reader. For example, either waveguides in the sensor chip 3502 or fibers in the coupling component 3508 may align with the photonic components in the reader 3505a through the pluggable connection. In some embodiments, the pluggable connection may be a multi-fiber push on connector (MPO).

An example has been shown in which a portion of a reader system 3505a is located in the patch 3504 and a portion of a reader system 3505b is co-located with the sensor chip 3502. For example, the portion of the reader system 3505a may include a light source and the portion of the reader system 3505b may include a corresponding photodetector. Alternatively, the portion of the reader system 3505b may include the light source and the portion of the reader system 3505a may include the corresponding photodetector. In some embodiments, all optical components of the reader system are located on the portion of the reader system 3505b, while some or all electrical components of the reader system are located on the portion of the reader system 3505a. In such embodiments, there may be no optical coupling between the sensor chip 3502 and the patch 3504. In some embodiments, all components of the reader system are located in the patch. In other embodiments, all components of the reader system are co-located with the sensor chip.

Examples have been described in which portions of a reader system 3505 are disposed in the patch 3504, co-located with the sensor chip 3502, or disposed remotely from the patch 3505 and the sensor chip 3502. In some embodiments, the reader system 3505 may include an interrogator (or "optical reader"), which may provide optical signals to the sensor PIC and convert optical sensors received from the sensor PIC into raw data. In some embodiments, the reader system 3505 may further include one or more processing devices (or computers) that analyze the raw data generated by the interrogator to determine one or more characteristics of one or more sensed analytes. Any suitable processing devices (or computers) may be used, for example, microprocessors or central processing units (CPUs).

More generally, the peripherals included in the biosensor 3500 may be located at different parts of the biosensor or even located remotely from the other portions of the biosensor. For example, some peripherals may be located inside the sensor chip 3502, while other peripherals may be located inside the patch. Alternatively, some peripherals may be remotely located and may communicate with the components located in the patch 3504 and/or with the sensor chip 3502 through wireless communication. Some non-limiting configurations of peripherals and/or other biosensor components are further illustrated in FIGS. 36A-42B.

Figures 36A, 36B:
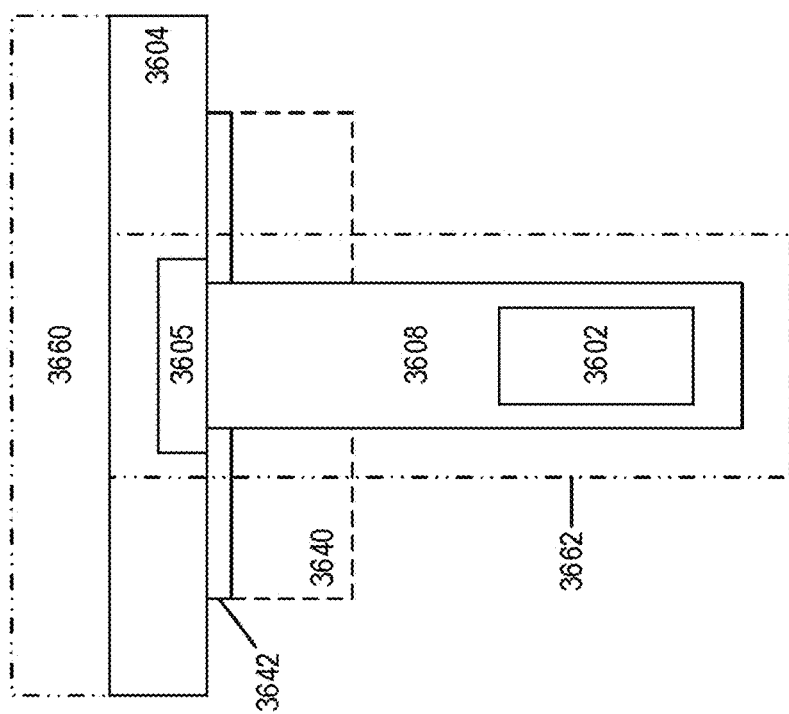

FIGS. 36A-36B illustrate an exemplary wearable biosensor 3600 with sensor chip 3602 embedded in a coupling component 3608. The coupling component is coupled to a patch 3604 containing peripherals (e.g., reader 3605, battery, etc.) via one or more electrical wires, optical waveguides (e.g., fibers), or both. The sensor chip 3602 may be a PIC, which may include one or more optical analyte sensors. In some embodiments, the optical analyte sensors are coated with a non-fouling coating (e.g., PEG polymer, zwitterionic polymer, lipid or bilipid membrane layer, etc.). In some embodiments, each of the optical analyte sensors may be functionalized to detect target analytes by coating the optical analyte sensor with a layer of binding ligands (e.g., antibodies, aptamers, peptides, enzymes, Oligonucleotides, scFV synthetic antibody fragments, etc.) or other binding materials suitable for binding to the target analytes.

To facilitate monitoring inside the human body, the sensor chip 3602 may be injected into the body through a retractable hollow needle 3662, as shown in FIG. 36B. In some embodiments, an insertion tool 3660 is used to insert the hollow needle 3662 and the sensor chip 3602 included therein into (or under) the skin 3640. In some embodiments, the biosensor 3600 includes an adhesive 3642 that removably attaches the patch 3604 to the skin 3642 (e.g., after injecting the sensor chip 3602). The insertion tool 3660 and hollow needle 3662 may be removed after injecting the sensor chip 3602, as shown in FIG. 36B. The patch 3604 included in the biosensor 3600 may stay on top of the skin with the assistance of adhesive 3642.

Figure 37B:
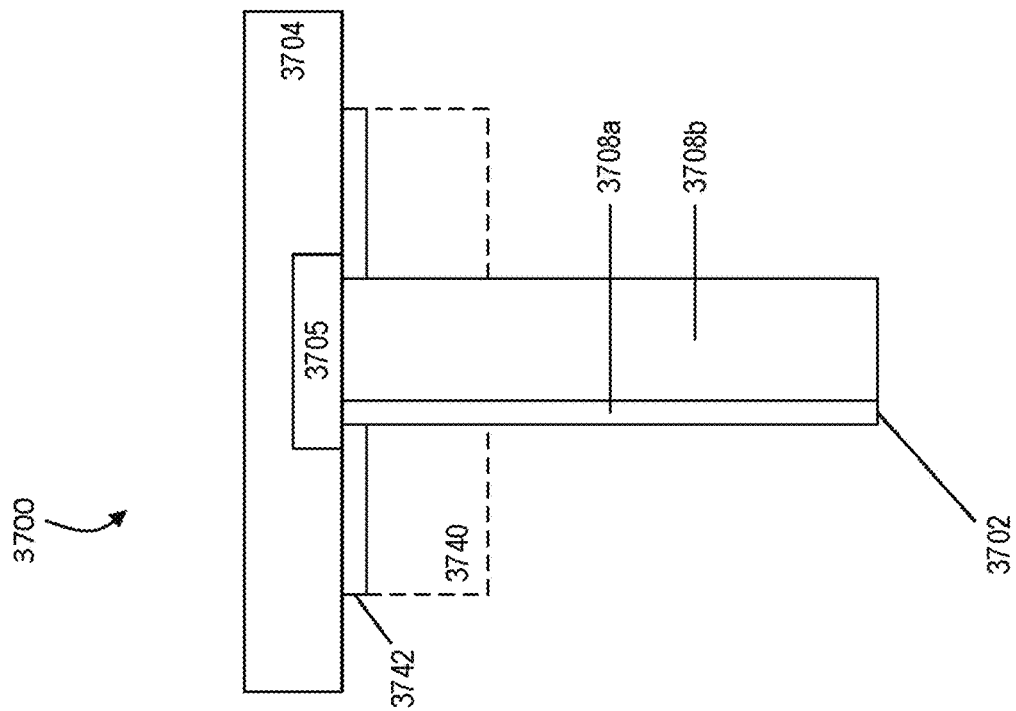
Figure 37A:
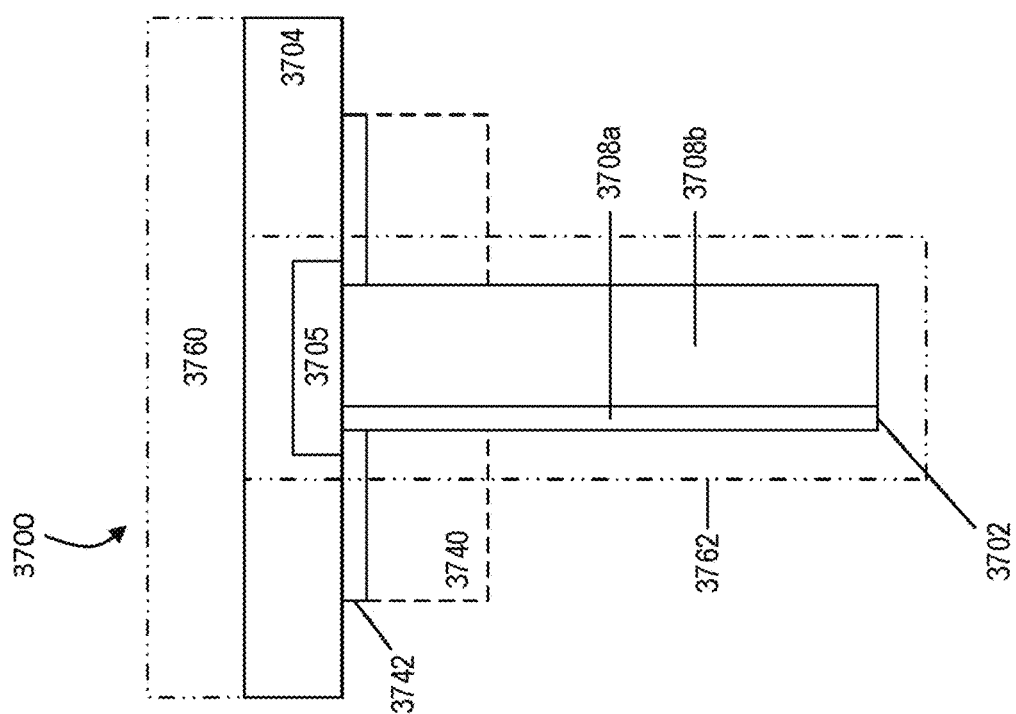

FIGS. 37A-37B illustrate another exemplary biosensor 3700. No sensor chip or other PIC of the biosensor 3700 is injected in or under the skin. Rather, the optical analyte sensors 3702 of the biosensor 3700 are portions of one or more optical fibers 3708a (e.g., a single-core optical fiber, a multicore optical fiber, multiple optical fibers (e.g., a ribbon fiber), etc.). Each of the optical analyte sensors may be functionalized to sense a target analyte. The functionalized portion of the fiber (e.g., a tip of the fiber, a bend in the fiber that exposes an evanescent wave, etc.) may also act as a reflector (for absorbance spectroscopy or resonance sensing), an interferometer (for biolayer interferometry), etc. In one example, an optical analyte sensor 3702 may be functionalized for biolayer interferometry and may be embedded in a coupling component 3708b (e.g., flexible polymer sheath or polymer ribbon) that is inserted into the human body via a hollow needle 3762. In addition, the optical analyte sensors 3702 may be connected to a reader 3705, which may be implemented as a PIC and may contain any suitable components (e.g., light sources, readout optics, etc.) for interrogating the optical analyte sensors to sense analyte levels. The reader 3705 may be located inside the patch 3704, outside the surface of the skin 3740. As illustrated in FIGS. 37A and 37B, an insertion tool 3760 and a hollow needle 3762 can be removed or retracted after placing the optical analyte sensors 3702 inside the human body.

In contrast to the wearable biosensor 3600, no sensor chip or other PIC of the biosensor 3700 is injected in or under the skin, which simplifies manufacturing of the biosensor 3700 and reduces the cost of the disposable optical analyte sensors 3702. In addition, the PIC(s) of the biosensor 3700 may have a significantly longer operational lifetime than the sensor chips 3602 of the wearable biosensor 3600, which may extend the lifetime of the wearable biosensor 3700.

Figures 38A, 38B:
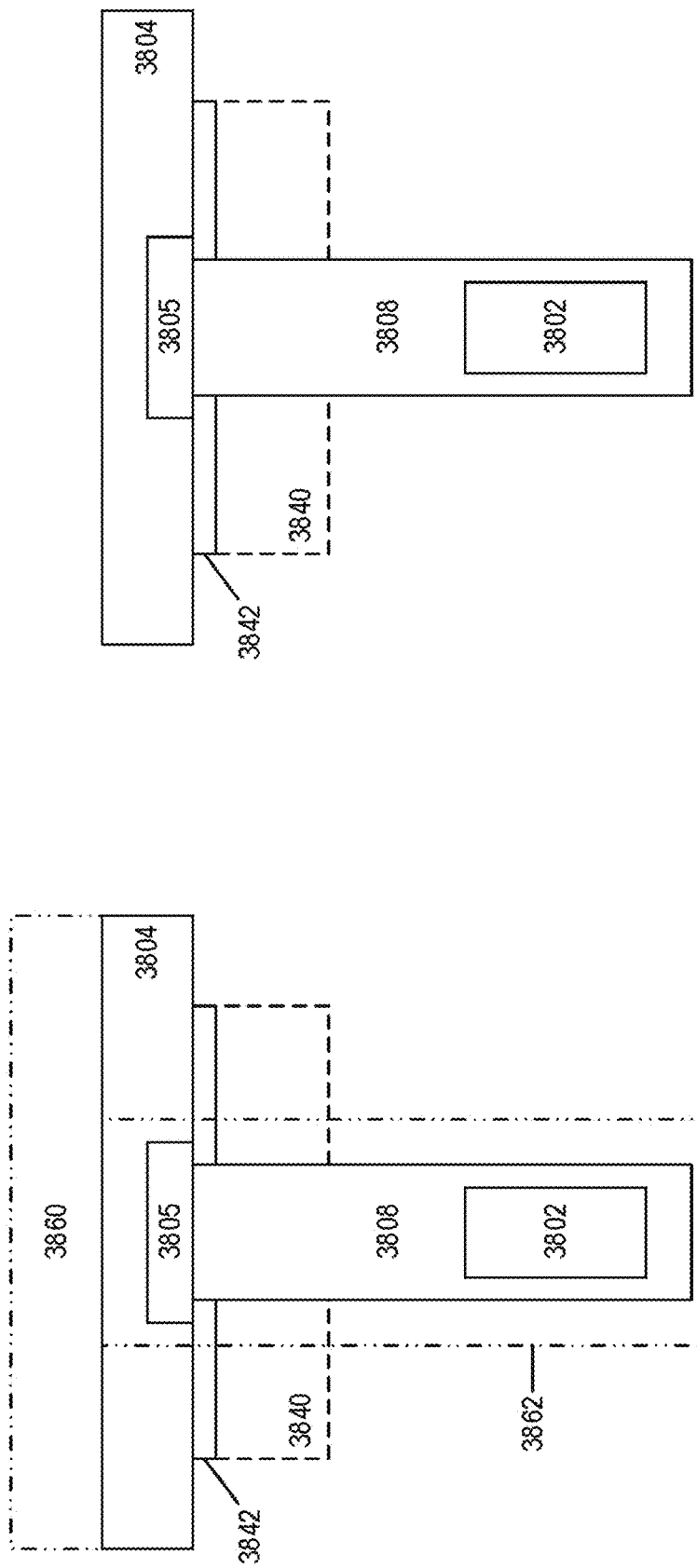

FIGS. 38A-38B illustrate yet another exemplary wearable biosensor 3800, according to some embodiments. Similar to the wearable biosensor 3600, the wearable biosensor 3800 also includes a sensor chip 3802 with one or more functionalized optical analyte sensors, a coupled reader 3805, a coupling component 3808, a patch 3804, and an adhesive 3842 for removably attaching the wearable biosensor 3800 to the surface of the skin 3840. Likewise, a retractable hollow needle 3862 and a removable insertion tool 3860 may be used to inject the sensor chip 3802 into or under the skin 3840. The main difference between the wearable biosensor 3800 and wearable biosensor 3600 may be the inclusion or locations of various optical and/or electronic components in the sensor chip 3802, the reader 3805, and/or the patch 3804. For example, the reader 3805 may include a laser (e.g., a tunable laser such as a MEMS vertical-cavity surface emitting laser (VCSEL), and the patch 3804 may include a microprocessor.

Figures 39A, 39B:
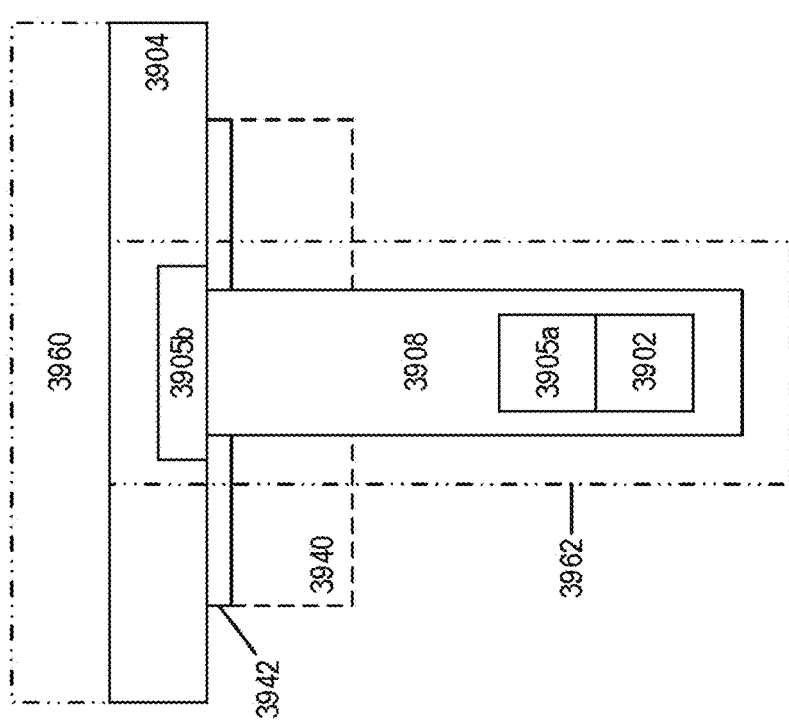

FIGS. 39A-39B illustrate yet another exemplary wearable biosensor 3900, according to some embodiments. Similar to the wearable biosensor 3600, the wearable biosensor 3900 includes a sensor chip 3902 with one or more functionalized optical analyte sensors, a coupling component 3908, a patch 3904, and an adhesive 3942 for removably attaching the wearable biosensor 3900 to the surface of the skin 3940. Likewise, a retractable hollow needle 3962 and a removable insertion tool 3960 may be used to inject the sensor chip 3902 into or under the skin 3940. The main difference between the wearable biosensor 3900 and wearable biosensor 3600 is that the sensor chip 3902 may be integrated with some or all portions of the reader 3905a. In some embodiments, some portions of the reader 3905b may be located in the patch 3904.

Figure 40:
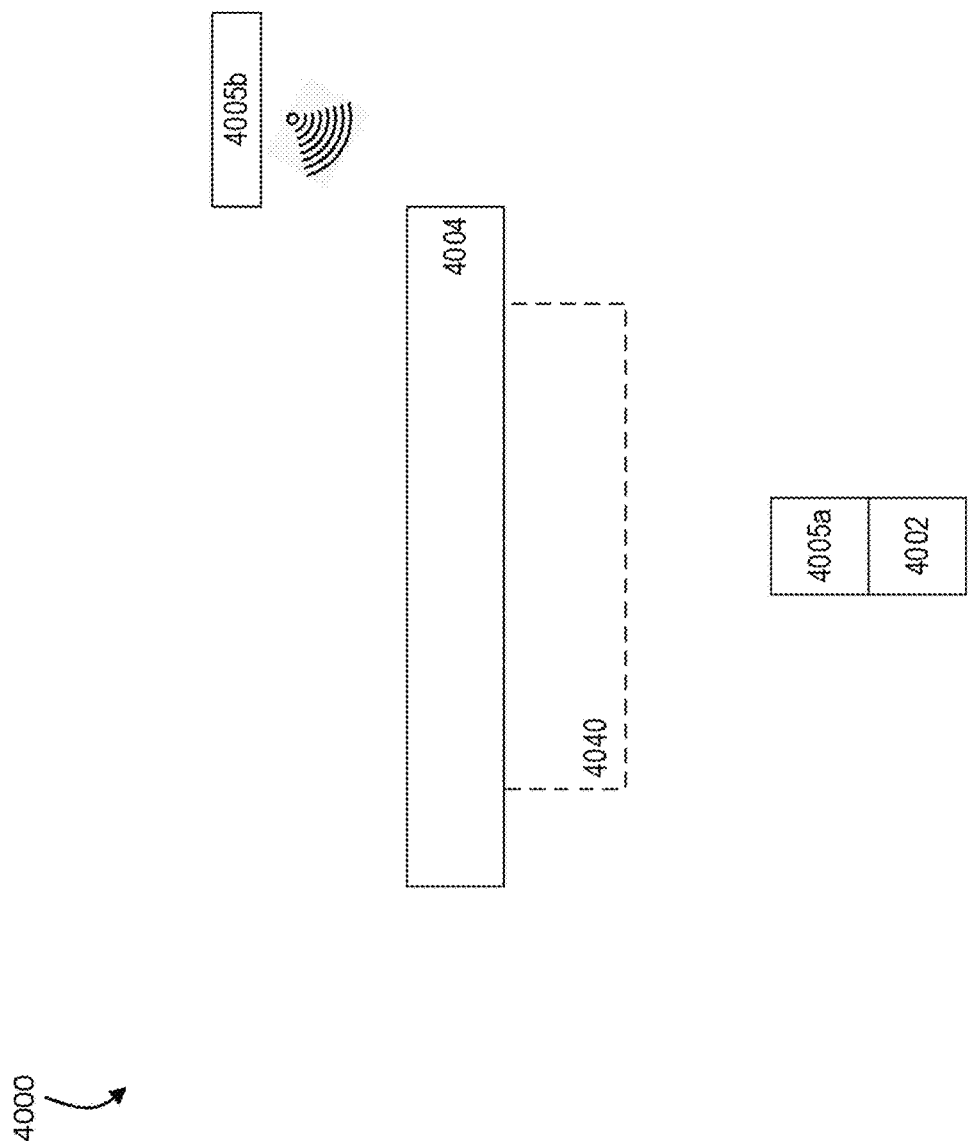

FIG. 40 illustrates another embodiment of a wearable biosensor 4000. The biosensor 4000 may include a sensor chip 4002 (with an integrated portion of a reader 4005a) configured to operate inside a human body, as well as a portion of a reader 4005b configured to operate outside the human body. In some embodiments, the biosensor 4000 includes a patch 4004 that is removably attachable to the surface of the skin 4040. In contrast to the wearable biosensors of FIGS. 36-39, biosensor 4000 includes no physical component coupling the sensor chip 4002 to the patch 4004 or to the reader 4005b. Rather, the sensor chip 4002 may wirelessly communicate with the reader 4005b, which may be enclosed in the patch 4004 or disposed remotely. In some embodiments, the reader 4005b may include software (e.g., a mobile app) installed on a mobile device configured for wireless communication. The data generated by the sensor chip 4002 may be wirelessly transmitted to the reader 4005b, which may provide the measured analyte information to the user. In embodiments in which the reader 4005b is disposed remotely from the user, the biosensor 4000 may not include a patch 4004.

In some embodiments, an electrical power source (e.g., battery) may be integrated into the sensor chip 4002 to provide power to the sensor chip. The power source may be an embedded battery, a standalone battery or a thin-film battery that is part of the sensor chip 4002.

Additionally or alternatively, the power source may include a power converter that converts glucose or other energy sources inside the human body into electrical energy. In some embodiments, the power source may include a wireless power receiver that electrical power transferred from a power source outside the body, such as a smartwatch, via light or radiofrequency (RF) waves.

Figure 41:
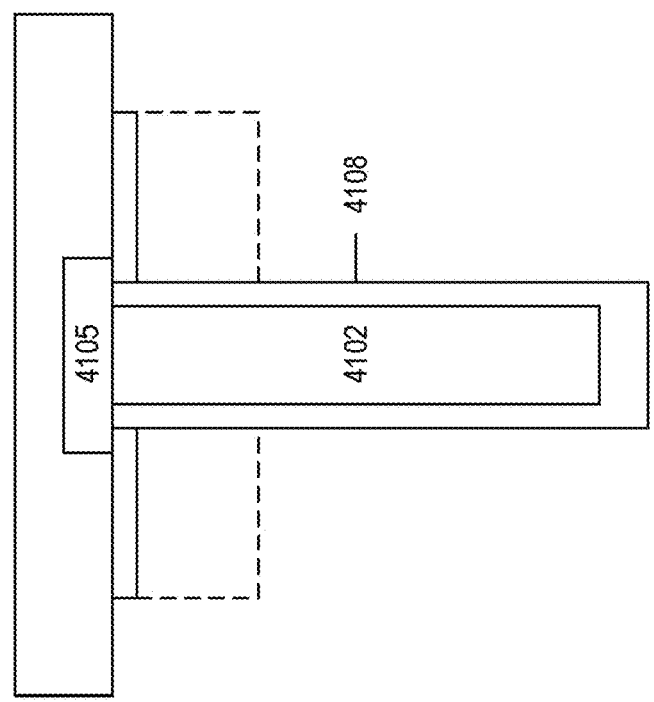

FIG. 41 illustrates another exemplary wearable biosensor 4100, in which the sensor chip 4102 is configured to operate within the human body and to connect (e.g., directly couple) to a reader 4105 rather than coupling to the reader through an intermediate wire or fiber. The sensor chip 4102 may be thinned down and encapsulated in a flexible polymer sheath 4108 (or attached to a flexible polymer substrate) such that the sheath (or substrate) and the sensor chip can bend like a fiber. This configuration facilitates very dense placement of silicon, silicon nitride or other waveguides on the sensor chip 4102 (e.g., as little as 1 um apart), allowing the biosensor 4100 to provide a large number of optical analyte sensors (e.g., between 5 and 10, between 10 and 100, between 100 and 1000, or more than 1000 optical analyte sensors) on a sensor chip 4102 that has a thickness of approximately 0.5-1 mm (or less) and a width of approximately 1-2 mm (or less). As described above, the reader 4105 may be enclosed in a patch, which may be removably attached to the user's skin by an adhesive.

Figure 42B:
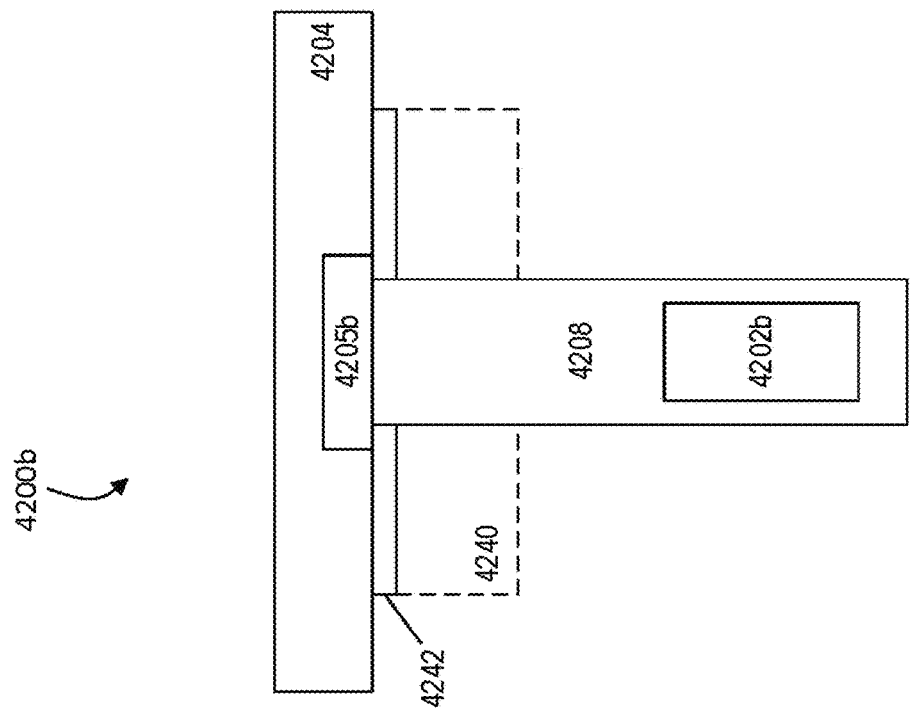
Figure 42A:
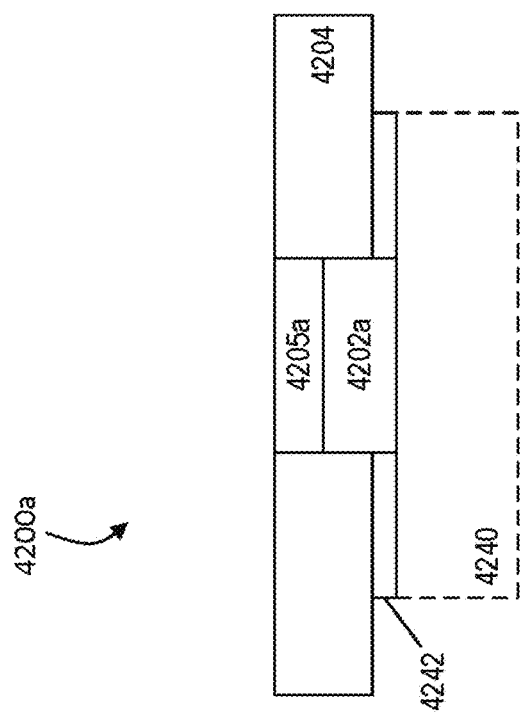

FIGS. 42A-42B illustrate another exemplary wearable biosensor 4200 capable of using Optical Coherence Tomography (OCT) to measure analyte levels from the surface of the skin or from a location under the skin. In particular, FIG. 42A illustrates a wearable biosensor 4200a with an OCT sensor chip 4202a configured to operate above (e.g., on) the skin, and a reader 4205a configured to read the analyte levels sensed by the sensor chip 4202a. The reader 4205a may be disposed in a patch 4204, which may be removably attached to the skin 4240 via an adhesive 4242. In some embodiments, the sensor chip 4202a may be partially enclosed within the patch 4204, with one surface of the sensor chip 4202 being exposed to the skin 4240. In some embodiments, the light waves generated by the sensor chip 4202a penetrate the user's tissue to a depth of 1 to 2 mm, and then, depending on the concentration of analyte, reflect with varying intensity, the value of which can be determined by the reader 4205a.

In some embodiments, the OCT sensor chip 4202b can be placed slightly under the skin, as shown in FIG. 42B. The sensor chip 4202b may be similarly embedded inside a polymer sheath as other biosensors and may be also coupled to a reader 4205b in a patch 4204 on the surface of skin 4240.

In some embodiments, the OCT sensor chips 4202 may emit and detect light using grating couplers or edge couplers. In some embodiments, a sensor chip may combine OCT sensing components with other sensing components using the aforementioned grating couplers or edge couplers to send light and receive light.

It is to be noted that the embodiments of the wearable biosensors illustrated in FIGS. 34-42B are provided for exemplary purposes, but not for limitation. The wearable biosensors may include many other arrangements of structures and components as described elsewhere in this disclosure.

3.2 Biosensing Techniques Used by Some Embodiments of Wearable Biosensors

As described above, components of the optical analyte sensors (e.g., MZIs, photonic crystals, waveguide spirals or other structures for absorbance spectroscopy, gratings, optical microrings, subwavelength optical microrings, field effect transistors, electrodes for resistance or cyclic voltammetry, etc.) of a wearable biosensor can be functionalized to sense target analytes by coating such components with a layer of binders configured to bind the respective target analytes. Any suitable binders may be used, for example, antibodies, aptamers, peptides, enzymes, oligonucleotides, scFV synthetic antibody fragments, etc.

In some embodiments, the optical analyte sensors may practice label-free sensing, meaning that the sensors detect the target analytes themselves (or the optical effects of the target analytes themselves), rather than sensing labels (e.g., fluorescent tags) bound to the target analytes (or the optical effects of such labels) or signals generated by the degradation of the target. In some embodiments, the optical analyte sensors may practice label-based sensing.

In some embodiments, the optical analyte sensors may use reversible assay techniques to sense the target analytes. With a reversible assay technique, the target analytes continually bind to and unbind from the binders at varying rates until an equilibrium between the binding and unbinding rates is reached at the surface of the optical analyte sensor. When this equilibrium in the interaction between the binder and target analyte is reached, the density or concentration of the analyte at the surface of the optical analyte sensor stabilizes, allowing the optical analyte sensor to sense the concentration or density of analytes in the fluid.

In some embodiments, the use of reversible assays and optical sensing techniques allows the biosensors to track the concentration (or density) of target analytes at the surfaces of the optical analyte sensors as those analyte concentrations fluctuate over time. In addition, using microprinting, it is possible to multiplex many optical analyte sensors on a single sensor chip, as well as controls that allow the subtraction of background noise generated from nonspecific binding (e.g. albumin and other proteins in blood). For example, by tracking the slow changes in the resonance of microring sensors (e.g., using a swept laser source with data points collected every few seconds, every few minutes, or even every hour to save power), it is possible to track the concentration of an analyte as it varies at the surface of the microring, if the microring is functionalized with a binder that binds to the target analyte specifically.

In some embodiments, the binding site of the optical analyte sensor is coated with binders having a concentration (Kd) in the middle of the expected physiological range of concentrations for the target analyte. For example, if the expected physiological range of concentrations for the target analyte is 0-10 millimolar, the binding site may be coated with binders having a concentration of Kd=5 millimolar. This approach helps the optical analyte sensor avoid saturation at high concentrations of the target analyte, and also helps the optical analyte sensor provide adequate sensitivity to low concentrations of the target analyte.

Figure 43:
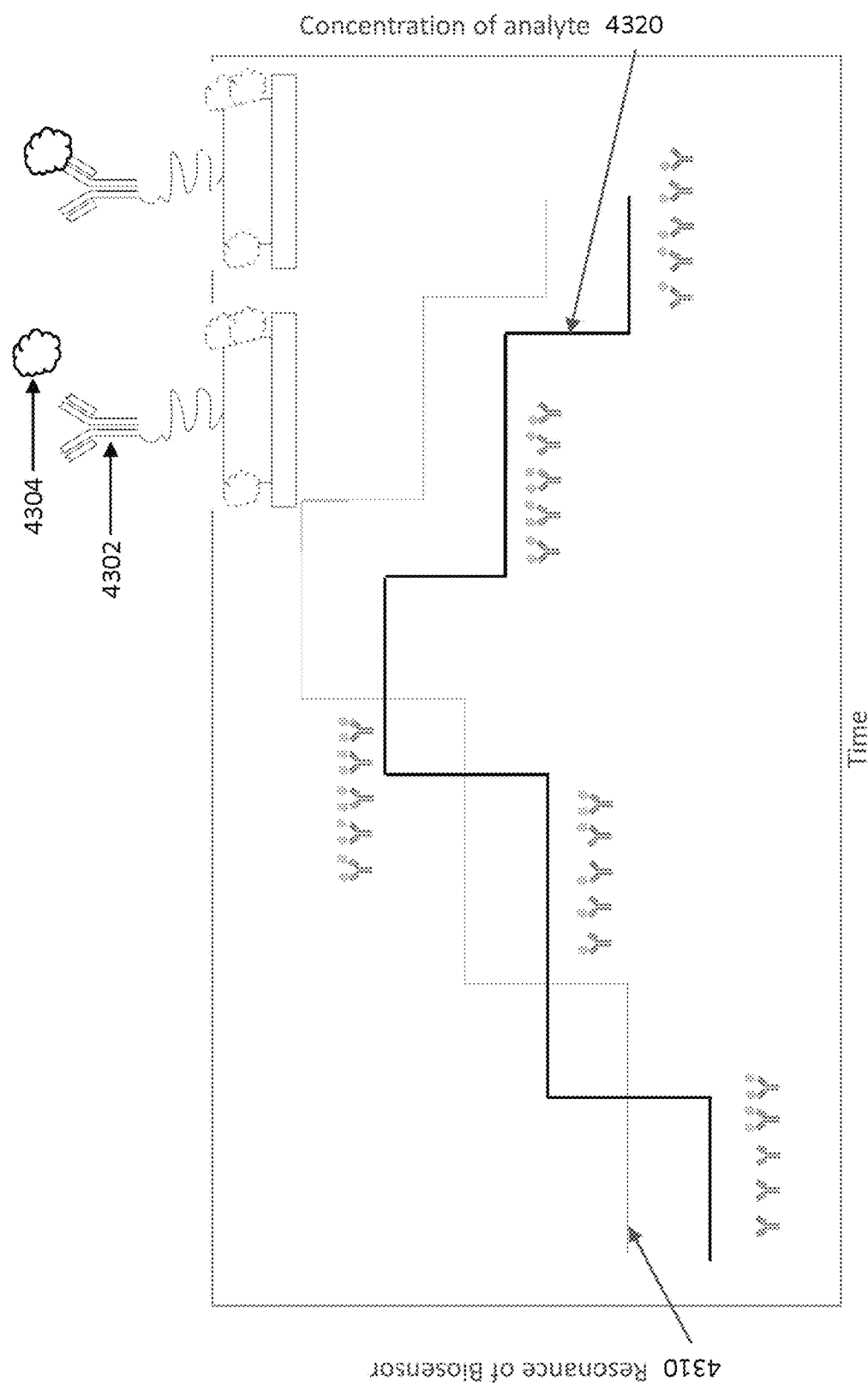
FIG. 43 is a diagram illustrating a measured resonance change by a wearable biosensor when concentration of analyte fluctuates.

FIG. 43 illustrates an exemplary process of sensing an analyte using a label-free, reverse binding assay and a ring resonator. In the example of FIG. 43, the optical analyte sensor is functionalized using an antibody, aptamer, peptide, or another binder 4302 that can reversibly bind to the analyte 4304. The fluctuation of analyte concentration can be monitored in real time, as shown by the measured resonance wavelength 4310 of the optical analyte sensor's ring resonator. In FIG. 43, the fluctuation of analyte concentration over time is shown by the line 4320, where the amount of analyte bound to the binder reflects a concentration of the analyte in the interstitial fluid over time. As can be seen, the concentration of analyte increases initially and then decreases later. As can be seen from the patterns of the lines 4310 and 4320, the fluctuations in the measured resonance wavelength of the ring resonator match (with some lag) the fluctuation of the analyte concentration over time. This lag corresponds to the time during which the reversible assay achieves a new equilibrium when the concentration of the analyte fluctuates. Other factors such as light and/or electronic signal transmission and processing may also cause the delayed measurement of the resonance wavelength, but these factors are generally negligible.

Referring again to FIG. 20C, some embodiments of optical analyte sensors may use absorption spectroscopy to monitor the levels of target analytes over time. If a target analyte (or a probe cleaved by a cleavage enzyme) is absorptive of wavelengths of light guided by a waveguide, the intensity of the light in the waveguide may change when the analyte (or probe) is present at the surface of the waveguide, and the change in the light's intensity may be related to the concentration of the analyte. Thus, absorption spectroscopy may be used instead to measure the analyte's concentration at the surface of the optical analyte sensor. For example, absorbance measurements may be taken using the overlap of the waveguide evanescent field and the interstitial fluid. This technique can, for example, be used to monitor ketones via a peak at approximately 1700 nm or glucose via various peaks in the infrared wavelengths (e.g., approximately 1550 nm) and visible wavelengths.

Figure 44:
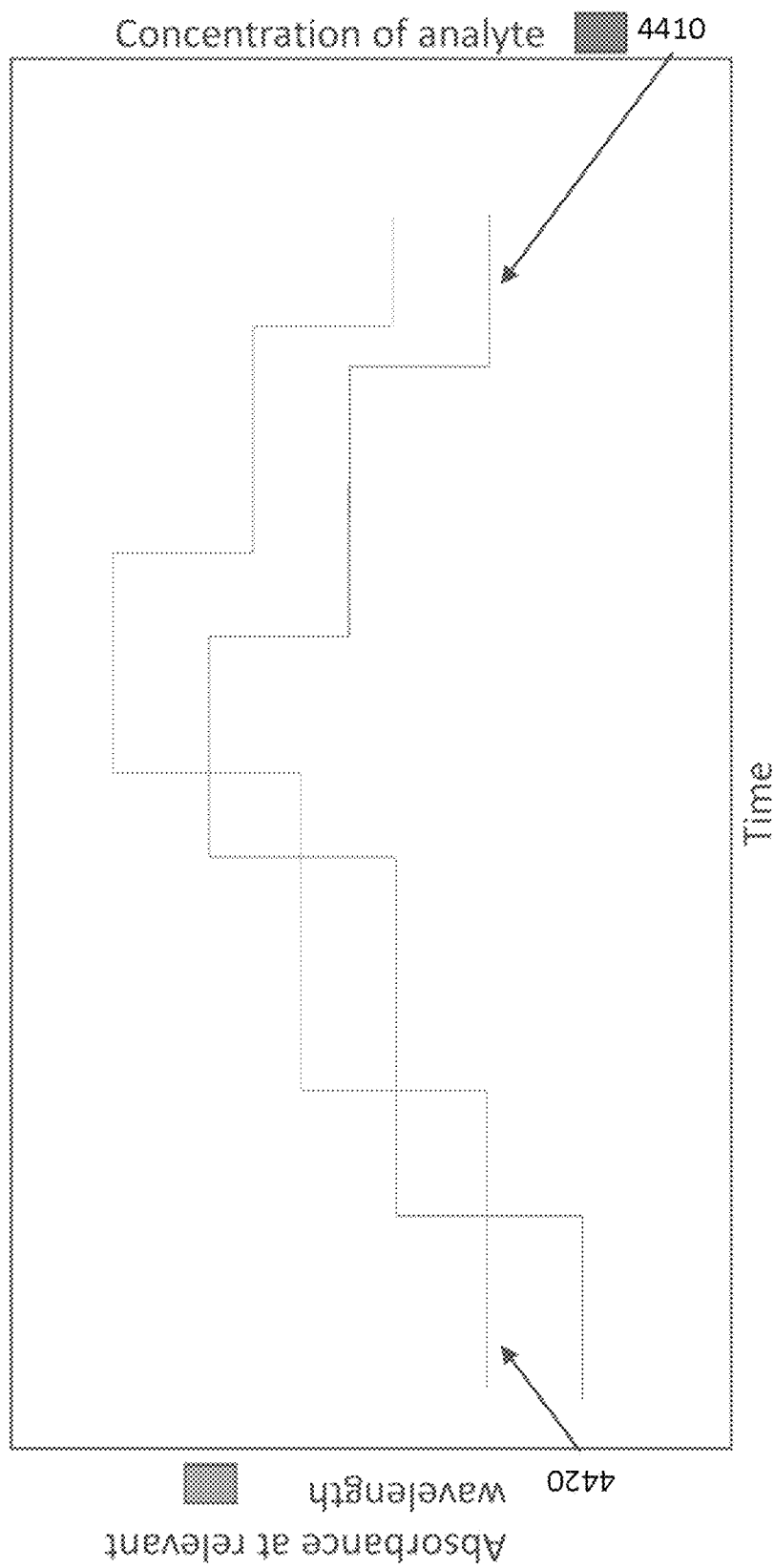
FIG. 44 is a diagram illustrating a measured absorbance change by a wearable biosensor when concentration of analyte fluctuates.

FIG. 44 illustrates an exemplary process of sensing an analyte using a reverse binding assay and absorption spectroscopy. In the example of FIG. 44, the optical analyte sensor is functionalized using an antibody, aptamer, peptide, or another binder that can reversibly bind to the analyte. In some embodiments, labels may be used to increase the sensor's sensitivity to the analyte. The fluctuation of analyte concentration can be monitored in real time, as shown by the measured absorbance 4420 of the sensing channel of the optical analyte sensor at the relevant wavelength(s) (e.g., the wavelengths specifically absorbed by the analyte or label). In FIG. 44, the fluctuation of analyte concentration over time is shown by the line 4410. As can be seen, the concentration of analyte increases initially and then decreases later. As can be seen from the patterns of the lines 4410 and 4420, the fluctuations in the measured absorbance of the sensing channel (at the relevant wavelengths) match (with some lag) the fluctuation of the analyte concentration over time. This lag corresponds to the time during which the reversible assay achieves a new equilibrium when the concentration of the analyte fluctuates.

In some embodiments, besides the reverse binding assays, any other suitable assays may be used by the wearable biosensors disclosed herein to monitor analyte levels. For example, an enzymatic assay may be used. According to one embodiment, an enzyme or a cascade of enzymes can be used to continuously processes an analyte to create a signal based on the analyte concentration. The created signal may be an electrochemical signal as in the classic case of glucose monitoring or may be a signal created through another process such as the accumulation of bound or insoluble mass on the surface of an optical analyte sensor (e.g., a photonic microring sensor). The mass of the analyte accumulated on the surface of the sensor may be sensed based on the extent of the red-shift in the ring's resonant wavelength. In some embodiments, the reader may infer the concentration of the analyte based on the rate of change (e.g., increase) in mass at the surface of the sensor.

Figure 45:
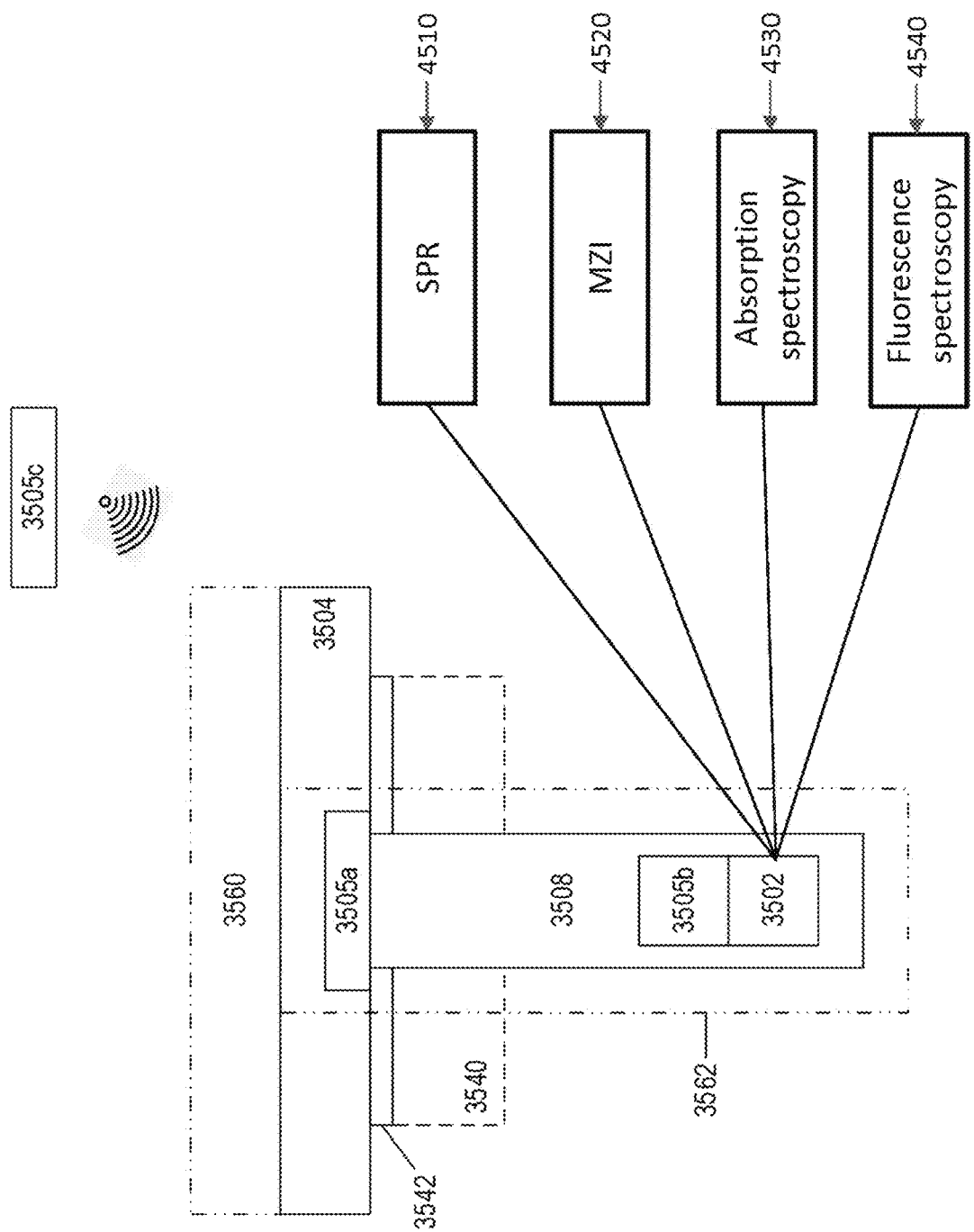
FIG. 45 is a diagram of an example wearable biosensor with possible optical architectures.

In some embodiments, the wearable biosensors may use any suitable optical biosensing techniques to monitor analyte levels. Referring to FIG. 45, in addition or as an alternative to the optical biosensing techniques described above, a sensor chip may be configured to use Surface Plasmon Resonance (SPR) 4510, Mach-Zehnder interferometry (MZI) 4520, absorption spectroscopy 4530, fluorescence spectroscopy 4540, and/or any other suitable optical biosensing technique to monitor analyte levels.

An optical analyte sensor configured for SPR-based sensing may be functionalized by coating the surface of a waveguide (e.g., a bimodal waveguide) in a subwavelength thin film of gold. In general, any label-free assay and any optical sensing technique that detects a change in the refractive index of the waveguide can be used. SPR has a large optical field overlap with the liquids (e.g., bodily fluids) that are being monitored. Thus, SPR-based sensing may provide a highly sensitive label-free sensor.

Some embodiments of optical analyte sensors configured for MZI-based sensing are described above with reference to FIGS. 20A-20B. As described above, the sensing channel of the waveguide may be functionalized to sense the target analyte. The reference channel may not be functionalized to sense the target analyte or may be functionalized to sense the target analyte but not brought into contact with the interstitial fluid. With MZI-based sensing 4520, the length of the functionalized portion of the sensing channel's waveguide may determine the sensitivity in nm/RIU (refractive index units) and any difference in length between the waveguides of the reference and sensing channels may affect the spectral response.

Some embodiments of optical analyte sensors configured for absorption spectroscopy-based sensing are described above with reference to FIG. 20C. Any suitable type of absorption spectroscopy-based sensing may be used, e.g., ultraviolet-visible (UV-vis) absorption spectroscopy, infrared absorption spectroscopy, etc. Absorption-spectroscopy-based sensing may be particularly helpful for sensing small molecules that are present in relatively high concentrations.

An optical analyte sensor configured for fluorescence-based sensing may include waveguides configured to excite and collect fluorescence via the evanescent field. In some embodiments, a first waveguide excites fluorescence and a second waveguide (e.g., a 0-mode waveguide oriented orthogonally to the first waveguide) collects the fluorescent emissions. In some embodiments, a crossbar array of waveguides may be used, such that the detection waveguides are orthogonal to the excitation waveguides and not in the path of the excitation light. In some embodiments, the sensor may include on-chip filters to filter the fluorescent output from the input signal before it enters a detector. Alternatively, a pulsed light approach may be used to excite fluorophores and then collect the emission while the excitation source is shut off.

In some examples, the fluorescent emission captured by the waveguide may be directed to a photodetector or a CMOS/CCD array pixel. In other examples, the captured fluorescent emission may be directed to the wearable biosensor's reader (e.g., via a waveguide) for detection of the fluorescent signal.

In some embodiments, fluorescence-based sensing techniques may be used in combination with labels (e.g., fluorescent labels) or they may be used to detect specific analytes that auto-fluoresce. In some embodiments, fluorescence-based sensing techniques may be used to measure the quenching of fluorescence from a pre-attached material or polymer on the sensor surface as the analyte binds.

3.2.1. Optical Architectures of Wearable Biosensors

There are several potential optical architectures that can be utilized in the disclosed wearable biosensors. In some examples, a narrow-band sweep of relevant optical wavelengths can be used to interrogate ring resonator-based optical analyte sensors, which may be sufficient to achieve small and macromolecule sensing. In some embodiments, a narrow-band sweep may set a floor on the size of the ring resonator, limiting the number of optical analyte sensors on the sensor chip to approximately 10-50 for a sensor chip having a width of approximately 400 microns. With this architecture, the laser configuration can be relatively simple and, in some cases, no electrical coupling between the sensor chip and the patch is needed.

In some embodiments, a broadband tunable laser or spectrometer may be used to conduct a broadband sweep, as an alternative to the narrow-band sweep described above. This architecture may provide enhanced functionality (e.g., smaller ring resonators may be used, which may facilitate the integration of a greater number of optical analyte sensors on the sensor chip), while still avoiding the requirement of electrical coupling between the sensor chip and the patch.

In some embodiments, a miniaturized spectrometer can be utilized for both label-free sensing techniques and for absorption spectroscopy-based sensing techniques. The spectrometer may be used in combination with a broadband light source such as an LED.

In some embodiments, Raman spectroscopy-based sensing techniques may be used instead of or in combination with absorbance spectroscopy-based sensing techniques, refractive index-based sensing techniques (e.g., ring resonator-based techniques and MZI-based techniques), and/or other modes of sensing.

3.2.2. Techniques for Enhancing Sensor Sensitivity

Figure 46B:
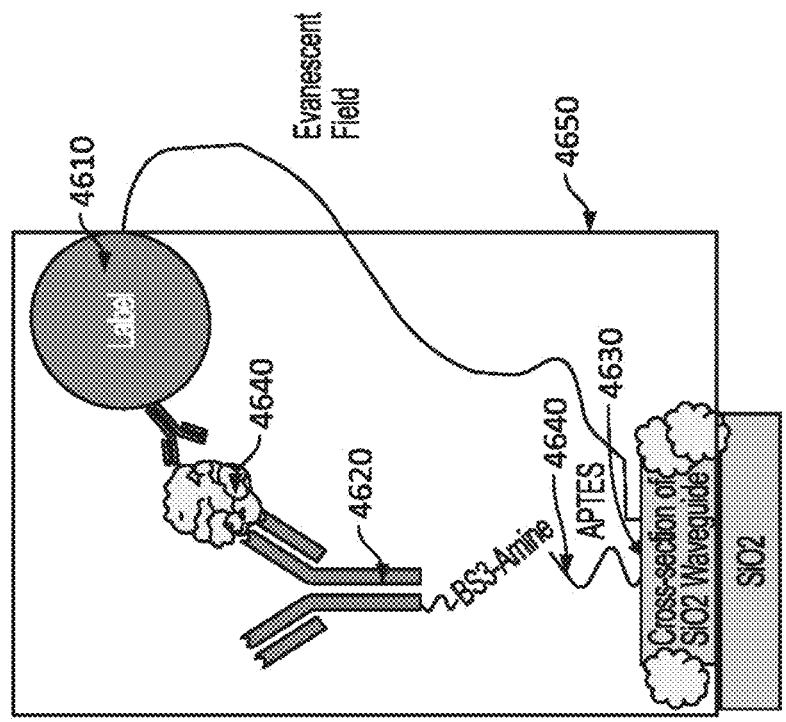
FIG. 46 is a diagram of an example sensor chip functionalized with a label bound to a waveguide through a long arm.
Figure 46A:
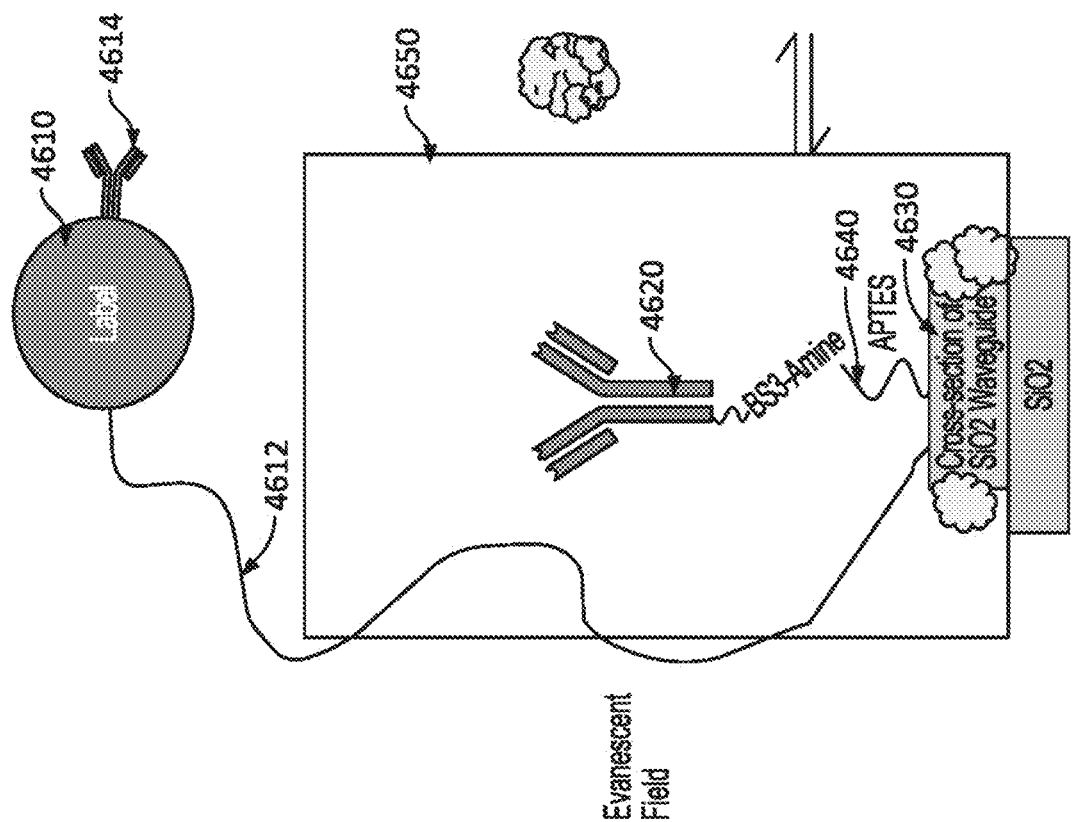

In some embodiments, the sensitivity of an optical analyte sensor may be increased by using a label-based assay to enhance the signal used in the analyte detection. If the sensor chip is exposed to bodily fluid or other circulating fluids such that adding a label to the bulk is impractical, the label (e.g., plasmonic nanoparticle, quantum dot, molecule, etc.) may be tethered to the surface of the optical analyte sensor by a linker, as shown in FIG. 46A. Any suitable linker 4612 may be used, e.g., a polymer (e.g., PEG), an aptamer, a protein, a peptide, a polysaccharide, a nucleic acid, a small molecule, a biotin streptavidin stackup or other linkers based on biotin streptavidin, etc. This linker 4612 is long enough for the unbound label 4610 to be out of the zone of sensitivity (e.g., evanescent field 4650). For example, the linker 4612 can be several hundred nanometers long or more to be out of the evanescent field for a microring resonator. The label 4610 can be functionalized with a complementary binder 4614 (e.g., antibody, aptamer, etc.) to form a sandwich assay with the analyte 4640 and the binder 4620 on the sensor, as illustrated in FIG. 46B. Here, the analyte may be a DNA origami or peptide (or peptide+DNA) that has two binding sites, one for the complementary binder 4614 of the label 4610 outside the evanescent field and the other for the binder 4620 coupled to the surface of the sensor 4630 by a linker 4640. The formation of the sandwich also brings the label 4610 closer to the sensor, such that the label moves within the evanescent field and is detected by the sensor.

The binder 4620 may be tethered to the surface of the optical analyte sensor 4630 by a linker 4640. Any suitable linker 4640 may be used, e.g., a polymer (e.g., PEG), an aptamer, a protein, a peptide, a polysaccharide, a nucleic acid, a small molecule, etc. This linker 4640 is short enough for the label 4610 to be within the sensor's zone of sensitivity (e.g., evanescent field 4630) when the sandwich is formed. For example, the linker 4640 can be tens of nanometers long.

In some embodiments, the label may not be tethered as described above but rather trapped in a hydrogel or other polymer-based or porous network placed or patterned on top of the sensor surface such that analyte may diffuse in and out the porous network but the labels do not diffuse in and out of the porous network. For example, the porous network may be selected such that the size of the network's pores is greater than the size of the analyte, but smaller than the size of the label. In one example, the analyte size is less than 50 nm, the pore size is 50 nm, and the label size is greater than 50 nm (e.g., 80 nm gold particles).

Figure 47:
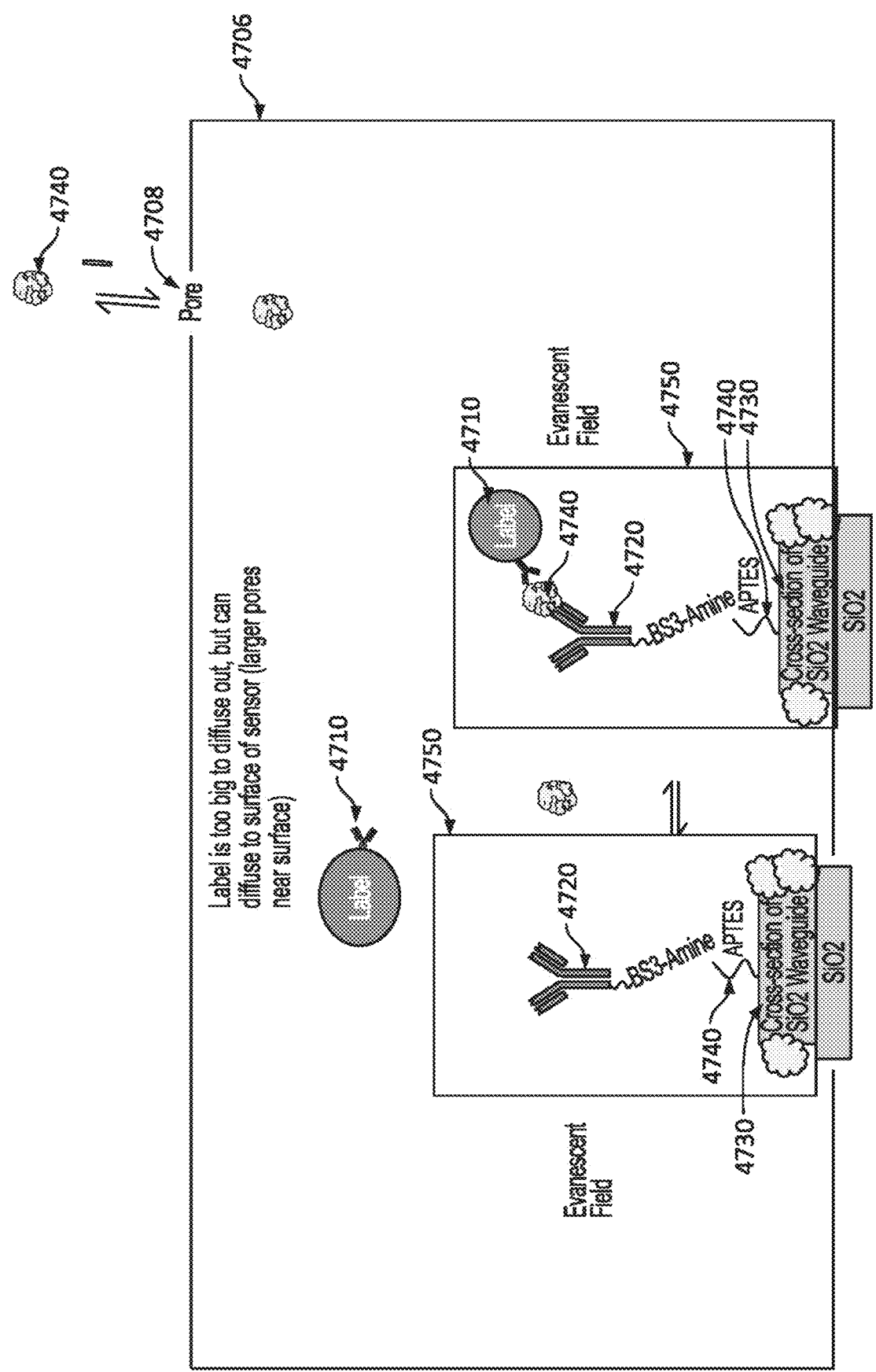
FIG. 47 is a diagram of an example sensor chip functionalized with a porous network preventing larger macromolecules from diffusing in and out of the network surrounding a waveguide.

FIG. 47 illustrates a porous network 4706 with pores 4708, which has a pore size that allows analytes 4740 to diffuse in and out, while not allowing the labels 4710 to diffuse in or out of the network. When the analyte diffuses in, the analyte may bind to the label 4710 and the binder 4720 (e.g., an antibody, an aptamer, etc.) to form a sandwich, which brings the label 4710 closer to the sensor, such that the label moves within the evanescent field and is detected by the sensor.

The binder 4720 may be tethered to the surface of the optical analyte sensor 4730 by a linker 4740. Any suitable linker 4740 may be used, e.g., a polymer (e.g., PEG), an aptamer, a protein, a peptide, a polysaccharide, a nucleic acid, a small molecule, etc. In some examples, the linker 4740 comprises (i) a 2 megadalton or smaller dextran surface linker that enables a 3-dimensional structure to have more binding sites, or (ii) a DNA-origami 3-dimensional surface or other forest-like 3-dimensional structured surface configured to enhance the signal by making more binding sites available in the evanescent field. This linker 4740 is short enough for the label 4710 to be within the sensor's zone of sensitivity (e.g., evanescent field 4750) when the sandwich assay is formed. For example, the linker 4740 can be tens of nanometers long.

In some embodiments, rather than using a sandwich assay to detect binding of the target analyte to a ligand as described above, the binding site of the analyte may be on a linker (e.g., aptamer, peptide, etc.). This linker may change shape (e.g., fold) when bound to the analyte, such that the analyte moves into the sensor's zone of sensitivity (e.g., evanescent field). In some cases, this folding-based assay can bring the analyte very close to the sensor (e.g., closer than sandwich assay), which facilitates the sensor's detection of the analyte. To further enhance sensitivity, one end of the linker may be attached to a label, which moves very close to the sensor when the linker changes shape in response to binding the analyte.

Figure 48:
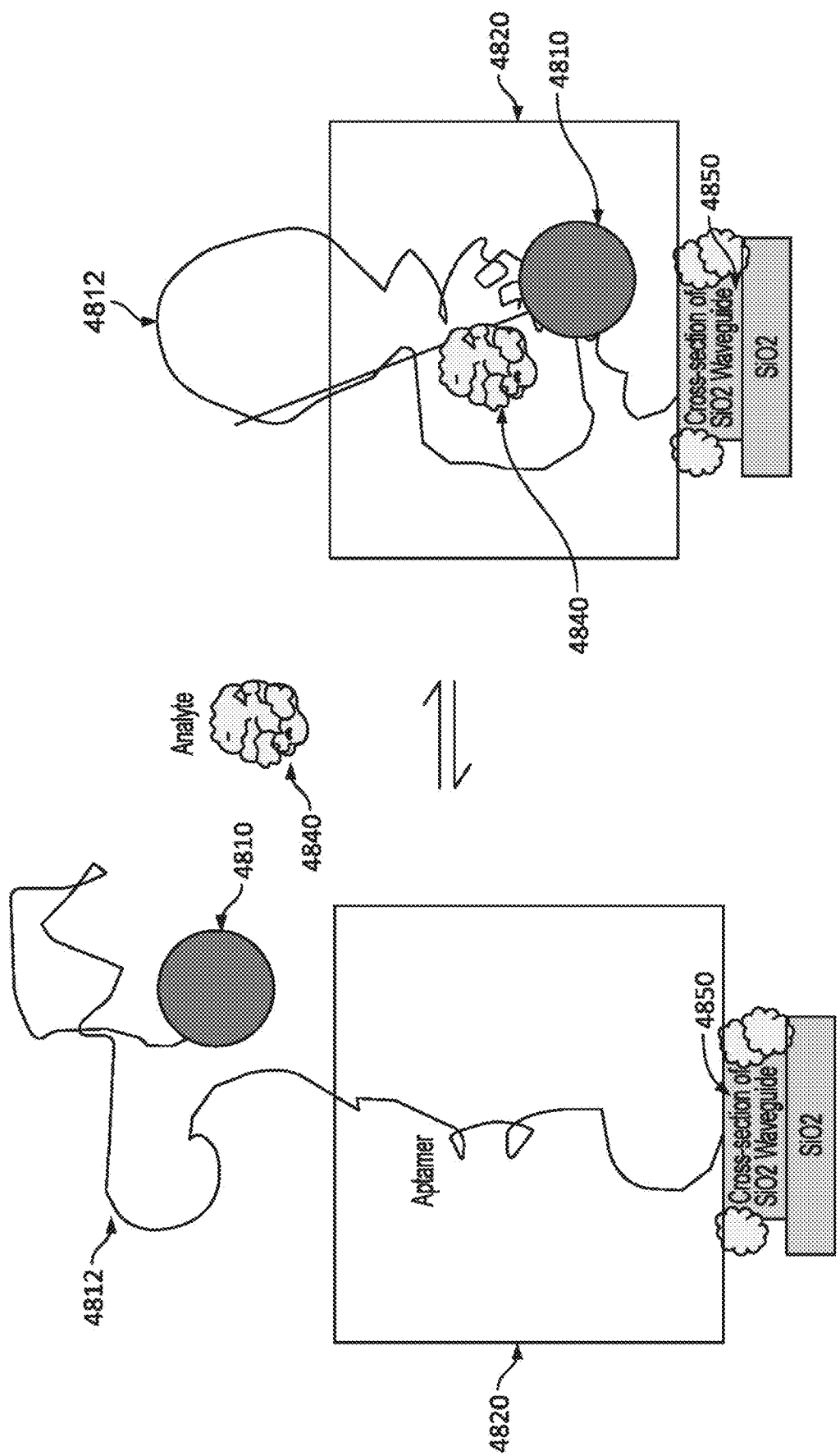
FIG. 48 is a diagram of an example sensor chip functionalized with a label bound to a waveguide through a foldable aptamer.

FIG. 48 illustrates a linker (e.g., aptamer, peptide, etc.) 4812 that includes a binding site for an analyte 4840. One end of the linker is optionally attached to a label 4810. The other end of the linker 4812 is attached to the surface of the optical analyte sensor 4850. When the analyte 4840 binds to the linker 4812, the linker 4812 changes shape (e.g., folds), bringing the analyte 4840 and/or label 4810 closer to the sensor surface (e.g., within evanescent field 4820) for detection.

In some embodiments, analytes with a single epitope can be detected using a competitive assay or other suitable assays. If the analyte is present in high concentrations, a direct binding assay may be sufficient. In some cases, a competitive-type assay may be used. With a competitive-type assay, a label attached (e.g., bound) to the sensor detaches (e.g., unbinds) when the analyte is present or near the sensor surface (e.g., because the analyte blocks the label's binding site). Thus, the labels attach to and detach from the sensor as the concentration of analyte changes, such that the concentration of labels detected by the sensor is indicative of the concentration of the analyte near the sensor. This approach may utilize a large protein conjugated to a binder or another large high-signal label conjugated to a binder that is harmless if it enters the body. The use of a harmless label/binder is especially important if the label/binder are pre attached and simply detach from the sensor and circulate in the bodily fluids at a rate that depends on the concentration of the analyte. In cases where a competitive assay is used, the sensor may be functionalized with a molecule or protein or group that bears one or more of the epitopes related to the analyte, simply has the analyte attached to it, or is the analyte. Thus, the label (which is specific to the analyte) remains on or near the surface of the sensor until its binding site is blocked by free analyte. For this assay to be fully reversible, the label may be tethered to the sensor or prevented from diffusing far away from the sensor by a porous network, as described above.

In some embodiments, in the case of a particular analyte, the binding site of the ligand chosen for capturing the analyte from the interstitial fluid may need to be tuned or chosen to have a Kd near the center of the dynamic range of interest to avoid saturation and insufficient sensitivity, as described above. In some embodiments, two sensors or more may be combined with a range of Ks of the ligands to ensure coverage of the entire dynamic range of a specific analyte in the human body.

3.2.3. Techniques for Sensing Analytes Present in Low Concentrations

Some of the above-described sensing techniques rely on the unbinding of an analyte from the sensor surface as the analyte concentration drops. This approach permits tracking of analyte levels as they rise and fall in the fluid. Another approach may be needed for analytes with very low concentrations in the human body (e.g., insulin). To detect these low concentration analytes, use of a high affinity antibody or another binding ligand, which is not reversible in a reasonable period of time, may be preferred.

In some embodiments, using a non-reversible binding ligand in a real-time biosensor may introduce certain challenges, because the non-reversible nature of the assay makes it difficult to detect decreases in the analyte's concentration over time. To address this issue, a shutter effect may be used according to some embodiments. For example, using a suitable actuator (e.g., an electrical signal or the absence thereof, a physical MEMS structure, an optical signal or the absence thereof, a magnetic field or the absence thereof, a pH signal or the absence thereof, etc.), a shutter may be created that prevents the binding ligand on the functionalized sensor surface from continuously binding the analyte. In other words, the binding ligand only binds the analyte at times when the "shutter" is in the "OPEN" state. This approach prevents the binding capacity of the functionalized sensor surface from being exhausted due to continuous binding.

In some embodiments, rather than measuring the absolute change in the amount of bound analyte, the slope of the binding signal can be used when the shutter is in the "OPEN" state to quantify the amount of analyte in the bulk. As the functionalized sensor surface is depleted of available binding sites over time, an adjustment can be made in software for the function used to convert binding slope to analyte concentration in the bulk.

In some embodiments, a local change in pH or other conditions may be used to release bound analyte from the sensor surface binding sites to reset the sensor surface.

In some embodiments, rather than using a binding ligand, an entire cell may be immobilized on the sensor surface. The cell can then regenerate binding sites on its surface once they are used up (similar to what happens in vivo with cell receptors).

In some embodiments, a multilayer approach may be used for the surface functionalization of the sensor chip. For example, the top layer of the sensor surface may make one or more measurements before eventually degrading (e.g., degraded by itself or by the body). Then, a new layer below that top layer is exposed and becomes available for additional binding.

In some embodiments, a receptor may be used on the sensor surface. In a specific example, an insulin receptor may be used. When the analyte, e.g. insulin, binds to the receptor, the receptor becomes activated and creates a signal read by the sensor. In some embodiments, that signal may cause another receptor to become available. For instance, the insulin receptor may cause the activation of an enzyme, which then cleaves something else from the surface of a neighboring receptor, which can in turn be accessed by analyte and so on. In this example, the cleavage may be sensed as the removed molecules create a measurable change in signal.

3.2.4. Techniques for Detecting Small Molecules

In some embodiments, the waveguides used for refractive index sensing of binding macromolecules may also be used for refractive index, polarization, or absorbance spectroscopy-based sensing of glucose, lactate, ketones, urea and other small molecules that have a size or molecular weight (MW) smaller than a threshold size or MW (e.g., <1000 Daltons).

In some embodiments, electrodes may be added to the sensor chip and enzymes may be used to sense small molecules like glucose. This can either be done via standard electrochemical sensing means or it may utilize a novel architecture where a doped waveguide that is part of a photonic modulator (MZI, ring, etc.) is affected by the current or voltage from enzymatic reactions and causes a modulation of light as the carrier density changes in the waveguide.

Additionally, or alternatively, doped waveguides or other detectors may be used to generate voltage locally to enable electrochemical sensing without an electrical connection to the reader.

Figure 49:
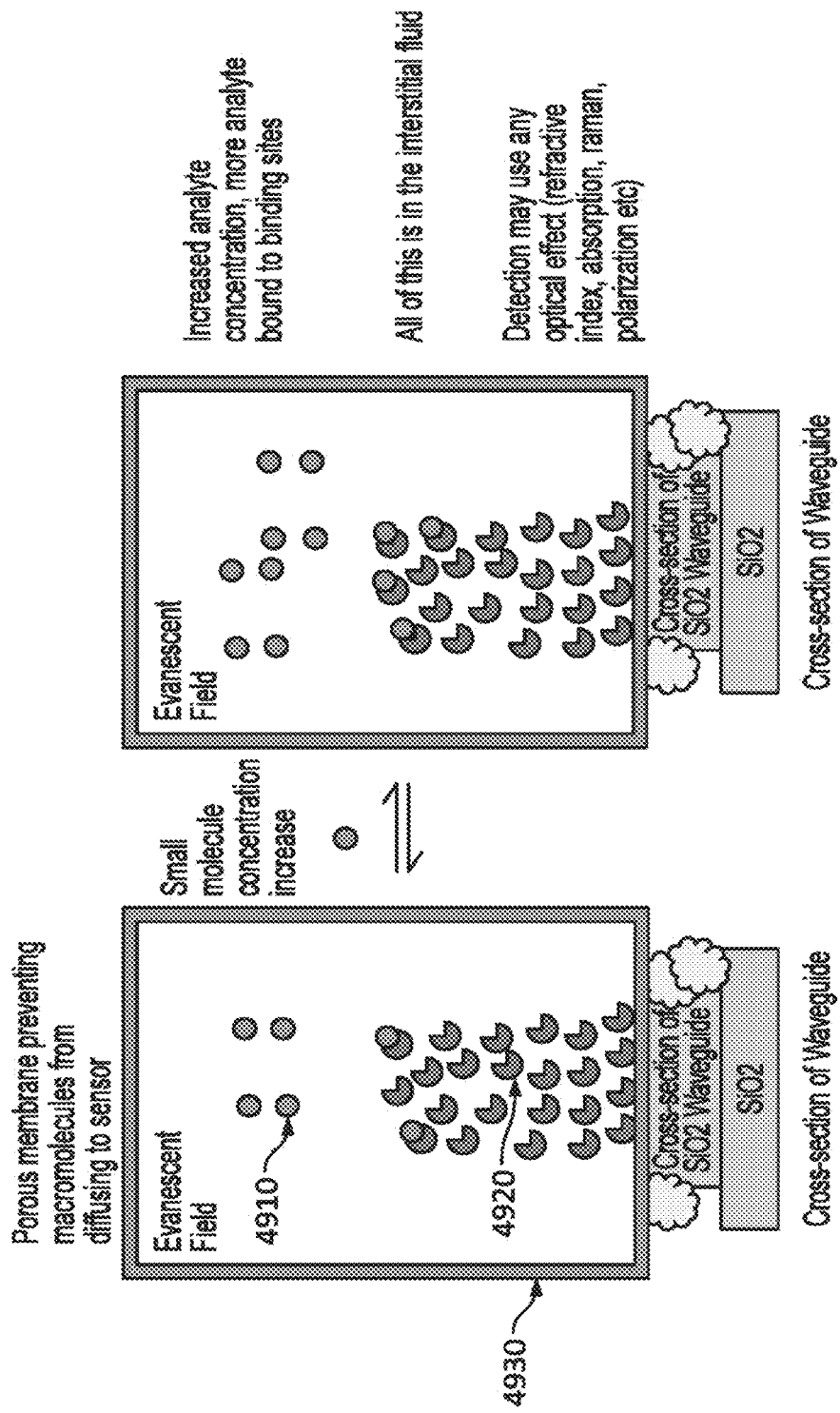
FIG. 49 is a diagram of an example sensor chip functionalized with a porous network for concentrating small biomolecules.

FIG. 49 further illustrates a technique that can improve detection of small molecules. As illustrated, an optical analyte sensor may include a porous membrane preventing macromolecules from diffusing to sensor. This results in an increased concentration of small molecules 4910 close to the sensor (e.g., within the evanescent field 4930), which means more analytes can bind to binding ligand 4920. This binding can be detected using any suitable optical sensing technique (e.g., refractive index-based, absorption-based, Raman-based, polarization-based, etc.).

3.3 Additional Embodiments

It is to be noted that above described various wearable biosensors are not inclusive. In real applications, there may be many different configurations of wearable biosensors applicable to the wearable biosensors disclosed herein, to improve the functions and features of these wearable biosensors.

In some embodiments, the aforementioned wearable biosensors can be combined with an accelerometer in the patch of a wearable biosensor for step count and other kinetic measurements.

In some embodiments, temperature sensing either with a thermistor or using the thermos-optic effect of a sensor on the chip can be used to accurately track body temperature in real time which can be correlated to fertility, illness and other relevant insights in an app/software interface.

In some embodiments, a combination of capture antibodies, aptamers or other analyte binding capture elements can be bound to the surface of the sensor in a certain concentration ratio. Each capture element can have different properties such as different epitopes, different affinity constants, different species, and the like.

In some embodiments, there may be more than one sensor that sense the same analyte but with different capture elements having different properties such as a different affinity, different epitope, different affinity constant, different species, and the like.

In some embodiments, the reader in a wearable biosensor may contain additional optics to detect vital biomarkers (e.g., O2) and heart rate using typical methods (e.g., LEDs). This may be done through the skin as in normal wearable sensors or it may be done via a fiber connection to an implanted device.

In some embodiments, it may be advantageous to combine ligand binding with absorbance or resonance spectroscopy. For example, the surface of the sensor (e.g. ring resonator, MZI, aMZI, fiber, etc.) may be coated with enzymes or other macromolecules or polymers with binding sites for a particular small molecule of interest (e.g., glucose oxidase, GGBP, Con A and others for glucose). This may permit a specific concentration of the molecule at the surface of the sensor relative to the bulk such that the evanescent wave or transmitted light is able to pass through it. This amplifies the signal from changes in concentration (e.g., of glucose) against the background of other molecules that also have a high refractive index or also have optical absorption in the band of interest. By coating different sensors with different ligands a multiplexed small molecule and macromolecule sensor is achievable.

In some embodiments, a layer of enzymes or other molecules may be added to consume some of the analyte as it diffuses to the sensors and lowers the concentration so as not to saturate the sensor.

In some embodiments, the polarization rotation induced by glucose and other small molecules may be utilized instead of absorption or refractive index or resonance-based methods but using the same primary architecture.

In some embodiments, two chips may be included in the sensor such that a space is left between them where light propagates between the chips. This space may be empty or filled with a hydrogel or another membrane that allows the permeation of small molecules; the space may also contain ligands with binding sites for specific molecules. As the light propagates from one chip to the other it may pass through the analyte, allowing concentration changes to be detected (e.g., via the methods discussed above). Alternatively, one can use an artificial reflecting object or a natural reflecting object, e.g., skin).

In some embodiments, the two chips may be aligned passively to each other by etching deep trenches in them at the foundry and using precisely machined balls to mechanically self-align the trenches and then glue the chips together. This allows for alignment tolerance (e.g., a +/−0.5 micron up to +/−10 microns depending on specific design) which is sufficient for optically coupling waveguide structures such as adiabatic couplers and grating couplers located on the two chips to each other.

3.4 Some Applications of Wearable Biosensors

In some embodiments, wearable biosensors may measure blood concentrations of lipoprotein constituents by direct binding, so as to monitor cardiovascular health. The possible lipoprotein constituents measured by the biosensors may include but are not limited to apolipoprotein A-1, where the concentration below 1.2-1.4 Mg/dL may be reported as a risk factor, and Apolipoprotein B-100, where higher concentrations (e.g., up to 500 mg/dL) would indicate an increasing risk to users. By measuring these values using wearable biosensors, users and healthcare providers can continuously monitor cardiovascular health progress caused by interventions such as dietary changes, exercise, and lipid-lowering agents.

In some embodiments, wearable biosensors may serve as rapid alert systems for thromboses, by detecting D-dimer above a cutoff on the order of 500 ng/ml. Simultaneously, binding of antithrombin III at less than a cutoff indicating genetic or acquired deficiency (i.e., 70% of signal in non-deficient serum) can alert healthcare providers that heparin may be an ineffectual treatment for the clot, without having to wait for blood tests at the point of care or in a hospital.

In some embodiments, wearable biosensors may monitor liver functions. Due to the synthesis of many serum proteins in the liver, there are many possible opportunities to monitor liver functions.

In some embodiments, wearable biosensors may monitor kidney issues. For instance, impaired reabsorption of several serum proteins in the kidney may easily indicate kidney dysfunctions. Wearable biosensors may monitor beta-2-microglobulin, a protein >99% reabsorbed in the kidneys, where concentrations significantly below 200 ng/ml may indicate kidney dysfunction.

In some embodiments, wearable biosensors can monitor by direct binding for increases in acute phase reactant proteins, including CRP (with most sensitive response), orosomucoid, or alpha-1-antitrypsin. Simple assays preclude sensing cytokines at pg/mL reference interval concentrations, but these high-concentration acute phase proteins are viable.

In some embodiments, one of the analytes being detected by wearable biosensors is total IgE. By tracking the total IgE, it is possible to predict an increased risk of asthma attacks and other allergy related conditions. In some embodiments, the data measurement may be connected to an app that can recommend use of an inhaler or other suggestions (like avoiding allergens) if a problem is found.

In some embodiments, tracking histamine by wearable biosensors may allow diagnosis of otherwise hard-to-diagnose mast cell activation allergies, where there is no specific IgE present. When a histamine spike is recorded by a wearable biosensor, the app connected to the wearable biosensor may alert the user, allowing the user to realize what they were exposed to right before that.

In some embodiments, CRP tracking by wearable biosensors can be used to correlate lifestyle to inflammation and aging/inflammation, to track the progress of inflammatory bowel disease (IBD), irritable bowel syndrome (IBS), rheumatoid arthritis (RA), and other inflammatory issues as well as injuries, to detect illnesses, to differentiate viral vs. bacterial infections, etc. Recommendations to users may be made by software using lifestyle tracking via in-app prompts and CRP data to decrease inflammation.

In some embodiments, insulin tracking by wearable biosensors can be used to measure insulin resistance, or detect prediabetic states earlier, to inform users how their body responds to food. High insulin concentration is correlated to many diseases, so helping users decrease their insulin can be done via wearable biosensor-based tracking and in-app lifestyle recommendations. Insulin tracking can also be used for diabetes care, especially in combination with glucose tracking.

In some embodiments, real-time tracking of antibody levels by wearable biosensors can be used to track vaccine response, immunotherapy for allergies (sIgG4 tracking+ tIGe), monoclonal antibody therapies and other specific affinity-based therapies, to ensure that drug levels are optimized. In some embodiments, small molecule sensing can be added to wearable biosensor-based monitoring, with specific binding sites or absorbance bands (hardware or software defined) for drugs of interest to be used to track drug kinetics.

In some embodiments, fertility and pregnancy can be tracked by wearable biosensors, which can be reported to users via a connected software/app by monitoring spikes in relevant hormones, such as human chorionic gonadotropin (hCG) and Luteinizing hormone.

In some embodiments, any target analyte at a concentration above 150 ng/ml would be ideally suited for real-time monitoring. This may include but is not limited to real-time monitoring of one or more of the following targets in blood or interstitial fluid:

Albumin
  MW: 66.5 kDa

C-reactive protein
  MW: 767 Da
  Reference ranges: <5 pg/mL (5th percentile around 0.2, 0.3, 95th around 8-13)
  Inflammation marker
  High concentrations~infection, acute inflammation (i.e. several mg/mL)
  Low concentration may be a marker of atherosclerotic process and/or other chronic inflammation (i.e. <0.3 mg/mL).
  Clinically relevant timescale may be hours (acute), or months (chronic).

Hemoglobin
  MW: 372 kDa
  Reference ranges: 13.5-17.5 g/dl (men), 12.0-15.5 g/dl (women).

Thyroxine-binding globulin
  MW: 54 kDa
  Reference ranges: 12-25 pg/mL (male), 14-30/15-55 pg/mL (female/female on contraceptive)
  Hypo/hyperthyroid function indication, other thyroid-related diseases
  Clinically relevant timescale may be weeks.

Thyroxine-binding prealbumin (transthyretin)
- MW: 55 kDa
- Reference ranges: 200-400 pg/mL
- A thyroid hormone transport protein, which may transport both T3 and T4.
- Is often complexed to retinol-binding protein while in plasma.
- High: indicate chronic kidney disease, steroid use, alcoholism, malnutrition Ceruloplasmin
- MW: 132 kDa
- Reference ranges: 200-600 pg/mL. This may be higher in children.
- In Wilson disease, copper may not be properly transported by this protein because ATPase responsible for adding the copper may be absent. This protein may build to toxic levels in various tissues; should see low serum levels.
- This protein may be greatly elevated during pregnancy.

Haptoglobin
- MW: 151 kDa
- Reference ranges: 0.2-3.0 mg/mL
- Binds to free hemoglobin, so a decrease in haptoglobin may be a sign of hemolytic anemia.
- However, levels also increase during inflammation, thus patients with both hemolysis and inflammation can have normal haptoglobin.

Apolipoprotein A-I (protein of HDL)
- MW: 29 kDa
- Reference ranges: ≥1.2 for males or ≥1.4 mg/mL for females.
- General problem with lipoprotein in immunoassays: The antigenic sites on apolipoproteins for assay antibodies are often masked by lipids, hence assay buffer may need some detergent (i.e. Tween). This may complicate continuous sensing.
- Apo A-I & Apo B together may be a predictor of future coronary heart disease, monitoring effects of lipid-lowering agents, diet interventions, etc.
- Clinically relevant timescale may be days or weeks.

Apolipoprotein A-II (protein of HDL)
- MW: 17.4 kDa

Apolipoprotein B-100 (protein of LDL)
- MW: 512.7 kDa
- Reference ranges: "desirable": <0.9 mg/mL, "above desirable": 0.90-0.99 mg/mL, "borderline high," 1.00-1.19 mg/mL, "high": 1.20-1.39 mg/mL, "very high": ≥1.4 mg/mL Transferrin
- MW: 80 kDa
- Reference ranges: 2.0-3.6 mg/mL
- Function: Iron transport from intestine. During iron deficiency, plasma levels rise.
- Complicated: Several other diseases cause anemia, where transferrin may be normal, but its iron saturation is low.
- High levels during pregnancy.
- Ferritin may be a more sensitive indicator of serum iron in low concentration (ng/ml concentrations)-roughly 20-200 ng/mL. This may still be detectable as primary binding.

β2-microglobulin
- MW: 11.8 kDa
- Reference ranges: 0.2 pg/mL (mean)
- Essentially present on all nucleated cell surfaces, then shed into blood.
- Is >99% reabsorbed into plasma within kidneys due to small size, thus low levels allow detection of kidney damage/disorders.
- Multiple myeloma predictor: generally elevated in plasma where there is increased cell turnover, and especially in neoplasms of B lymphocytes.

Serum free light chains
- Kappa free light chain
  - MW: 22.5 kDa
  - Reference ranges: 3.3-19.4 pg/mL
- Lambda free light chain
  - MW: 22.5 kDa, though mostly dimerized in serum thus 45 kDa
  - Reference ranges: 5.7-26.3 pg/mL
- May be elevated due to various monoclonal gammopathies. Monoclonal gammopathies may include conditions where protein is abnormally present in blood. Monoclonal gammopathies may include multiple myelomas/other malignancies of plasma cells, amyloidosis. May be elevated due to renal impairment.
- May be low due to bone marrow dysfunction.
- Ratio of kappa light chains to lambda light chains informs diagnosis and/or referral to tissue biopsy/other further tests.

Antithrombin III
- MW: 53 kDa
- Anticoagulant, inhibits thrombin (Factor II), Factors VII, IX, X, XI, XII
- Congenital (heterozygous mutation, ~<70% normal levels)
- Acquired deficiencies greatly increase risk for thromboses and make heparin ineffectual clot treatment.
  - Acquired deficiencies may result from liver disease (where synthesized), nephrotic syndrome, and/or may be a result of heparin therapy.

Fibrinogen
- Blood clot risk
- High fibrinogen is a risk factor for heart disease.

Lysozyme
- MW: 17 kDa
- Reference ranges: Quest: 5-11 pg/mL
- Tool of monocytes/macrophages, which can hydrolyze peptidoglycan in the bacterial cell wall. Level can indicate overall mass of granulomas (large clumps of mononuclear immune cells).
- Elevated in many conditions: leukemias, sarcoidosis, tuberculosis, acute bacterial infection, or due to reabsorption, such as in severe kidney diseases and/or UTIs.

Plasminogen

C3 complement
- MW: 185 kDa
- Reference ranges: 0.9-1.8 mg/mL
- Two chains linked by thioester; activation=cleavage.
- May increase in plasma somewhat as part of an acute inflammatory response. May increase in plasma due to liver (synthesis) or kidney (whether reabsorbed) oddities.
- Decrease may be due to genetic deficiency, or essentially increased consumption (activation+inflammatory insult effects) of C3 (i.e. severe infection) overriding cytokine-stimulated synthesis increase.
- Clinically relevant timescale may be hours (infection/acute inflammation), or once in life (genetic immune deficiency).

C4 complement
  MW: 206 kDa
  Reference ranges: 100-400 gg/mL
  Increase in plasma may occur for same reasons as C3 and/or as part of an acute inflammatory response.
  Mostly decreases in plasma under heavy consumption (during severe infection), some autoimmune diseases, or low because of genetic deficiency.
D-dimer
  MW: ~200 kDa
  Cut-off value (per Quest): 500 ng/ml (increases 10 ng/mL every year of age over 50 per LabCorp)
  Final product of fibrin degradation during clotting; indicates serious blood clot (i.e. deep vein thrombosis, pulmonary embolism); would be surveilling for thromboses and catching quickly.
    Also sepsis, trauma, anything else involving coagulation.
  If a subject does not have positive D-dimer, the subject may not have a DVT.
  Shows abnormal coagulation as symptom of severe COVID.
$\alpha_1$-Fetoprotein (AFP)
  MW: 69 kDa
  Reference ranges: <5 gg/mL for newborn baby, <2 ng/ml for >18 mo
  Pregnancy; screening for birth defects
  For adults: can indicate liver disease (cirrhosis, hepatitis) or cancer of liver, ovaries, or testes.
$\alpha_2$-Macroglobulin (AMG)
  MW: 720 kDa
  Reference ranges: 1.3-3.0 mg/mL
  Is a proteinase inhibitor, but just sterically blocks access of proteins to active site rather than occupying active site per se.
  Elevated in adults due to nephrotic syndrome, and also simply increased synthesis stimulated by estrogens.
  Can be low during acute inflammation, and due to acute pancreatitis, and prostatic carcinoma. AMG may bind to prostate-specific antigen and/or may be present as a complex.
  Unlikely to leak out into interstitial fluid due to extremely large size.
Retinol binding protein
  MW: 16 kDa
  Reference ranges: 30-60 pg/mL
  May indicate early malnutrition, liver disease, and/or renal function.
Alpha1-Antitrypsin (A1AT or AAT)
  MW: ~50 kDa
  Reference ranges: 0.5-1.2 mg/mL
  May have some heterogeneity in molecular weight. This may be due to variations in glycosylation.
  Is a serine protease inhibitor. Mutation may cause structural change, prevent export from liver cells, decrease serum levels. Insufficient neutrophil elastase inhibition may destroy lung tissues, which may increase susceptibility to lung diseases such as emphysema and COPD.
  May elevate in serum at acute phase of any inflammatory process.
  Clinically relevant timescale: hours/days: begins to rise 24 hours after inflammatory/necrotic process. Peaks at 3 to 4 days given short insulting process.
$\alpha_1$-Acid Glycoprotein (or orosomucoid)
  MW: 42 kDa
  Reference ranges: 0.5-1.2 mg/mL
  Major transport protein, like albumin.
  Is an acute phase reactant; will be elevated during any acute inflammation process (three to four-fold), with peak 3-5 days following.
  Elevated in many pathologies, such as infection, cancer, and myocardial infarction).
  One of four markers identified to best predict all-cause mortality in huge observational study. Others are also albumin, VLDL particle size, and citrate.
$\alpha_1$-antichymotrypsin (Serpin family A member 3) ghrelin
  MW: 68 kDa
  Reference interval: 0.3-1.1 mg/mL
  Acute phase reactant protein; primary purpose is inhibition of cathepsin G (neutrophil serine protease) and chymase (mast cell serum protein).
  May be associated with Alzheimer's disease. May be overexpressed in Alzheimer's disease (constituent of neurofibrillary plaques). Mutations may be associated with Parkinson's and COPD. Deficiency may be due to liver disease.
Hemopexin
  MW: 57 kDa
  Reference interval: 100-750 pg/mL
  An acute phase reactant. Highest known affinity to heme; may prevent heme-mediated oxidative stress after iron overloading; transports the free heme to liver for catabolismexcretion.
    Similar to haptoglobin, except haptoglobin binds entire hemoglobin, where hemopexin binds just free heme.
  Possible diagnostic utility in differentiating COPD from asthma, elevated like CRP,
IL-6, etc. in both these diseases.
  Complement factor H
  MW: 155 kDa
  Reference: 260-640 pg/mL
  Complement system, alternative pathway; puts reins on complement system.
  May be elevated in sputum in lung cancer patients.
Vitronectin
  MW: 75 kDa (54 kDa by amino acids alone, heavily glycosylated)
  Reference: 9.7-1400 pg/mL
  Cell adhesion protein. Is component of platelets, and binds to GAGs (glycosaminoglycans), heparin, and thrombin-antithrombin III complex.
  May be a biomarker for breast and hepatocellular cancers.
C4b binding protein (Complement component 4 binding protein beta)
  MW: 570 kDa
  Reference: 150-300 pg/mL
  Regulator of complement system; preventing runaway reactions. Taken advantage of by many pathogens. Another acute phase reactant, so levels affected by inflammation state.
  Is in lower molarity than Protein S (whose deficiency, whether genetic or *disputedly* acquired this way, can lead to more blood clots), which is 60-70% complexed with C4b binding protein where it is inactive. Perhaps if C4b binding protein is high due to inflammation, free protein S diminished, thus less ability to control clots.
  May be a biomarker for pancreatic cancer.

Alpha 2-HS glycoprotein (A.K.A Fetuin A)
  MW: 64 kDa
  Reference: 230-1300 pg/mL
  Positively associated with insulin resistance/T2 diabetes via inhibition activity against insulin receptor tyrosine kinase
    Cardiovascularly, things are complicated as high levels can lower arterial calcification, which may cause less plaque, but insulin interaction is counterproductive.
    May be a marker of liver function due to overwhelming synthesis there.
    Negative acute phase reactant (inversely correlated with CRP).
Cysteine rich secretory glycoprotein LCCL domain containing 2 (Crispld2)
  MW: ~77 kDa
  Reference: 220 pg/mL
  Bind lipopolysaccharides (Gram negative cell wall), in mice increase in serum in response to nontoxic dose of LPS, negatively correlate with LPS lethality (i.e. may indicate how sensitive one is to lipopolysaccharides)
  May be associated with neutrophil degranulation.
Complement C5
Alpha 1-B glycoprotein
  MW: 54 kDa
  Reference: 200 pg/mL
  A 13.8 kDa fragment was upregulated 11-fold in the urine of pediatric patients with steroid-resistant nephrotic syndrome.
Apolipoprotein H
Apolipoprotein A4
Plasminogen
GC vitamin D binding protein (DBP)
  MW: 52-59 kDa
  Reference: 70-240 pg/mL
  Binds to vitamin D, transports it (85% of 25 hydroxyvitamin D is bound to this, 15% bound to albumin, 0.03% is free)
  Role in actin-scavenging; when cells damaged (trauma, surgery, burn, sepsis, etc.) and release actin; DBP binds G-actin once depolymerized from F-actin (which can make lethal coagulations in blood) by gelsolin, then this complex is quickly cleared (so DBP levels transiently decrease).
  Most polymorphic protein known; over 120 isoforms, and variable glycosylation as a result.
Histidine rich glycoprotein
Coagulation factor II, thrombin
Glycosylphosphatidylinositol specific phospholipase D1
Complement C1s
Fetuin B
Kininogen 1
Complement C9
Gelsolin
Apolipoprotein C3
Serpin family A member 6
Apolipoprotein C1
Paraoxonase 1
Serum amyloid 4
Alpha-2 glycoprotein 1, zinc-binding
Afamin
Apolipoprotein C2
Clusterin
Apolipoprotein E
Serpin family A member 7
Complement component 4 binding protein alpha
Kallikrein B1
Amyloid P component
Renalase, FAD dependent amine oxidase
Thrombospondin 1
Leucine rich alpha-2 glycoprotein 1
Lipopolysaccharide binding protein
Protein S
  Reference intervals: 22-23 pg/mL
Retinol binding protein 4
Apolipoprotein F
Ficolin 3
Phospholipase transfer protein
Serpin family F member 1
Adiponectin, C1Q and collagen domain containing Insulin like growth factor binding acid labile subunit
Ficolin 2
Hyaluronan binding protein 2
Mannan binding lectin serine peptidase 1
C-type lectin domain family 3 member B Coagulation factor V
Complement C1r subcomponent like
Lecithin-cholesterol acyltransferase
CD5 molecule like
Serpin family A member 10
Apolipoprotein LI
Insulin like growth factor binding protein 3
Cholesterol ester transfer protein
CD 14
Glutathione peroxidase 3
CD 163
Paraoxanase 3
Protein Z
Ficolin 1
Transferrin receptor
ADAM metallopeptidase with thrombospondin type 1 motif 13
Complement factor D
Cystatin C
Apolipoprotein C4
Myeloperoxidase
Mannose binding lectin 2
Complement factor B
C—C motif chemokine ligand 28
Tenascin C
Vascular cell adhesion molecule 1 (VCAM1)
Cathelicidin antimicrobial peptide
Insulin like growth factor binding protein 2
Complement factor H related 3
Insulin like growth factor 2
Complement C1q C chain
Mannan binding lectin serine peptidase 2
Lipase G
C1q and TNF related 9
Fibrinogen alpha chain
C1q and TNF related 6
Von Willebrand factor
Gremlin 1
C1q and TNF related 5
C1q and TNF related 1
Serum amyloid A1
Angiogenin
C1q and TNF related 7
Orosomucoid 2
Angiopoeitin like 3
Fc receptor like 1
BMP4

Chromogranin A

3.5. Exemplary Wearable Biosensor

Figure 50:
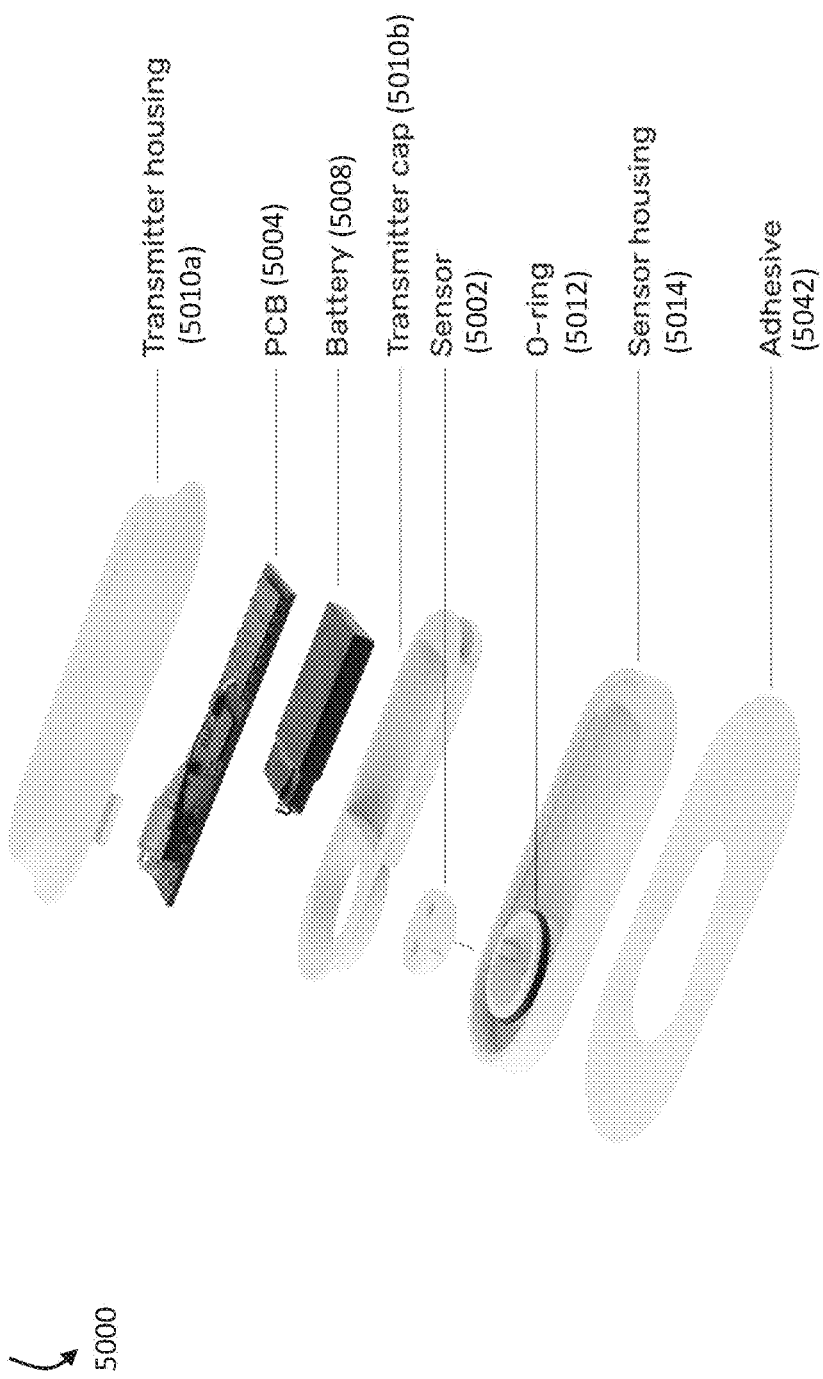
FIG. 50 is an exploded view of various components included in a wearable biosensor.

Referring now to FIG. 50, an exemplary wearable biosensor architecture 5000 is further illustrated. As illustrated, the wearable biosensor 5000 may include a transmitter housing 5010a and a transmitter cap 5010b, which together may house a PCB board 5004 and a battery 5008. The PCB board 5004 may include a variety of peripherals depending on the design of the biosensor 5000. The wearable biosensor 5000 may further include a sensor housing 5014 for holding the sensing unit or sensor 5002. The sensor housing unit 5014 may further include an O-ring for holding the sensor 5002 inside the sensor housing 5014. As illustrated in FIG. 50, the wearable biosensor 5000 may further include an adhesive 5042 for holding the biosensor onto a skin.

Figure 51:
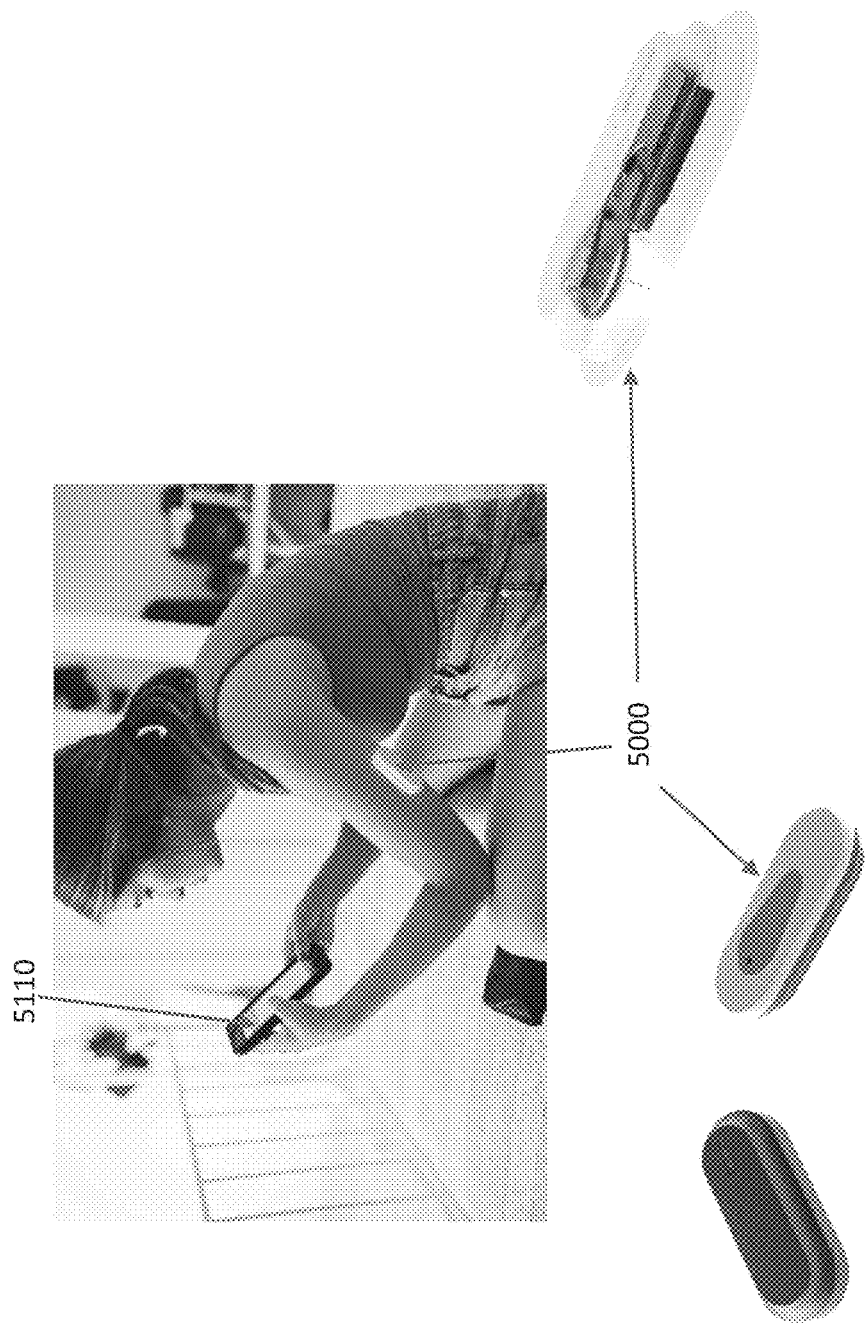
FIG. 51 is an illustration of application of a wearable biosensor by a user.

FIG. 51 illustrates a wearable biosensor 5000 worn by a user. As illustrated, the biosensor 5000 is sticked to the upper arm of the user. The user may use an app installed on a mobile device 5110 to monitor the operation of the wearable biosensor 5000, and/or read the data measured by the biosensor 5000.

In some embodiments, the wearable biosensors may be placed in another place around the human body or may be even used to detect fluids not necessarily inside human body but can be outside human body in many other situations. For instance, the wearable biosensors may be connected to another fluid source such as a urine catheter (e.g., to monitor inflammatory markers such as C-reactive protein (CRP) which increase if there is an infection in the bladder), other catheters, intravenous lines, and nonmedical fluid sources such as chemical or biochemical reactors, food liquids such as milk, water systems for water quality, toilets and wastewater and so on. Such a connection may be made via microfluidics and a gasket creating a channel over the sensors where some or all the quid flow is diverted or by directly placing the sensor into the stream of fluid or into the tank of fluid using one of the above described wearable biosensors.

3.6 Validation

Figure 52A:
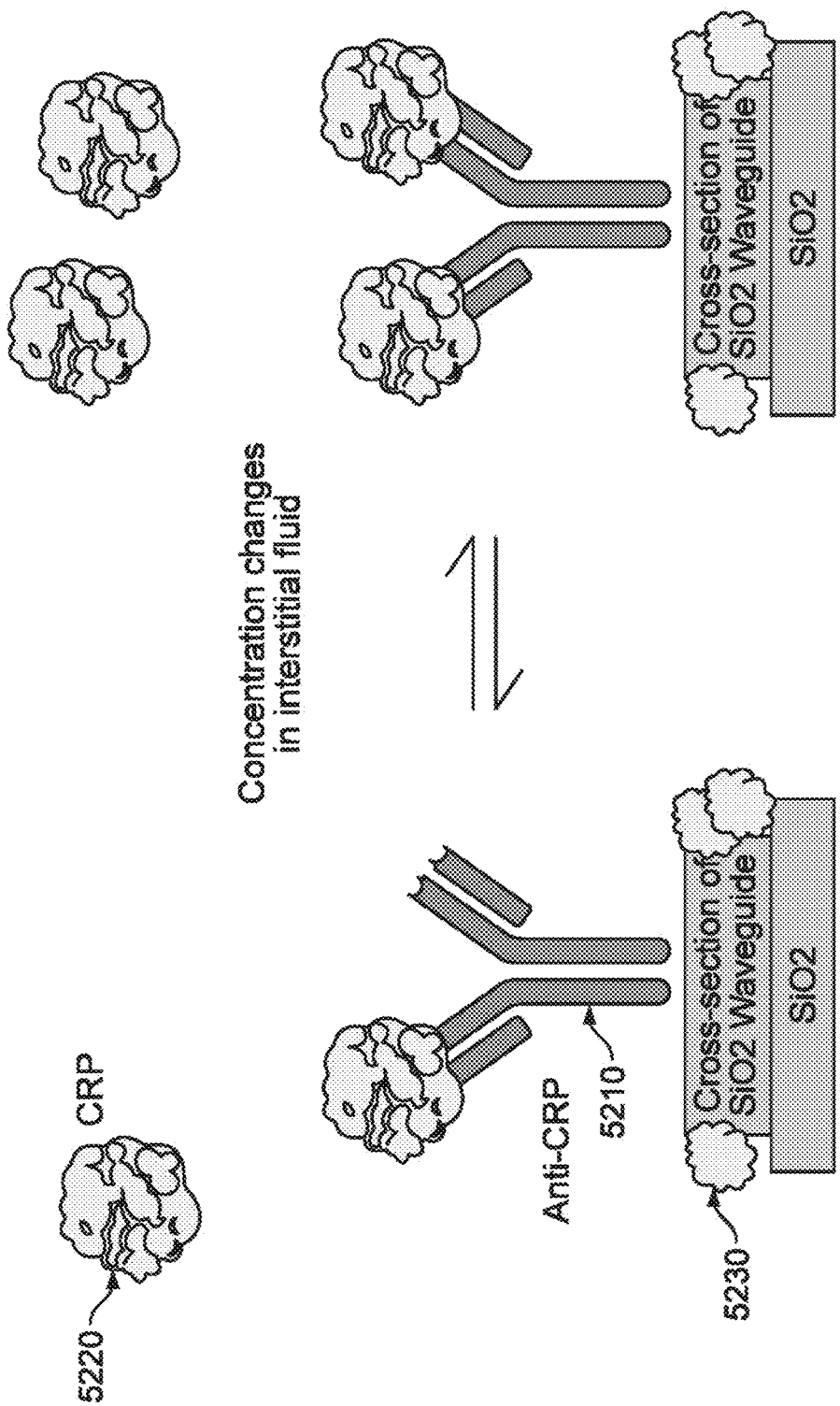
FIGS. 52A-52C show data collected from real-time C-reactive protein (CRP) level tracking experiments in 10% diluted serum.
Figure 52B:
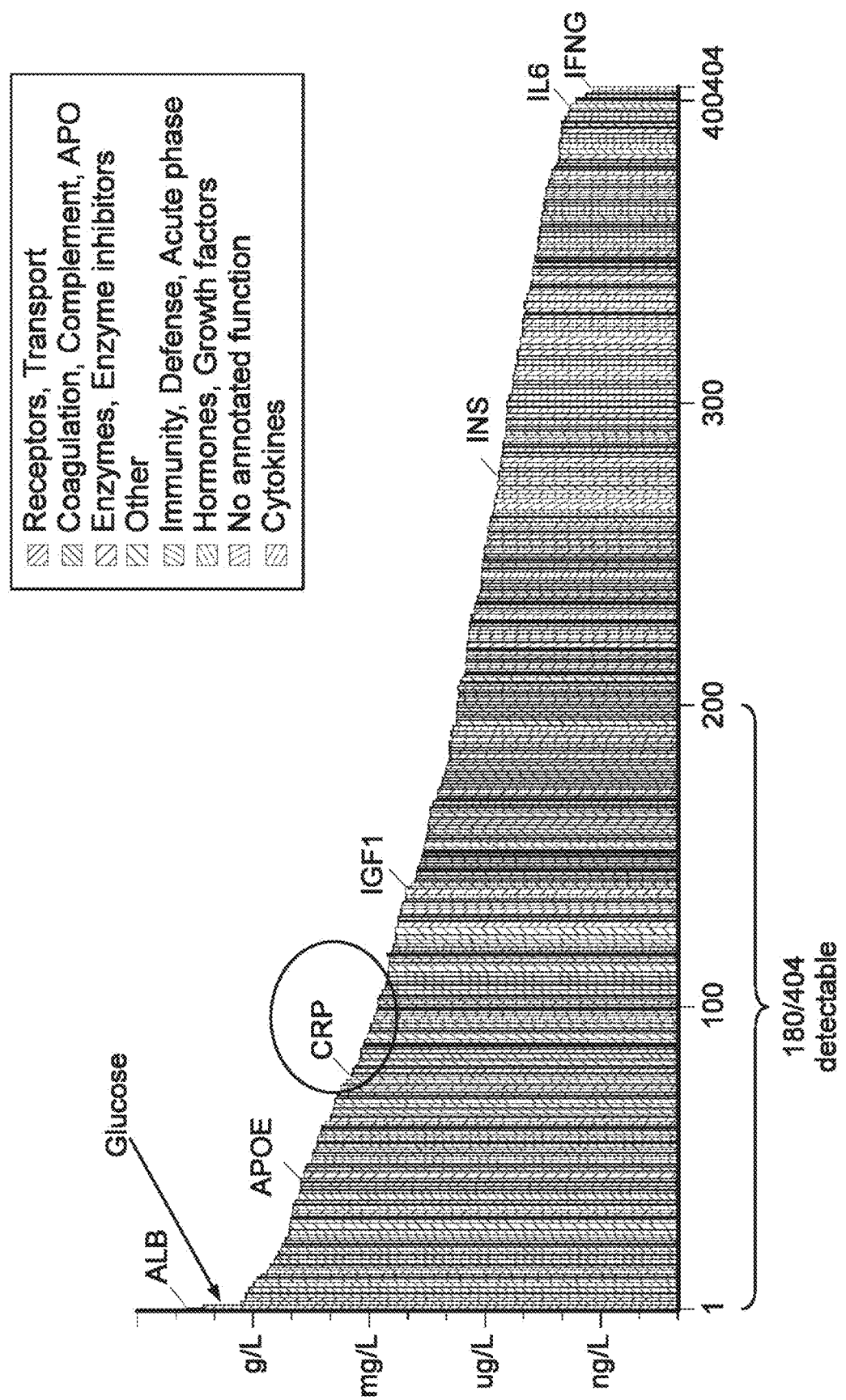
Figure 52C:
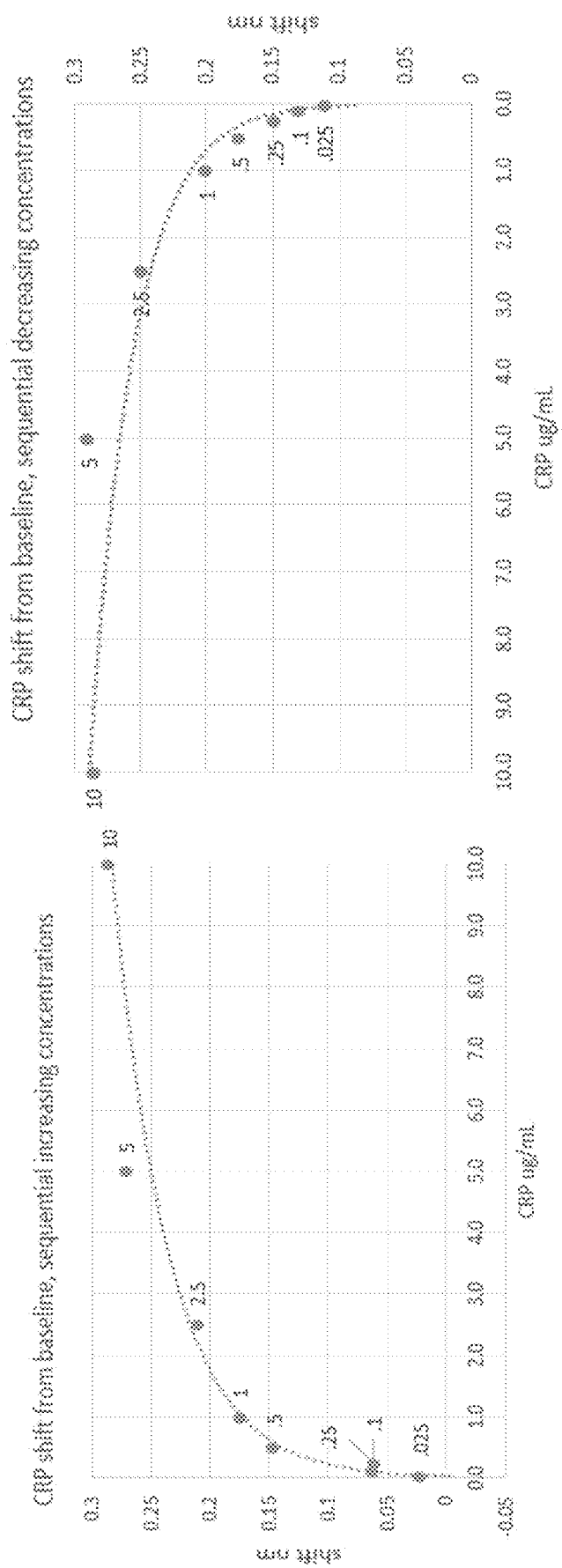
Figure 53:
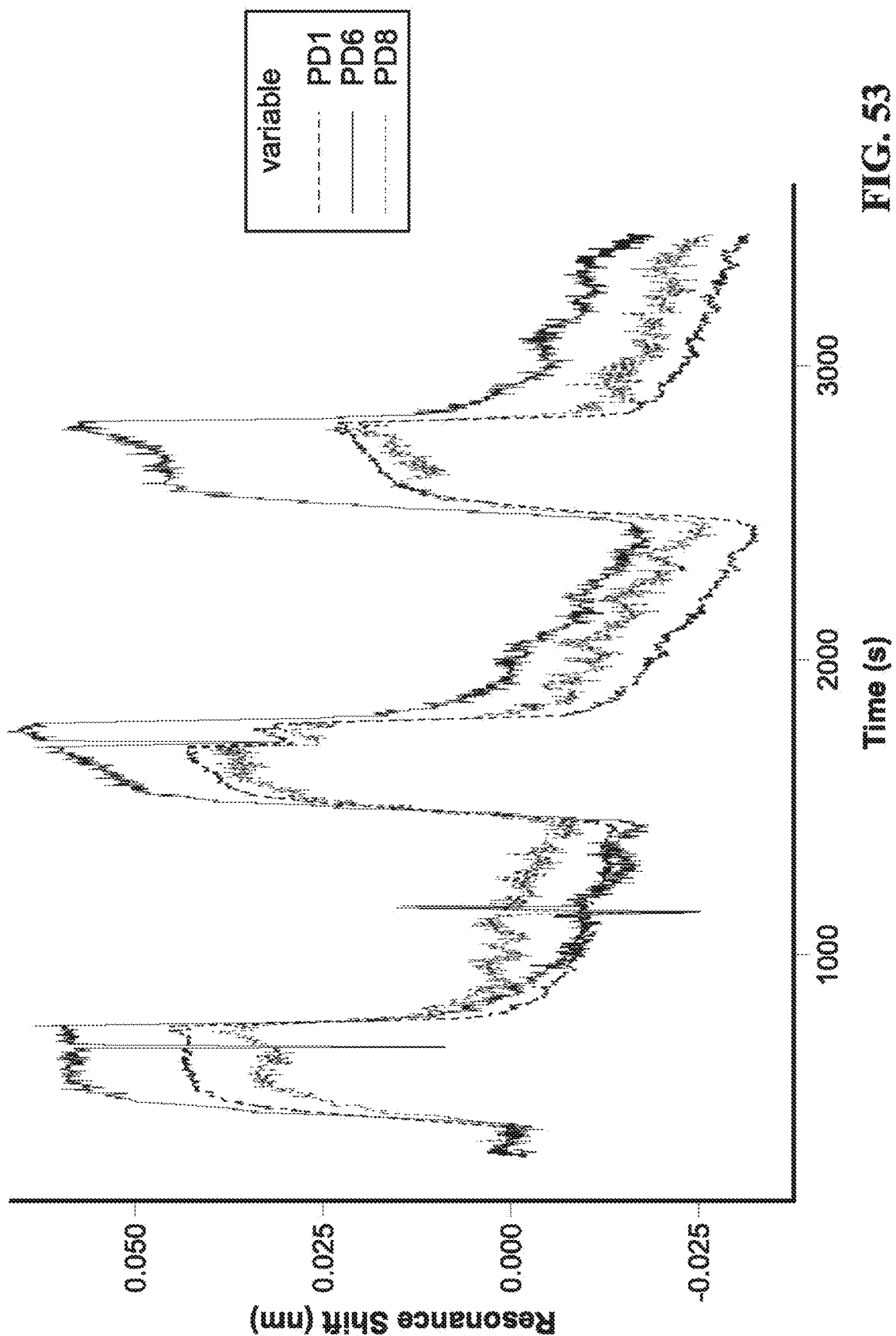
FIG. 53 is a graph illustrating the resonance shift for samples tested using a biosensor.

To further validate the effectiveness of the wearable biosensors disclosed herein, a wearable biosensor is worn by a user, and the real-time sensing data using a silicon microring waveguide resonator interrogated with a swept laser was collected. The resonance of the ring was plotted over time, as shown in FIG. 52B. For the data shown, the ring was functionalized with anti-CRP antibodies 5210, as shown in 52 A. As CRP 5220 binds to the sensor, the resonance redshifts. To remove other nonspecific bindings, a negative control ring was interrogated by exposing it to the same fluid and coated with isotype antibodies of the same type as the ones on the anti-CRP ring. In addition, the sensor is pre-blocked with certain non-specific binding ligands 5230 (as milk used in ELISA) to prevent further non-specific binding during the sensing process. The sensor chip was exposed to different levels of CRP in 10% serum over time. After subtracting the negative control shift from the anti-CRP shift, it is possible to track both the increased binding of CRP as its concentration increases and the resonance redshift as the equilibrium population of CRP on the surface increases. Importantly it is possible to track the CRP as it unbinds via the subsequent blue-shifting resonance, as shown by the right part in FIG. 52C. This confirms that the wearable biosensors disclosed herein can be an effective tool in real time monitoring of biomolecules inside and outside human body, including the real-time monitoring of proteins, hormones, glucose and beyond inside human body.

4 Terminology

The phraseology and terminology used herein is for the purpose of description and should not be regarded as limiting.

As used herein, "invasive monitoring" may refer to any monitoring technique that involves the surgical implantation of a monitoring device into the subject, even on a temporary basis. As used herein, "semi-invasive monitoring" may refer to any monitoring technique that involves non-surgical implantation or injection of a monitoring device into the subject. As used herein, "non-invasive monitoring" may refer to any monitoring technique that does not involve implantation or injection of a monitoring device into the subject.

As used herein, "real-time monitoring" (or "continuous monitoring," "continual monitoring," "real-time sensing," or other similar phrases) may refer to any analyte monitoring or sensing technique in which the level of the analyte is sampled by a biosensor with a frequency no less than a specified minimum frequency (e.g., once per hour, once every 30 minutes, once every 15 minutes, once every 10 minutes, once every 5 minutes, once every minute, etc.).

As used herein, "light" may refer to any optical signal of any suitable wavelength. Unless otherwise indicated, "light" is not limited to visible light.

The term "approximately," the phrase "approximately equal to," and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present In some embodiments, and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Systems, methods, and/or biosensors may be consistent with any systems, methods, and/or biosensors disclosed in PCT application No. PCT/US2022/037767 titled "WEARABLE BIOSENSORS FOR SEMI-INVASIVE, REAL-TIME MONITORING OF ANALYTES, AND RELATED METHODS AND APPARATUS" and filed Jul. 20, 2022, U.S. Provisional Application No. 63/223,807 titled "Real-time Biosensor with Photonic and Electronic Interface" and filed Jul. 20, 2021, and/or U.S. Provisional Application No. 63/315,854 titled "Real-time Biosensor with Photonic and Electronic Interface for Sensing Proteins, Hormones, Glucose and Beyond" and filed Mar. 2, 2022, each of which is incorporated herein by reference in its entirety.

What is claimed is:

1. A biosensor comprising:
   a sensor photonic integrated circuit (PIC) configured to be positioned inside a human body, the sensor PIC comprising one or more optical analyte sensors each functionalized by a respective layer of binding ligands, wherein a first optical analyte sensor of the one or more optical analyte sensors is functionalized for label-free sensing of a particular analyte and wherein at least wherein at least one second optical analyte sensor of the one or more optical analyte sensors is functionalized for sensing of background signals; and
   a patch comprising a first portion of a reader system optically coupled to the sensor PIC by a coupling component, the reader system configured to provide optical signals to the one or more optical analyte sensors and receive signals provided by the one or more optical analyte sensors, and further configured to determine one or more characteristics of one or more analytes sensed by the one or more optical analyte sensors based on the signals provided by the one or more optical analyte sensors,
   wherein a second portion of the reader system is co-located with the sensor PIC and comprises a light source, and wherein the first portion of the reader system further comprises a photodetector corresponding to the light source.

2. The biosensor of claim 1, wherein determining the one or more characteristics of the one or more analytes comprises determining a concentration or a density of a particular analyte by using refractive index-based biosensing with at least one component of the sensor PIC to detect optical effects associated with the sensing of the particular analyte by the one or more optical analyte sensors.

3. The biosensor of claim 2, wherein the at least one component of the sensor PIC comprises a ring resonator, a Mach-Zender Interferometer, a photonic crystal cavity, a grating, a Fabry-Perot Interferometer, and/or a surface plasmon resonator.

4. The biosensor of claim 2, wherein the concentration or density of the particular analyte is further determined based on absorption spectroscopy and/or fluorescence spectroscopy.

5. The biosensor of claim 1, wherein the particular analyte comprises a protein, peptide, hormone, small molecule, or glucose.

6. The biosensor of claim 1, wherein the sensor PIC has thickness of less than approximately 500 microns and a width of less than approximately 1 mm.

7. The biosensor of claim 6, wherein the one or more optical analyte sensors comprise at least 2 functionalized optical analyte sensors.

8. The biosensor of claim 1, wherein the biosensor is configured to perform real-time monitoring of each of the one or more analytes.

9. The biosensor of claim 1, wherein the biosensor is wearable.

10. A biosensing method comprising:
    positioning a sensor photonic integrated circuit (PIC) of a biosensor inside a human body, the sensor PIC comprising one or more optical analyte sensors each functionalized by a respective layer of binding ligands, wherein a first optical analyte sensor of the one or more optical analyte sensors is functionalized for label-free sensing of a particular analyte and wherein at least wherein at least one second optical analyte sensor of the one or more optical analyte sensors is functionalized for sensing of background signals;
    with a reader system coupled to the sensor PIC, providing optical signals to the one or more optical analyte sensors, wherein a patch comprises a first portion of the reader system and a second portion of the reader system is co-located with the sensor PIC and comprises a light source, and wherein the first portion of the reader system further comprises a photodetector corresponding to the light source;
    with the reader system, receiving signals provided by the one or more optical analyte sensors; and
    with the reader system, determining one or more characteristics of one or more analytes sensed by the one or more optical analyte sensors based on the signals provided by the one or more optical analyte sensors.

* * * * *